US011252065B1

(12) United States Patent
Kamen et al.

(10) Patent No.: US 11,252,065 B1
(45) Date of Patent: Feb. 15, 2022

(54) CLOCK SYNCHRONIZATION IN A HETEROGENEOUS SYSTEM

(71) Applicant: Equinix, Inc., Redwood City, CA (US)

(72) Inventors: Yakov Kamen, Los Altos, CA (US);
Yury Kamen, Foster City, CA (US);
Alex Wilms, Hayward, CA (US);
Ankur Sharma, Sunnyvale, CA (US);
David Gofman, Sunnyvale, CA (US);
Danjue Li, Dublin, CA (US); Stanley Chernavsky, Cupertino, CA (US)

(73) Assignee: Equinix, Inc., Redwood City, CA (US)

( * ) Notice: Subject to any disclaimer, the term of this patent is extended or adjusted under 35 U.S.C. 154(b) by 136 days.

(21) Appl. No.: 16/728,562

(22) Filed: Dec. 27, 2019

Related U.S. Application Data

(60) Provisional application No. 62/843,166, filed on May 3, 2019, provisional application No. 62/800,895, filed
(Continued)

(51) Int. Cl.
*G01R 31/28* (2006.01)
*H04L 12/26* (2006.01)
(Continued)

(52) U.S. Cl.
CPC ........ *H04L 43/065* (2013.01); *G06F 11/2082* (2013.01); *H04L 43/0817* (2013.01);
(Continued)

(58) Field of Classification Search
CPC . H04L 43/065; H04L 43/106; H04L 43/0817; H04L 43/0876; H04L 43/062; H04N 21/8547; G06F 11/2082
See application file for complete search history.

(56) References Cited

U.S. PATENT DOCUMENTS

| 7,475,272 B2 | 1/2009 | Carlson et al. |
| 7,865,331 B2 | 1/2011 | Dzung et al. |

(Continued)

FOREIGN PATENT DOCUMENTS

| DE | 102017127431 A1 | 5/2018 |
| EP | 0983658 B1 | 3/2007 |

(Continued)

OTHER PUBLICATIONS

"IEEE Standard for a Precision Clock Synchronization Protocol for Networked Measurement and Control Systems," IEEE Instrumentation and Measurement Society, IEEE Std 1588-2008, Jul. 2008, 289 pp.

(Continued)

*Primary Examiner* — Anh Nguyen
(74) *Attorney, Agent, or Firm* — Shumaker & Sieffert, P.A.

(57) ABSTRACT

The disclosure describes methods and systems for performing time synchronization in a heterogeneous system. In one example, a method includes, for each secondary device of one or more secondary devices in a network, determining, by a computing system, one or more time synchronization characteristics for the respective secondary device; and generating, by the computing system and based on at least the respective one or more time synchronization characteristics for each respective secondary device of the one or more secondary devices in the network, a time synchronization report for the network, wherein the one or more time synchronization characteristics include health data for the one or more secondary device.

20 Claims, 19 Drawing Sheets

Related U.S. Application Data on Feb. 4, 2019, provisional application No. 62/785,513, filed on Dec. 27, 2018.

(51) Int. Cl.
  *G06F 11/20* (2006.01)
  *H04N 21/8547* (2011.01)
(52) U.S. Cl.
  CPC ........ *H04L 43/0876* (2013.01); *H04L 43/106* (2013.01); *H04N 21/8547* (2013.01)

(56) References Cited

U.S. PATENT DOCUMENTS

| | | | |
|---|---|---|---|
| 7,876,791 | B2 | 1/2011 | Jung et al. |
| 8,384,590 | B2 | 2/2013 | Huang et al. |
| 8,416,812 | B2 | 4/2013 | Radulescu |
| 8,467,487 | B2 | 6/2013 | Garner et al. |
| 8,549,341 | B2 | 10/2013 | Shahid et al. |
| 8,644,348 | B2 | 2/2014 | Zampetti |
| 8,705,578 | B2 | 4/2014 | Fang et al. |
| 9,515,756 | B2 | 12/2016 | Khoury et al. |
| 9,749,899 | B2 | 8/2017 | Raleigh et al. |
| 9,886,267 | B2 | 2/2018 | Maheshwari et al. |
| 9,948,552 | B2 | 4/2018 | Teng et al. |
| 2002/0198985 | A1 | 12/2002 | Fraenkel et al. |
| 2007/0147435 | A1 | 6/2007 | Hamilton et al. |
| 2007/0147562 | A1 | 6/2007 | Eidson |
| 2010/0074383 | A1 | 3/2010 | Lee et al. |
| 2010/0138187 | A1 | 6/2010 | Dzung et al. |
| 2010/0162036 | A1 | 6/2010 | Linden et al. |
| 2010/0254225 | A1 | 10/2010 | Schweitzer, III et al. |
| 2011/0064091 | A1 | 3/2011 | Darras et al. |
| 2011/0276648 | A1 | 11/2011 | Soldan |
| 2012/0269204 | A1 | 10/2012 | Zampetti |
| 2012/0294318 | A1 | 11/2012 | Fang et al. |
| 2013/0042082 | A1* | 2/2013 | Tamura ............... G06F 12/00 711/154 |
| 2013/0219043 | A1* | 8/2013 | Steiner ............... G06F 9/4856 709/224 |
| 2014/0140213 | A1* | 5/2014 | Raleigh ............... H04L 65/601 370/235 |
| 2014/0164668 | A1 | 6/2014 | Charpentier et al. |
| 2016/0044710 | A1* | 2/2016 | Lee ................... H04W 76/14 370/312 |
| 2018/0262321 | A1* | 9/2018 | Yan ................... H04W 56/0015 |
| 2019/0107830 | A1* | 4/2019 | Duraisingh ......... G05B 23/0264 |
| 2019/0356402 | A1 | 11/2019 | Hummen et al. |

FOREIGN PATENT DOCUMENTS

| | | |
|---|---|---|
| EP | 1901458 A2 | 3/2008 |
| EP | 2947795 A1 | 11/2015 |
| WO | 2013048770 A1 | 4/2013 |

OTHER PUBLICATIONS

"Precision Time Protocol (PTP/IEEE-1588)," White Paper, End Run Technologies, 2008, 6 pp. (Applicant points out, in accordance with MPEP 609.04(a), that the year of publication, 2008, is sufficiently earlier than the effective U.S. filing date, so that the particular month of publication is not in issue.).

"Precision Time Protocol," Wikipedia, retrieved from https://en.wikipedia.org/wiki/Precision_Time_Protocol on Apr. 14, 2020, Last edited Mar. 23, 2020, 9 pp.

Bari et al., "Dynamic Controller Provisioning in Software Defined Networks," Proceedings of the 9th International Conference on Network and Service Management (CNSM 2013), Oct. 14-18, 2013, 8 pp.

Geng et al., "Self-Programming Networks: Architecture and Algorithms," Fifty-Fifth Annual Allerton Conference, Oct. 3-6, 2017, 8 pp.

Hayes, "Bollinger Band," Investopedia, Apr. 23, 2019, 5 pp.

Kamen et al., "Time Synchronization Comparison of Network Interface Cards Under Load," Equinix, Mar. 6, 2019, 23 pp.

Mills et al., "Internet Time Synchronization: The Network Time Protocol," IEEE Transactions on Communications, vol. 39, No. 10, Oct. 1991, 12 pp.

Mills, "Network Time Protocol (Version 3) Specification, Implementation and Analysis," Network Working Group, RFC 1305, Mar. 1992, 120 pp.

Mills et al., "Network Time Protocol Version 4: Protocol and Algorithms Specification," Internet Engineering Task Force (IETF), RFC 5905, Jun. 2010, 110 pp.

Mills, "Network Time Protocol Version 4 Core Protocol Specification," Network Working Group, Technical Report 06-1-2, Jan. 2006, 34 pp.

Oliveira et al., "Localization in Time and Space for Wireless Sensor Networks: An Efficient and Lightweight Algorithm," Performance Evaluation, vol. 66, Mar. 2009, accepted Oct. 22, 2008, 14 pp.

Palatella et al., "Traffic Aware Scheduling Algorithm for Reliable Low-Power Multi-Hop IEEE 802.15.4e Networks," 2012 IEEE 23rd International Symposium on Personal, Indoor and Mobile Radio Communications (PIMRC), Sep. 2012, 6 pp.

Romer et al., "Time Synchronization and Calibration in Wireless Sensor Networks," Chapter 7—Handbook of Sensor Networks: Algorithm and Architectures, Sep. 2005, 39 pp.

Wang et al., "Cluster-Based Maximum Consensus Time Synchronization for Industrial Wireless Sensor Networks," Sensors, vol. 17, No. 141, Jan. 13, 2017, 16 pp.

Wu et al., "Cluster-Based Consensus Time Synchronization for Wireless Sensor Networks," IEEE Sensors Journal, vol. 15, No. 3, Mar. 2015, 10 pp.

U.S. Appl. No. 16/438,310, filed Jun. 11, 2019, by Ozarkar et al.
U.S. Appl. No. 16/728,522, filed Dec. 27, 2019, by Kamen et al.
U.S. Appl. No. 16/728,607, filed Dec. 27, 2019, by Kamen et al.
Notice of Allowance from U.S. Appl. No. 16/728,607, dated Oct. 6, 2021, 13 pp.
Notice of Allowance from U.S. Appl. No. 16/728,607, dated Jul. 12, 2021, 13 pp.
Notice of Allowance from U.S. Appl. No. 16/728,522, dated Oct. 12, 2021, 9 pp.
Office Action from U.S. Appl. No. 16/728,522, dated Apr. 2, 2021, 20 pp.
Response to Office Action dated Apr. 2, 2021 from U.S. Appl. No. 16/728,522, filed Jul. 1, 2021, 12 pp.

\* cited by examiner

CLOCK SYNCHRONIZATION IN A HETEROGENEOUS SYSTEM

RELATED APPLICATIONS

This application claims priority to U.S. Provisional Application No. 62/785,513, filed Dec. 27, 2018, U.S. Provisional Application No. 62/800,895, filed Feb. 4, 2019, and U.S. Provisional Application No. 62/843,166, filed May 3, 2019, the entire content of each which is incorporated herein by reference.

TECHNICAL FIELD

The disclosure relates to time synchronization in computer networks.

BACKGROUND

A synchronization system, in general, synchronizes clocks of multiple secondary devices (also referred to as "slave" devices, "replica" devices, "follower" devices or "leaf nodes") based on the clock of a chosen master device (also referred to as a "primary" device or a "leader" device). Master devices are connected to the more precise sources of timestamps than secondary devices.

The master device is a computing device that gets time synchronization data from other master devices or intelligent engines deployed either inside or outside of the synchronization system, such as a global positioning system (GPS). The typical synchronization system has one or more layers of master devices with secondary devices connected to at least one master device.

In some implementations, master devices may belong to a service provider and can be designed to support precise time processing, while secondary devices may belong to the service client and receive timestamp offsets from master devices. These master and secondary devices can be chosen arbitrarily or assigned by the network.

In many applications, including but not limited to financial, scientific, military, programmatic advertising, and gaming industries, time synchronization may be beneficial. For instance, such knowledge would be used to define trade orders in high-frequency trading systems and gamers' response in multi-user games.

SUMMARY

In general, the disclosure describes techniques and devices to provide computing device clock synchronization in heterogeneous distributed computer networks based on characteristics of computing devices in the computer networks. For example, a computing system in a network performs the time synchronization processes as described herein. In some examples, the computing system (e.g., a master device) may determine whether to perform the time synchronization process based on network conditions, such as network congestion or device health. For instance, in response to determining the network congestion is high, a master device may refrain from performing the synchronization process so as not to unduly burden the network with extraneous packet exchanges between the master device and secondary devices on the network.

In some examples, the time synchronization process may also include an aggregation of timestamp offsets (also referred to herein as "time synchronization offsets" and "offsets") across different devices, so as to calculate a single, universal timestamp offset that will be sent to each secondary device rather than calculating and creating multiple, individualized timestamp offsets. This aggregation process can include calculating weights for each of the secondary devices and applying those weights to individual timestamp offsets received from the respective secondary devices to create a more accurate timestamp offset, enabling the computing system that implements the techniques described herein to have a more synchronous timing mechanism across the entire network. Further, in some examples the secondary devices receiving the timestamp offsets may be located in a different cluster than the master device creating the timestamp offset, meaning that the master device may be a part of a different local-area network than the secondary device that is receiving the timestamp offset.

The disclosure describes techniques and devices to perform a monitoring process, in addition to or in place of the synchronization process described above, to generate reports based on the offsets, health scores, or any other synchronization characteristic of the secondary devices. These reports may include raw characteristics, statistics calculated from these raw characteristics, and different representations that enable a user to better visualize how various components within the network are operating. Further, when monitoring these offsets and time information, requests for synchronizations may be received by the computing system tasked with performing the monitoring process. Rather than measuring all of the information to be included in the report immediately upon receiving the request, the computing system (e.g., a master device) tracks the offset information such that the computing system may calculate a dynamic offset for each secondary device in the network without having to retrieve timestamp (e.g., a time indication for a clock) information from each secondary device. This may reduce the overall traffic on the network, increasing the efficiency of any data transfers occurring between devices on the network, and reducing the processing and power consumption of the secondary devices.

In another example, a method includes, for each secondary device of one or more secondary devices in a network, determining, by a computing system, one or more time synchronization characteristics for the respective secondary device; and generating, by the computing system and based on at least the respective one or more time synchronization characteristics for each respective secondary device of the one or more secondary devices in the network, a time synchronization report for the network, wherein the one or more time synchronization characteristics include health data for the one or more secondary device.

In another example, a computing system includes one or more processors coupled to a memory, the one or more processors being configured to: for each secondary device of one or more secondary devices in a network, determine one or more time synchronization characteristics for the respective secondary device; and generate, based on at least the respective one or more time synchronization characteristics for each respective secondary device of the one or more secondary devices in the network, a time synchronization report for the network, wherein the one or more time synchronization characteristics include health data for the one or more secondary device.

In another example, a system includes a network comprising a plurality of clusters, wherein each cluster comprises a group of one or more devices in a particular geographic area; a computing system; a master device located in a first cluster of the plurality of clusters; and one or more secondary devices located in a second cluster of the plurality of clusters. The computing system is configured to: for each secondary device of one or more secondary devices in the second cluster, determine one or more time synchronization characteristics for the respective secondary device; and generate, based on at least the respective one or more time synchronization characteristics for each respective secondary device of the one or more secondary devices in the network, a time synchronization report for the second cluster, wherein the one or more time synchronization characteristics include health data for the one or more secondary device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
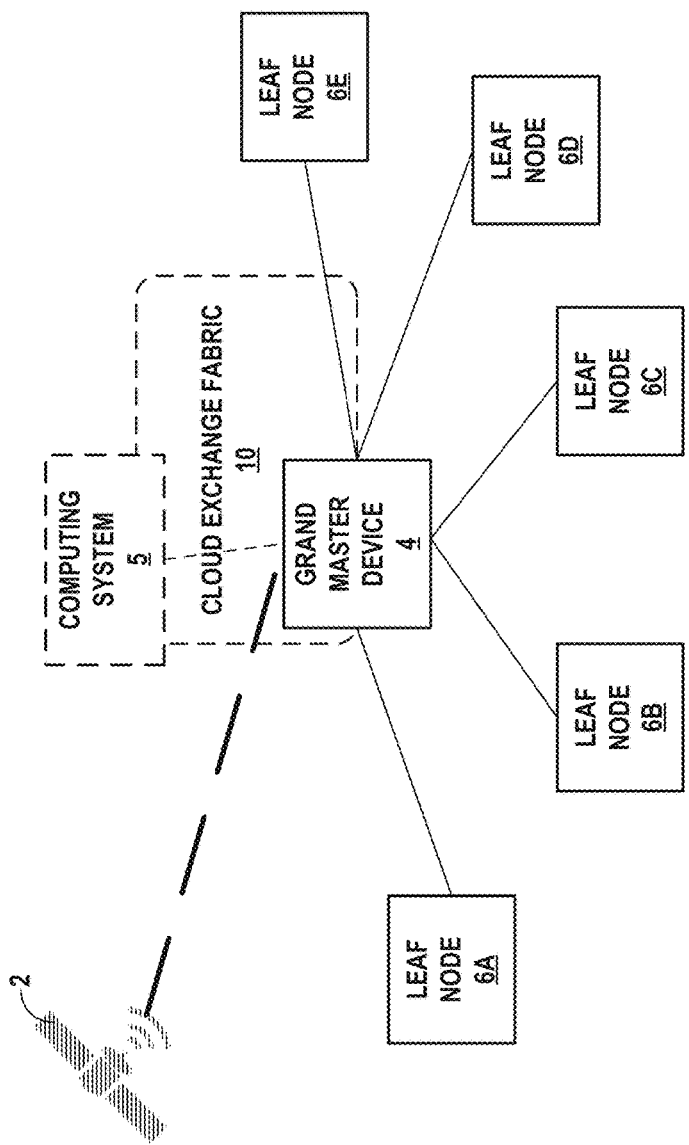
FIG. 1 is a conceptual diagram of an example time synchronization system with a GPS, a computing system, a grand master device, and multiple leaf nodes, in accordance one or more techniques of the current disclosure.

The techniques of this disclosure define a method and device to deliver relatively accurate and precise clock synchronization in a heterogeneous system. For example, the disclosure describes a synchronization engine that sets efficient clock synchronization processes based on a cluster node's characteristics, pricing, precision, geolocation, and/or cluster topology, while also using a combination of master clock data with internal atomic clocks of computers. The techniques described herein integrate the synchronization engine into a time synchronization process that may provide stability, versatility, precision, and cost balance.

Additionally, the disclosure describes techniques and devices to perform a monitoring process, in addition to or in place of the synchronization process described above, to generate reports based on timestamp offsets, health scores, or any other synchronization characteristic of the secondary devices. These reports may include raw characteristics, statistics calculated from these raw characteristics, and different representations that enable a user to better visualize how various components within the network are operating. Further, when monitoring these offsets and time information, requests for synchronizations may be received by a computing system (e.g., a master device) tasked with performing the monitoring process. Rather than measuring all of the information to be included in the report immediately upon receiving the request, the computing system tracks the offset information such that the computing system may calculate a dynamic timestamp for each secondary device in the network without having to retrieve timestamp information from each secondary device. This may reduce the overall traffic on the network, increasing the efficiency of any data transfers occurring between devices on the network, and reducing the processing and power consumption of the secondary devices. Further, the techniques described herein enable the computing system to simultaneously monitor the quality of time synchronization for numerous devices distributed geographically worldwide. By reporting these characteristics in a single report, a user may adjust various synchronization parameters to more optimally synchronize heterogeneous devices in heterogeneous network clusters.

In one example, a method includes, for each secondary device of one or more secondary devices in a network, determining, by a computing system (e.g., a master device) in the network, one or more time synchronization characteristics for the respective secondary device, and generating, by the computing system and based on at least the respective one or more time synchronization characteristics for each respective secondary device of the one or more secondary devices in the network, a time synchronization report for the network.

In another example, a system includes a network comprising a plurality of clusters, wherein each cluster comprises a group of one or more devices in a particular geographic area, a master device located in a first cluster of the plurality of clusters, and one or more secondary devices located in a second cluster of the plurality of clusters, wherein a computing system (e.g., a master device) is configured to, for each secondary device of the one or more secondary devices in the second cluster, determine one or more time synchronization characteristics for the respective secondary device, and generate, based on at least the respective one or more time synchronization characteristics for each respective secondary device of the one or more secondary devices in the network, a time synchronization report for the second cluster.

Computing devices in a heterogeneous system are typically equipped with hardware oscillator assisted computer clocks. These computer clocks ("clocks") estimate real-time (which may be represented in equations with the variable 't') with a certain level of accuracy. At any moment of time, the clock timestamp approximation is defined as a function $C(t)$. The value of $C(t_0)$ at any fixed moment in time $t_0$ is called the timestamp. The difference between $C(t)$ and t is called time estimation error $Err(C)=t-C(t)$. Due to temperature changes and resonator aging, all clocks are subject to drifts and jitters. Without special clock time correction procedures, the time estimation error $Err(C)$ will generally increase as time goes on.

One example method of time correction is the use of a device which generates more precise timestamps and synchronizing the time on other devices to the time on this more precise device. This more precise device is called the "master device." A device that requires timestamp adjustments is called the "secondary device." The synchronization process generally estimates a time difference between the master device and secondary device by analyzing previous measurements as well as the physical state of the devices and the connections between them. The difference between a master device timestamp and a secondary device timestamp is called the timestamp offset. The process of secondary device clock timestamp correction using the timestamp offset is called "clock synchronization" or "timestamp synchronization."

The following is an example of a typical clock synchronization process. At the moment $t_0$, a secondary device timestamp estimation $C(t_0)$ has been corrected by timestamp offset $O(to)$ as $C_o(t_0)=C(t_0)+O(t_0)$. The clock error in the secondary device starts to grow immediately after the timestamp $t_0$ until the new correction happens at timestamp t. $Err(t, t_0)$ is a function that defines the clock error in the secondary device at time t, which accrues after the last synchronization (in this example, time $t_0$). An approximation of $Err(t, t_0)$ may be approximated as follows:

$$Err(t,t_0)=t+R(t-t_0)+D(t-t_0)+s(t), \quad (1)$$

where t is the current time, to is the time at the previous synchronization, $R(\ )$ is a frequency offset (clock wander (jitter) due to temperature change), $D(\ )$ is the drift due to resonator aging, and $s(\ )$ is the stochastic error term.

Systems may accurately estimate $R(\ )$ and $D(\ )$ in equation (1) as linear or non-linear functions of t and $t_0$. In a case of linear function equation (1) can be re-written as:

$$Err(t,t_0)=a(t_0)\times t+b(t_0), \quad (2)$$

where $t_0$ is the time of the previous synchronization, $a(t_0)$ is a clock drift gradient at the time interval $[t_0, t]$, and $b(t_0)$ is an offset at the time interval $[t_0, t]$. If the time interval $[t_0, t]$ is small enough, the gradient $a(t_0)$ is very small, and the linear function at the interval $[t_0, t]$ can be approximated by the constant function:

$$Err(t,t_0)=b(t_0). \quad (3)$$

If offset $O(t)$ can accurately estimate the $Err(t, t_0)$ function, it would allow the computing system to increase the precision of the secondary device clock. In other words, if $C_o(t)=C(t)+O(t)$, at time t the system would create timestamp $C_o(t)$ for clock error $Err(t)=C_o(t)-t$. The synchronization improves clock precision if $C_o(t)-t<C(t)-t$ (i.e. offset decreases the close error). The main problem for time synchronization is the estimation of the offset $O(t)$.

The techniques described herein include an aggregation of timestamp offsets for each secondary device in a heterogeneous system, along with a respective weight for such timestamp offsets. These weights may be based on one or more factors, including static parameters of the individual secondary device, dynamic parameters of the individual secondary device, health scores for the individual secondary device, health scores for connections between the individual secondary device and another device, health scores for a cluster that includes the individual secondary device, and health scores for the overall network. The techniques described herein represent a method and apparatus that allow the computation of timestamp offsets for each connected device in the distributed network. Computing the timestamp offsets in accordance with the techniques described herein may significantly decrease the clock error as described in equation (2) for different time synchronization strategies and adaptively establish a more efficient synchronization process. Further, in some instances, attempting to replicate simple mean averaging may create significant discrepancy and, in some instances, the generated offset may desynchronize the clock as opposed to synchronizing the clock.

In one example, the clock synchronization process includes the use of GPS modules that provide precise time signals from satellites, distribution modules (switches) that allow the transfer of a time signal from the GPS module to time management modules, cluster node connection and distribution modules, cluster nodes, and a connection intelligent engine that defines the most effective connection mechanism between the GPS module and cluster nodes.

In another example, the clock synchronization apparatus described herein includes GPS modules that provide precise time signals from satellites, distribution modules (switches) that allow the transfer of a time signal from the GPS module to time management modules, cluster node connection and distribution modules, cluster nodes, a connection intelligent engine that defines the most effective connection mechanism between the GPS module and cluster nodes, and an intelligent synchronization filter module that eliminates potential outliers in the time synchronization process.

In another example, the clock synchronization apparatus described herein includes GPS modules that provide precise time signals from satellites, distribution modules (switches)

that allow the transfer of a time signal from the GPS module to time management modules, cluster node connection and distribution modules, cluster nodes, a connection intelligent engine that defines the most effective connection mechanism between the GPS module and cluster nodes, an intelligent synchronization filter module that eliminates potential outliers in the time synchronization process, and a load control engine that changes the time synchronization algorithms based on network load.

Certain arrangements of networks include multiple clusters (also referred to herein as "cluster nodes," "device cluster nodes," or "device clusters"), or sets of devices within geographical proximity to one another. Devices from the same cluster node are typically located in a local-area network (LAN) and have faster access times and lower network loads than cross-cluster devices, so clusters typically act separately from one another.

For the purposes of this disclosure, a synchronization system, a computing system, or a system indicates a complex set of devices, algorithms, programs, modules, and components which allow the execution of time synchronization operations.

For the purposes of this disclosure, a device clock indicates an internal clock of the device. A device can have a single device clock or more than one device clock, including one or more of a Network Interface Card (NIC) card clock, a Graphics Processing Unit (GPU) clock, a central processing unit (CPU) clock, or an operating system clock.

For the purposes of this disclosure, a system clock indicates a clock associated with the synchronization system. The system clock may be a high precision clock which provides a precise time signal and generates precise timestamps, such as a clock on a GPS. The synchronization system may have more than one system clock.

For the purposes of this disclosure, a timestamp indicates an individual time signal measurement registered by a time measurement device. For the purposes of this disclosure, a device timestamp indicates a timestamp generated by a device. For the purposes of this disclosure, a system timestamp indicates a timestamp computed by the synchronization system. For the purposes of this disclosure, a timestamp offset (also referred to herein as a "time synchronization offsets" or an "offset") indicates a difference between two timestamps. For instance, the timestamp offset may be calculated as a difference between the device timestamp and the system timestamp.

For the purposes of this disclosure, the network time protocol (NTP) is a networking protocol for clock synchronization between computer systems over packet-switched, variable-latency data networks. For the purposes of this disclosure, the precision time protocol (PTP) is a protocol used to synchronize clocks throughout a computer network.

For the purposes of this disclosure, a switch indicates a computer networking device that connects devices together on a computer network by using packet switching to receive, process, and forward data to the destination device. For the purposes of this disclosure, a PTP switch indicates a switch that supports the PTP standard protocol and allows the receipt, processing, and forwarding of timestamps to the destination devices. For the purposes of this disclosure, an NTP Switch indicates a switch that supports the NTP standard protocol and allows the receipt, processing, and forwarding of timestamps to the destination devices. For the purposes of this disclosure, a master switch indicates a special device that allows the receipt, processing, and forwarding of time signal from a GPS antenna.

For the purposes of this disclosure, a system state indicates a set of parameters that allows the estimation of how loaded and "ready for time synchronization" a system is.

For the purposes of this disclosure, a master device (also known as a "primary" device or a "leader" device) indicates a special type of device that gets time synchronization data from other master devices or intelligent engines deployed inside the synchronization system, such as a GPS module in communication with a GPS. Master devices are connected to the more precise sources of timestamps than secondary devices.

For the purposes of this disclosure, a secondary device (also known as a "slave" device, a "replica" device, a "follower" device, or a "leaf node," all of which may be used interchangeably throughout this disclosure) indicates a device that is typically connected to one or more master devices.

In typical synchronization systems, master devices are subdivided in groups (also referred to as "strata"). Master devices connected directly to GPS modules may be referred to as GPS master devices, which may belong to the strata 0 group. Strata (also referred to as "stratum") 0 master devices are connected to strata 1 devices.

Master devices not connected directly to GPS modules may be referred to as non-GPS master devices. Non-GPS master devices may belong to strata 1 to strata i+1 groups. Strata 1 devices generally have less precise sources of timestamps than strata 0 devices. Strata 1 master devices can be connected to strata 2 master devices or directly to the end devices. In general, strata i master devices can be connected to strata i+1 master devices or slave devices.

In some implementations, master devices may belong to a service provider and can be designed to support precise time processing, while secondary devices may belong to the service client and receive timestamp offsets from master devices. These master and secondary devices can be chosen arbitrarily or assigned by the network.

For the purposes of this disclosure, a device cluster node (also referred to herein as a "device cluster," a "cluster," or a "cluster node") indicates a set of devices within geolocation proximity. For the purposes of this disclosure, a cross-cluster connection indicates a network connection between different cluster nodes. For the purposes of this disclosure, cross-cluster master devices indicate a special set of master devices that distribute timestamp offsets between device clusters.

A "leaf node" may refer to a secondary master device or an end device (also referred to herein as a user device or a client device).

An end device may be connected to more than one master device or another end device. End devices may be disconnected from one master device and reconnected to another master device. End devices may be reassigned to be a master device and vice versa. Master devices can be connected to another master device and one or more end devices.

For the purposes of this disclosure, a support vector machine (SVM) indicates a machine learning algorithm that analyzes data for classification and regression analysis. Regression analysis is a set of statistical processes for estimating the relationships among variables. Regression analysis includes many techniques for modeling and analyzing several variables, where the focus is on the relationship between a dependent variable and one or more independent variables. Linear regression is the simplest form of regression analysis and uses one dependent variable and one independent variable.

For the purposes of this disclosure, a time synchronization monitoring system (also referred to as a "time monitoring system" or a "monitoring system") may refer to a complex set of devices, algorithms, programs, modules, and components which enable the surveillance of time synchronization for different devices in heterogeneous network clusters. For the purposes of this disclosure, a monitoring device list may refer to a list of devices added to the time monitoring system.

For the purposes of this disclosure, a time synchronization client device monitoring application (also referred to as a "time synchronization monitoring client" or a "time monitoring client") may refer to a special program that is downloaded and installed by the time monitoring system's user on his device and allows this device to be added to the monitoring device list and the time monitoring service.

For the purposes of this disclosure, a time monitoring authentication module may refer to an intelligent mechanism and apparatus that allows the computing system to check and accept or refuse a specific device ID for the time monitoring service.

For the purposes of this disclosure, a probe timestamp may refer to a measure of time at a secondary device or a measure of time at a master device.

One example implementation environment for the techniques described herein is within data centers. Data centers may house multiple different types of devices, each owned by different entities, but each of the devices may be linked inside this overall data center structure. Some devices within the data center may exchange data with other devices in the same data center, but may also exchange data with devices located in data centers in different geographic/metropolitan areas. As such, data centers may implement the techniques described herein to efficiently and precisely synchronize the clocks on the devices within the same data center, as well as with devices in remote data centers in different geographical areas. In this way, the techniques described herein may be implemented as a downloadable software plugin on customer equipment in a data center that enables a device in the data center to perform the time synchronization processes as described herein. The techniques described herein may balance multiple characteristics, including scalability, versatility, precision, cost, security, and redundancy.

FIG. 1 is a conceptual diagram of an example time synchronization system 1 with a GPS 2, a grand master device 4, a computing system 5, and multiple leaf nodes 6A-6E (collectively, leaf nodes 6), in accordance one or more techniques of the current disclosure. Each of GPS 2, grand master device 4, and leaf nodes 6 may be examples of the devices defined and described above having like names.

In some examples, time synchronization system 1 of FIG. 1 may include or be part of a cloud exchange or cloud exchange fabric 10, as described in further detail below. Computing system 5 includes one or more computing devices that determine whether to perform the time synchronization process based on network conditions, such as network congestion or device health. For instance, if the network congestion is high, a master device may refrain from performing the synchronization process so as not to unduly burden the network with extraneous packet exchanges between the master device and other secondary devices on the network. The techniques of this disclosure allow the calculation of an aggregation of timestamp offsets across different devices, so as to calculate a single, universal timestamp offset that will be sent to each secondary device rather than calculating and creating multiple, individualized timestamp offsets. Data provided by computing system 5 may then be used by time synchronization 1, such as sending timestamp offsets to master device 4 or leaf nodes 6.

In some examples, computing system 5 may include one or more computing devices, servers, workstations, or any other such device configured to be connected with grand master device 4. In some examples, computing system 5 may be distributed over one or more of grand master device 4 and multiple leaf nodes 6. In some examples, computing system 5 may configured to be embedded in, reside on, or may be loaded onto one or more of grand master device 4 and multiple leaf nodes 6.

In some examples, computing system 5 may execute a synchronization engine with multiple processors or multiple devices. One or more such processors or devices may be located within a public, private, or hybrid cloud. A computing device of the computing system may execute components of the synchronization engine as a virtual machine executing on underlying hardware. One or more of such components may execute as one or more services of an operating system or computing platform. One or more of such components may execute as one or more executable programs at an application layer of a computing platform. In other examples, functionality provided by a module could be implemented by a dedicated hardware device.

In some instances, prior to computing system 5 performing a time synchronization process in accordance with the techniques described herein, computing system 5 may be configured to receive signals from GPS 2, convert signals into a timestamp, and transmit a timestamp to grand master device 4. Grand master device 4 may receive the timestamp and synchronize an internal clock on grand master device 4 to the timestamp received from computing system 5.

As defined above, leaf nodes 6 may be secondary master devices or end devices. Computing system 5 may be configured to perform a time synchronization process with any devices of leaf nodes 6, either individually or in combination. As such, computing system 5 may be configured to perform the time synchronization process described herein directly with one or more devices in time synchronization system 1. In some examples, grand master device 4 may be one of a set of redundant master devices of time synchronization system 1, and the set of redundant master devices may include one or more backup grand master devices (not shown).

In some examples, computing system 5 may only perform the time synchronization techniques when the network conditions indicate that an acceptable environment exists for computing system 5 to perform the time synchronization techniques. For instance, computing system 5 may check a network load for time synchronization system 1 to determine if the current bandwidth usage is above a predefined threshold past which it would be cumbersome on the network to perform the time synchronization techniques described herein, as sending additional time synchronization-related packets between network devices may exacerbate network congestion issues. The network condition(s) may be checked individually with each leaf node (e.g., bandwidth usage over a connection directly between grand master device 4 and the respective leaf node), at the cluster level (e.g., a total bandwidth usage for a LAN that includes all of the end devices and/or secondary master devices in the cluster that will undergo the time synchronization process), and/or at the system level (e.g., a total bandwidth usage for multiple clusters in the overall system). If the network conditions are checked at the individual level or the cluster level, computing system 5 may perform the time synchronization process with the leaf node or on each leaf node in the respective cluster once the network conditions for the individual leaf node or the network conditions for the cluster indicate that the environment is suitable for the computing system to send the time synchronization packets.

The network conditions may also include device health for the leaf node. As with the bandwidth usage, computing system 5 may check the device health for the individual leaf node to receive the time synchronization packet, an aggregate device health for the cluster that includes the individual leaf node to receive the time synchronization packet, or an aggregate device health for multiple clusters that are each to receive the time synchronization packet. When the leaf node includes an end device or multiple devices in the same cluster, device health may include an estimated cluster node network load, a number of inactive devices, and/or a ratio of inactive devices to total devices. When the device health includes an aggregate across multiple clusters, the cross-cluster health metric may include an estimated cross-cluster network load, a number of inactive devices, a ratio of inactive devices to total devices, and a number of routing nodes (switches) between each pair of master and secondary devices.

In some instances, in addition to the network condition check or without the network condition check, computing system 5 may aggregate timestamp offsets across multiple leaf nodes of leaf nodes 6 in order to calculate a universal time synchronization offset value that is sent to each leaf node, either in a particular cluster or across multiple clusters. For instance, computing system 5 may determine what the timestamp offset would be for each leaf node that will receive the time synchronization packet. To aggregate the timestamp offsets, computing system 5 may take a strict average of the determined offsets or may weight the various timestamp offsets, as examples. The weights may be based on the amount of time the respective device has been a part of the network or based on a deviation from a distribution of the various timestamp offsets. For instance, after finding the best fit for the distribution of timestamp offsets, computing system 5 may completely disregard a timestamp offset that is an outlier from the distribution without including the timestamp offset in the aggregated value, and/or may weight a timestamp offset very highly if the timestamp offset is close to a mean or median of the distribution.

In some examples, time synchronization system 1 may include a set of geographically distributed network connected devices. Devices may be separated into clusters called device clusters or cluster nodes, e.g., based on geographical locations and other technical characteristics. Each device in synchronization system 1 may belong to a particular device cluster. Each cluster node may include devices that belong to the service provider and devices that belong to the service users. In the example of FIG. 1, grand master device 4 may be a service provider device, while leaf nodes 6 may be user devices if grand master device 4 and leaf nodes 6 are in the same cluster.

A cluster node may include a special component operatively connected to grand master device 4 (either as a software plugin on grand master device 4 or a separate hardware component) called the GPS module. The GPS module may be connected to GPS 2, which generates and distributes precision time signals. Nodes that include a GPS module are called GPS-enabled cluster nodes. GPS-enabled cluster nodes provide access to the satellite-generated precise timestamp source. Synchronization systems may have zero, one, or more GPS-enabled cluster nodes.

Each cluster node may include two types of devices: master (e.g., grand master device 4) and secondary devices (e.g., leaf nodes 6). Master devices may be connected to other master devices or to end devices directly.

Master devices connected directly to GPS modules may be referred to as GPS master devices or grand master devices. Two devices in the system can be connected or disconnected. In many cases, each end device is connected to a single master device, while other examples may include an end device connected to more than one master device or to another end device. Master devices can be connected to other master devices and/or one or more end devices.

In some examples, master devices may be separated into several strata. Master devices assigned to the same strata are considered to belong to a same group, and master devices assigned to different strata are considered to belong to different groups. For instance, all GPS master devices may be assigned to strata 0 group and non-GPS master devices may be assigned to strata 1 to strata 1+i group. GPS master devices may have access to more precise timing data than non-GPS master devices.

One example of a synchronization system includes strata 0 master devices, strata 1 master devices, and end devices. In a heterogeneous system, several GPS-enabled cluster nodes may exist, as well as numerous non-GPS cluster nodes. GPS-enabled cluster nodes may include both strata 0 and strata 1 master devices. Other cluster nodes may only have strata 1 master devices and sometimes strata 2 master devices.

In some cases, the use of publicly available clock synchronization solutions requires configuration, tune ups and maintenance of the dedicated timing servers. These servers can utilize different timing protocols (PTP/NTP) and operating systems (Windows/Linux). Operators need to manually monitor the status of their clocks and server's synchronization status. Timestamps are provided but required clock synchronization configurations and maintenance is expensive and time consuming. Unfortunately, public GPS solutions provide relatively low accuracy due to the delivery of timestamps over the public internet for timestamp delivery and create a significant risk of hacker attacks.

In some examples, time synchronization system 1 uses a distributed infrastructure software solution that provides next generation technology, platform, and services that enable precise, accurate, secure, and scalable clock synchronization in distributed enterprise applications deployed in a heterogeneous system environment.

In some examples, cloud exchange fabric 10 provides a monitoring service that allows web-based monitoring of device clock synchronization. The monitoring service may enable device name and IP-based sorting and searching, multi-resolution detailed and aggregated synchronization offset charting, license control, historical data and advanced analytics.

In some examples, cloud exchange fabric 10 provides a synchronization service allows precise and accurate synchronization of time with the distributed set of devices connected to high-precision GPS antennas. The synchronization service may support both the NTP and PTP standards. The synchronization service is deployed on highly available infrastructure, and provides security via integration with a cloud exchange fabric 10 security system. In these and other examples, computing system 5, monitoring service, and/or synchronization service may be part of a programmable network platform of a cloud exchange, e.g., cloud exchange fabric 10. One example of a time synchronization service in a cloud exchange system is provided by U.S. application Ser. No. 16/438,310, filed Jun. 11, 2019, the entire contents of which are incorporated by reference herein.

Cloud exchange fabric 10 may provide a precise timing platform that enables to create unique user keys for security, authentication, and management of the service, simple service subscription, client installation, adding and removing client devices, UI-based device clock synchronization monitoring such as search by device names and IPs, historical and analytic data, precise and accurate clock synchronization with NTP and PTP on Linux and Window. The precise timing platform may also provide scalability: customers can add additional client devices anywhere where the cloud exchange fabric 10 infrastructure is set and available for customers. The precise timing platform may also provide statistics on clock drift and access to the service historic data.

The precise timing platform may also provide highly-available, fault tolerant, horizontally scalable monitoring and synchronizes device clocks with accuracy and precision. The results of synchronization are stored in a distributed redundant database. These proprietary technologies are used to optimize device authentication. They allow for parametric tune up and the ranking of devices and connections.

In some examples, the precise timing platform provides a clock synchronization and monitoring solution targeting edge computing applications and built based on colocation infrastructure that support high performance, network reliability, redundancy, and low latency.

In the example of FIG. 1, system 1 includes a cloud exchange fabric 10, which may connect multiple autonomous systems (not shown), one or more of master device 4, computing device 5, and/or leaf nodes 6, in accordance with example aspects of the techniques of this disclosure. In some examples, cloud exchange fabric 10 may be a Multiprotocol Label Switching (MPLS) network.

In general, an interconnection platform provides customers of the exchange, e.g., enterprises, network carriers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. A cloud exchange allows private networks of any customer to be directly cross-connected to any other customer at a common point, thereby allowing direct exchange of network traffic between the networks of the customers. Customers may include network carriers (or network service providers), enterprises, and other users of cloud services offered by one or more cloud service providers.

A cloud-based services exchange, or "cloud exchange" may be configured and managed to facilitate virtual connections for cloud services delivery from multiple cloud service providers to one or more cloud customers. The cloud exchange may enable cloud customers to bypass the public Internet to directly connect to cloud services providers to improve performance, reduce costs, increase the security and privacy of the connections, and leverage cloud computing for additional applications. In this way, enterprises, network carriers, and SaaS customers, for instance, can integrate cloud services with their internal applications as if such services are part of or otherwise directly coupled to their own data center network. Examples of cloud-based services exchanges are described in U.S. Pat. No. 9,948,552, issued Apr. 17, 2018 and entitled "CLOUD-BASED SERVICES EXCHANGE;" and in U.S. Pat. No. 9,886,267, issued Feb. 6, 2018, and entitled "INTERCONNECTION PLATFORM FOR REAL-TIME CONFIGURATION AND MANAGEMENT OF A CLOUD-BASED SERVICES EXCHANGE;" the entire contents of each of which being incorporated by reference herein.

In some examples, cloud exchange fabric 10 may be part of a cloud-based services exchange that includes interconnection assets configured to connect a customer of the cloud-based services exchange to one or more cloud service providers (CSPs), the plurality of interconnection assets including a virtual circuit by which the customer (e.g., an enterprise customer) accesses a cloud service from a CSP. Cloud exchange fabric 10 may also include an orchestration engine (not shown) configured to modify the interconnection assets.

In some examples, an interconnection platform for cloud exchange fabric 10 exposes a collection of software interfaces, e.g., application programming interfaces (APIs), that allow access to capabilities and assets of the interconnection platform in a programmable fashion. As such, the software interfaces provide an extensible framework that allows software developers associated with customers and partners of the exchange to build software applications that access the interconnection platform that automatically manage interconnection with multiple cloud service providers participating in the interconnection platform. In other words, developers from network services providers, cloud service providers, managed service providers and other enterprises may use the software interfaces exposed by the interconnection platform and defined by the APIs to build custom applications and frameworks for seamless interaction with the interconnection platform to facilitate the delivery of cloud services from cloud service providers to cloud service customers. These software interfaces defined by the APIs enable machine-to-machine communication for near real-time setup and modifications of interconnections, and may also eliminate or reduce the need for human interaction for the entire interconnection setup and management process. In this way, the software interfaces provide an automated and seamless way to establish, un-install, and manage interconnection with multiple cloud providers participating in an interconnection platform.

In some examples, several master devices may be connected to one another via cloud exchange fabric 10. In some examples, cloud exchange fabric 10 connects grand master device to master devices. Leaf-to-leaf connections may likewise be made via cloud exchange fabric 10. For example, in the example of FIG. 1, leaf node 6A may connect to leaf node 6B via cloud exchange fabric 10. Cloud exchange fabric 10 can connect customer's leaf node device to one or more master devices, including grand master device. Connecting master devices and leaf nodes via cloud exchange fabric 10 (e.g., by virtual circuits) may improve precision of time synchronization, including PTP-based time synchronization. Cloud exchange fabric 10 may improve resilience and reliability of the system. In other examples, rather than being connected to one another by virtual circuits via cloud exchange fabric 10, any of leaf nodes 6 and master device 4 may be interconnected by direct wire connections (e.g., cross-connects), metro-connection, fiber connect, or connected via the Internet. In some examples, these different types of connection options may be selectively configurable by a time synchronization system for synchronizing clock on one or more devices in a network such as time synchronization system 1.

Figure 2:
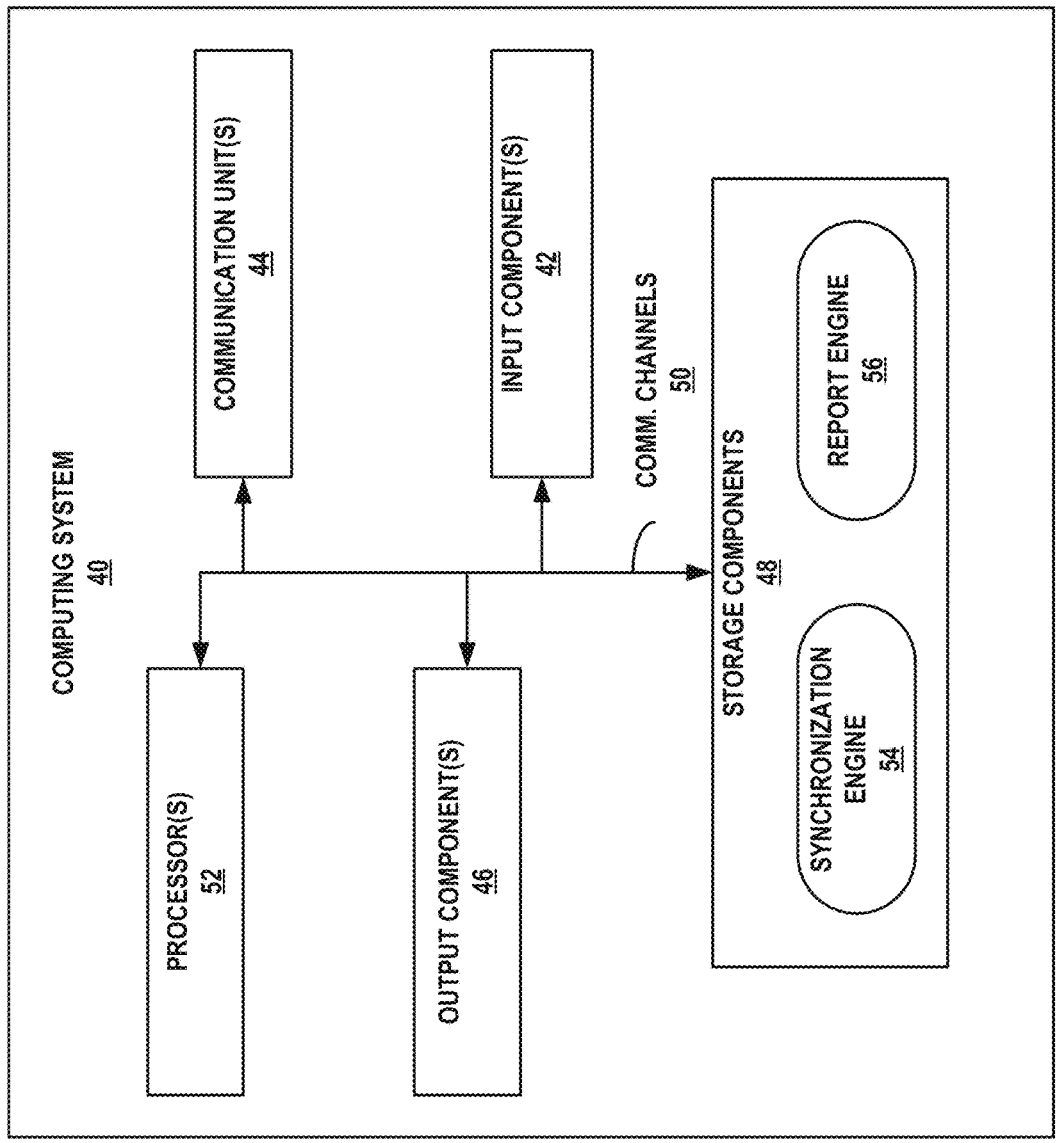
FIG. 2 is a block diagram of a more detailed view of a computing system that may be configured to perform one or more techniques in accordance with the current disclosure.

FIG. 2 is a block diagram of a more detailed view of a computing system 40 that may be configured to perform one or more techniques in accordance with the current disclosure. Computing system 40 of FIG. 2 is described below as an example of computing system 5 of FIG. 1. FIG. 2 illustrates only one example of computing system 5 of FIG. 1, and many other examples of computing system 5 of FIG. 1 may be used in other instances and may include a subset of the components included in example computing system 40 or may include additional components not shown in example computing system 40 of FIG. 2. In some examples, computing system 40 may be an example of grand master device 4.

As shown in the example of FIG. 2, computing system 40 includes one or more processors 52, one or more input components 42, one or more communication units 44, one or more output components 46, and one or more storage components 48. Storage components 48 of computing system 40 include emulation module 4 and modulation module 6. Communication channels 50 may interconnect each of the components 42, 44, 46, 48, 52, and 54 for inter-component communications (physically, communicatively, and/or operatively). In some examples, communication channels 50 may include a system bus, a network connection, an inter-process communication data structure, or any other method for communicating data.

One or more communication units 44 of computing system 40 may communicate with external devices, such as GPS 2 or leaf nodes 6 of FIG. 1, via one or more wired and/or wireless networks by transmitting and/or receiving network signals on the one or more networks. Examples of communication units 44 include a network interface card (e.g., such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

One or more input components 42 of computing system 40 may receive input. Examples of input are tactile, audio, and video input. Input components 42 of computing system 40, in one example, includes a presence-sensitive input device (e.g., a touch sensitive screen, a PSD), a mouse, a keyboard, a voice responsive system, a video camera, a microphone or any other type of device for detecting input from a human or machine. In some examples, input components 42 may include one or more sensor components, one or more location sensors (e.g., GPS components, Wi-Fi components, cellular components), one or more temperature sensors, one or more movement sensors (e.g., accelerometers, gyros), one or more pressure sensors (e.g., barometers), one or more ambient light sensors, and one or more other sensors (e.g., microphones, cameras, infrared proximity sensors, hygrometers, and the like).

One or more output components 46 of computing system 40 may generate output. Examples of output include tactile, audio, and video output. Output components 46 of computing system 40, in one example, includes a PSD, a sound card, a video graphics adapter card, a speaker, a cathode ray tube (CRT) monitor, a liquid crystal display (LCD), or any other type of device for generating output to a human or machine.

One or more processors 52 may implement functionality and/or execute instructions associated with computing system 40. Examples of processors 52 include application processors, display controllers, auxiliary processors, one or more sensor hubs, and any other hardware configure to function as a processor, a processing unit, or a processing device. Synchronization engine 54 and/or report engine 56 may be operable by processors 52 to perform various actions, operations, or functions of computing system 40. For example, processors 52 of computing system 40 may retrieve and execute instructions stored by storage components 48 that cause processors 52 to perform the operations of synchronization engine 54 and/or report engine 56. The instructions, when executed by processors 52, may cause computing system 40 to store information within storage components 48.

One or more storage components 48 within computing system 40 may store information for processing during operation of computing system 40 (e.g., computing system 40 may store data accessed by synchronization engine 54 and/or report engine 56 during execution at computing system 40). In some examples, storage component 48 is a temporary memory, meaning that a primary purpose of storage component 48 is not long-term storage. Storage components 48 on computing system 40 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 48, in some examples, also include one or more computer-readable storage media. Storage components 48 in some examples include one or more non-transitory computer-readable storage media. Storage components 48 may be configured to store larger amounts of information than typically stored by volatile memory. Storage components 48 may further be configured for long-term storage of information as non-volatile memory space and retain information after power on/off cycles. Examples of non-volatile memories include magnetic hard discs, optical discs, floppy discs, flash memories, forms of electrically programmable memories (EPROM), or electrically erasable and programmable (EEPROM) memories. Storage components 48 may store program instructions and/or information (e.g., data) associated with synchronization engine 54 and/or report engine 56. Storage components 48 may include a memory configured to store data or other information associated with synchronization engine 54 and/or report engine 56.

Synchronization engine 54 may receive, from a global positioning system, signals indicating a time, and may convert the received signals into a timestamp and send a data packet including the timestamp. Using this timestamp, synchronization engine 54 may synchronize the clock on a master device with the timestamp.

In accordance with the techniques of this disclosure, computing system 40 may evaluate network conditions of the network to determine whether to perform a time synchronization process with a secondary device in the network. In some examples, the network conditions include bandwidth usage for the network. In such examples, evaluating the network conditions includes synchronization engine 54 determining whether the bandwidth usage for the network is above a bandwidth threshold for the network. Responsive to determining that the bandwidth usage for the network is above the bandwidth threshold, synchronization engine 54 may determine to refrain from performing the time synchronization process with the secondary device (e.g., until the bandwidth usage falls below the bandwidth threshold and/or for a configured time period). Conversely, responsive to determining that the bandwidth usage for the network is below the bandwidth threshold, synchronization engine 54 may determine to perform the time synchronization process with the secondary device.

Synchronization engine 54 may also send time synchronization offsets periodically, either at particular times of the day or after a particular amount of time has passed. In order to develop this schedule, synchronization engine 54 may analyze bandwidth usage trends over time for the network to determine if there is a relationship between certain times and the bandwidth usage being below the bandwidth threshold. Once a schedule is determined such that it is likely the bandwidth usage is below the bandwidth threshold at the time synchronization engine 54 is to send the time synchronization offsets, synchronization engine 54 may set, based on the bandwidth usage trends, a time synchronization frequency indicating a frequency at which to send subsequent time synchronization offsets to the secondary device.

In another instance, the network conditions may include a device health for the secondary device. In such examples, evaluating the network conditions includes synchronization engine 54 determining whether the device health for the secondary device is satisfactory. Responsive to determining that the device health for the secondary device is satisfactory, synchronization engine 54 may determine to send the time synchronization offset for the secondary device to the secondary device. Conversely, responsive to determining that the device health for the secondary device is not satisfactory, synchronization engine 54 may determine to refrain from performing the time synchronization process with the secondary device.

Based on the evaluation of the network conditions, synchronization engine 54 may determine, based at least in part on a time indication for a clock on the master device and a time indication for a clock on the secondary device, the time synchronization offset for the secondary device. Synchronization engine 54 may then utilize communication unit 44 to send the time synchronization offset for the secondary device to the secondary device in a data packet.

At a later time, synchronization engine 54 may evaluate subsequent network conditions of the network to determine whether to perform the time synchronization process with the secondary device. Based on the evaluation of the subsequent network conditions indicating a weakness in the network, synchronization engine 54 may determine to refrain from performing the time synchronization process with the secondary device.

In some instances, either in addition to performing the network condition check or without performing the network condition check, synchronization engine 54 may aggregate multiple time synchronization offsets across multiple secondary devices in the network. In such instances, the time synchronization offset may be a universal time synchronization offset. For each secondary device of the plurality of secondary devices, synchronization engine 54 may determine, based at least in part on the time indication for the clock on the master device and a time indication for a clock on the respective secondary device in the network, a respective time synchronization offset for the respective secondary device and collect one or more parameters for the respective secondary device. Synchronization engine 54 may either collect these parameters directly from the respective secondary device or from a repository that stores parameters for the respective secondary device (e.g., a different device that performs the collection process and stores the parameters in a database, or from a database that includes user-entered parameters about each respective secondary device). Synchronization engine 54 may then determine a weight for the respective secondary device based on the one or more parameters collected from the respective secondary device. After the various time synchronization offsets are determined and the respective weights are calculated, synchronization engine 54 may calculate, based on the respective time synchronization offset for each secondary device of the plurality of secondary devices and the respective weight for each secondary device of the plurality of secondary devices, the universal time synchronization offset for the network. Synchronization engine 54 may then send the universal time synchronization offset for the network to each secondary device of the plurality of secondary devices.

In some examples, in determining the weight for each secondary device, synchronization engine 54 may determine a respective score for each of the one or more parameters for the respective secondary device. Synchronization engine 54 may use the determined scores to determine the weight for the respective secondary device. The one or more parameters may be either static or dynamic parameters, and at least one of the one or more parameters indicates an operational health of the secondary device. For instance, static parameters for the secondary device could include an operating system version, a processor model, a processor number, a network interface model, a model of a hardware component of the secondary device, a version of firmware installed on the secondary device, and/or a version of software installed on the secondary device. Meanwhile, dynamic parameters for the secondary device could include a total time the secondary device is in service for a particular period of time, an average temperature of the secondary device for the particular period of time, an average processing load of the secondary device for the particular period of time, an average network load between the secondary device and a second secondary device of the plurality of secondary devices for the particular period of time, an average processor idle time for the secondary device for the particular period of time, and/or a performance metric of the secondary device.

In some examples, synchronization engine 54 may filter individual scores from the weight calculation. For instance, synchronization engine 54 may remove a respective score for a parameter from consideration for determining the weight when the respective score for the parameter is an outlier in an expected distribution of scores for the parameter. The expected distribution may be a typical statistical distribution with outliers determined by using standard deviations as a difference between the actual score and the mean score for the parameter across the network.

Synchronization engine 54 may also alter the scores for the parameters if the score is outside of an acceptable range for the parameter. For instance, synchronization engine 54 may alter a value of the score for a parameter to set the score at a value corresponding to a maximum score when the score is greater than the maximum score, or alter a value of the score for the parameter to set the score at a value corresponding to a minimum score when the score is less than the minimum score. For example, if the parameter is a temperature of the device, and the device is currently 100° F., but the synchronization engine only recognizes a maximum of 85° F. when determining scores for the parameters, synchronization engine 54 may instead assign a value of 85° F. to the temperature parameter for the secondary device when determining the score. Similarly, if the device is currently 50° F., but the synchronization engine only recognizes a minimum of 55° F., synchronization engine 54 may instead assign a value of 55° F. to the temperature parameter for the secondary device when determining the score.

In addition to, or in place of, the device-specific parameters described above, the parameters for the respective device may also describe connections, clusters, or networks associated with the secondary device. In such instances, synchronization engine 54 may determine one or more health scores for the respective secondary device based on the one or more parameters for the respective secondary device. Synchronization engine 54 may determine the weight for the respective secondary device based on the one or more health scores, either in combination with or in place of the device-specific scores determined above. The health scores may include a health score for a connection between the respective secondary device and the master device, a health score for each connection between the respective secondary device and any other secondary device in the plurality of secondary devices, a health score for a cluster within the network that includes the respective secondary device, or a health score for the entire network. In some examples, "connections" may include one or more network links.

As described in greater detail below with respect to FIG. 6, in some examples, synchronization engine 54 may classify each of the one or more health scores as a multiplicative health score or an additive health score. Synchronization engine 54 may apply a statistical function (e.g., an average function, a minimum function, a maximum function, or a medium function) to health scores classified as additive health scores, while determining a mathematical product of the health scores classified as multiplicative health scores. Synchronization engine 54 may then determine a final health score by multiplying the mathematical product of the multiplicative health scores by an output of the statistical function of the additive health scores. Synchronization engine 54 may then determine the weight based on the final health score.

As part of the universal time synchronization offset determination, synchronization engine 54 may rank each of the secondary devices in the plurality of secondary devices, using only a particular number of the time offsets with the highest or lowest weights. In such examples, synchronization engine 54 may dynamically track these weights and re-rank the secondary devices when one or more of the weights changes by a threshold amount, such as a percentage of the original value for the weight (e.g., 5%, 15%, 20%, 30%, 50%, etc.).

After determining each of the weights, and prior to calculating the universal time synchronization offset, synchronization engine 54 may filter each of the individual time synchronization offsets where the secondary device has a respective weight fails to satisfy a threshold weight to generate a filtered set of one or more time synchronization offsets. For instance, if the weights are below a minimum weight or above a maximum weight for the system, synchronization engine 54 may remove the associated time offsets from consideration when determining the universal time synchronization offset. Synchronization engine 54 may then determine the universal time synchronization offset based on the filtered set of one or more time synchronization offsets and their associated weights.

Synchronization engine 54 may also use classes of offsets when determining the universal time synchronization offset. For instance, based either on the time synchronization offset itself or the weight, synchronization engine 54 may classify each time synchronization offset into a respective offset class of a plurality of offset classes. Synchronization engine 54 may then determine a class rank for each of the plurality of offset classes and compute an aggregated offset for each of the plurality of offset classes. In some examples, synchronization engine 54 computes the aggregated offset as an approximation using one of a linear function or a non-linear function. Based on the aggregated offsets and the class ranks for the plurality of offset classes, synchronization engine 54 may then determine the universal time synchronization offset.

In some examples, determining the weight for the respective secondary device includes synchronization engine 54 determining the weight for the respective secondary device based on the amount of time the secondary device has been connected to the network. In some instances, synchronization engine 54 may filter the respective secondary device from the universal time synchronization offset calculation if the respective time synchronization offset is a statistical outlier when compared to a distribution of time synchronization offsets for a remainder of the secondary devices. In other instances, synchronization engine 54 may filter the respective secondary device from the universal time synchronization offset calculation if the respective secondary device has not yet received an instance of the universal time synchronization offset from the master device since the secondary device joined the network.

In some examples, the network includes a plurality of clusters, where a master device is located in a first cluster of the plurality of clusters, and where the secondary device is located in a second cluster of the plurality of clusters. In some instances of such examples, the secondary device may be a secondary master device for the second cluster, where the secondary master device controls dissemination of the time synchronization offset to one or more user devices in the second cluster, and synchronization engine 54 may send or refrain from performing the time synchronization process based on network conditions for the second cluster. The network conditions for the second cluster may include network conditions for a link connecting the first cluster and the second cluster, or network conditions of the LAN for the second cluster itself.

In other instances where the network includes a plurality of clusters, the secondary device may be a user device in the same cluster as the master device. In still other instances where the network includes a plurality of clusters, the secondary device may be a secondary master device in the same cluster as the master device, where the secondary master device controls dissemination of the time synchronization offset to one or more user devices in the cluster.

In accordance with the techniques described herein, report engine 56 may generate a time synchronization report using any of the offset, timestamp, or health information determined above by synchronization engine 54. For instance, report engine 56 determines, for each secondary device of one or more secondary devices in a network, one or more time synchronization characteristics for the respective secondary device. The one or more time synchronization characteristics may be any characteristics that are descriptive of a secondary device, a state of an end device, or a state of a synchronization process for the secondary device, such as health data, timestamp data, and offset data, among other things. In some examples, the master device comprises a device with a geographic proximity to a user that is closer than a geographic proximity of any of the one or more secondary devices.

In determining the one or more time synchronization characteristics, report engine 56 may, for a first secondary device of the one or more secondary devices, perform an authentication process with the first secondary device to determine whether the first secondary device is an approved secondary device. In response to determining that the first secondary device is an approved secondary device, report engine 56 determines the one or more time synchronization characteristics for the first secondary device. Conversely, for a second secondary device of the one or more secondary devices, report engine 56 may perform the authentication process with the second secondary device to determine whether the second secondary device is an approved secondary device. In this instance, in response to determining that the second secondary device is not an approved secondary device, report engine 56 refrains from determining the one or more time synchronization characteristics for the second secondary device. The authentication process may include report engine 56 requesting a valid synchronization license from the respective secondary device. If report engine 56 receives a valid synchronization license, then report engine 56 may determine that the respective secondary device is an approved secondary device. Conversely, if report engine 56 does not receive a valid synchronization license, report engine 56 may determine that the respective secondary device is not an approved secondary device.

Report engine 56 then generates a time synchronization report for the network based on at least the respective one or more time synchronization characteristics for each respective secondary device of the one or more secondary devices in the network. In some examples, the time synchronization report may be one or more of a historical report over a period of time or a current report.

Report engine 56, in some instances, may output for display on a display device (e.g., one of output components 46), a graphical indication of the time synchronization report. The graphical indication could be any visual item that depicts the one or more time synchronization characteristics in a way that is understandable to the user, such as with a graphical output or a textual output. Report engine 56 may also modify the graphical indication by modifying a visual characteristic of the graphical indication, such as one or more of a resolution, a chart type, and a device status.

In some examples, the time synchronization report can also include information about the network itself, such as network load data. In such examples, report engine 56 determines network load data for the network and includes the network load data for the network in the time synchronization report.

In some instances, the time synchronization report includes only a raw, unaltered representation of the one or more time synchronization characteristics determined from the secondary devices. In other instances, report engine 56 calculates, based on the one or more time synchronization characteristics for each secondary device, a statistical representation of the time synchronization characteristics. The statistical representation may be one or more of a moving average of the characteristic, a momentum of the characteristic, a median of the characteristic, one or more quantiles of the characteristic, a histogram of the characteristic, and a standard deviation of the characteristic. Report engine 56 then includes the statistical representation in the time synchronization report.

In still other instances, report engine 56 may perform additional operations on the one or more time synchronization characteristics for each of the one or more secondary devices, such as by normalizing the time synchronization characteristics or by scaling the time synchronization characteristics. In such instances, report engine 56 may further include the normalized and/or scaled time synchronization characteristics for each of the one or more secondary devices in the time synchronization report.

Report engine 56 may further arrange the output of the such that all devices in a particular geolocation or cluster are grouped together in the time synchronization report. In other words, report engine 56 may group the one or more secondary devices into cluster groups based on a geolocation of the respective secondary device. As such, the time synchronization report includes the one or more time synchronization characteristics arranged by the cluster groups that include the secondary device associated with the respective one or more time synchronization characteristics. In this way, report engine 56 may output the time synchronization report in such a way that it is easily discernible which secondary device is in each geolocation, emphasizing any problems that may be the result of a broader network issue at the geolocation.

In some examples, the one or more time synchronization characteristics may include a device status and a second time synchronization characteristic. In such examples, report engine 56 may only include, in the time synchronization report, the second time synchronization characteristic for respective secondary devices of the one or more secondary that has a device status that matches a particular device status. In this way, report engine 56 may generate more specific time synchronization reports for only secondary devices with specific statuses, such as active monitoring, active synchronization, inactive, or active no-monitoring.

In examples where the time synchronization report is a historical report over a period of time, report engine 56 may compare a statistical representation of the one or more time synchronization characteristics for each of the one or more secondary devices to a threshold statistic. In response to determining that the statistical representation fails to meet the threshold statistic, report engine 56 may alter the length of the period of time included in the time synchronization report. For instance, if the standard deviation of the characteristic across the secondary devices over time is too large, report engine 56 may increase the period of time such that the variance of the characteristic decreases due to the larger sample size.

In some examples, report engine 56 may use flags set by user input to determine whether to perform the monitoring process, the synchronization process, or both processes. For instance, report engine 56 may determine, based on a first flag received in a first indication of user input, whether to perform a monitoring process. Report engine 56 may also determine, based on a second flag received in a second indication of user input, whether to perform a synchronization process.

In some examples, the network may include multiple master devices. In such examples, for each secondary device of the one or more secondary devices, report engine 56, or some other controlling device in the network, may determine whether the geolocation of the respective secondary device is closer to the geolocation of a first master device or the geolocation of a second master device, as it may be more efficient to have the secondary devices be as close in proximity as possible to the master device responsible for monitoring the secondary device. As such, in response to determining that the geolocation of the respective secondary device is closer to the geolocation of the first master device, report engine 56, or some other controlling device in the network, may assign the respective secondary device to the first master device. Conversely, in response to determining that the geolocation of the respective secondary device is closer to the geolocation of the second master device, report engine 56, or some other controlling device in the network, may assign the respective secondary device to the second master device.

This assignment process may be repeated if new master devices are introduced into the network. For instance, report engine 56 may receive an indication of a third master device introduced into the network. As such, for each secondary device of the one or more secondary devices, report engine 56, or some other controlling device in the network, may determine whether the geolocation of the respective secondary device is closer to the geolocation of the first master device, the geolocation of the second master device, or the geolocation of the third master device. In response to determining that the geolocation of the respective secondary device is closer to the geolocation of the first master device, report engine 56, or some other controlling device in the network, may assign the respective secondary device to the first master device. Conversely, in response to determining that the geolocation of the respective secondary device is closer to the geolocation of the second master device, report engine 56, or some other controlling device in the network, may assign the respective secondary device to the second master device. Otherwise, in response to determining that the geolocation of the respective secondary device is closer to the geolocation of the third master device, report engine 56, or some other controlling device in the network, may assign the respective secondary device to the third master device.

Report engine 56, or some other controlling device in the network, may also redistribute the secondary devices if one master device is monitoring more secondary devices than another master device. For instance, report engine 56, or some other controlling device in the network, may compare a number of secondary devices assigned to the first master device to a number of secondary devices assigned to the second master device. In response to determining that the number of secondary devices assigned to the second master device is greater than the number of secondary devices assigned to the first master device, report engine 56, or some other controlling device in the network, may reassign secondary devices from the second master device to the first master device, and may continue doing so until the number of secondary devices assigned to the first master device is less than or equal to the number of secondary devices assigned to the second master device. In reassigning the secondary devices, report engine 56 may select the secondary devices assigned to the second master device and with a geolocation closest to the geolocation of the first master device as the secondary devices to be reassigned to the first master device.

In examples where the one or more time synchronization characteristics include offset data, report engine 56 may, for each secondary device of the one or more secondary devices, track a momentum of the offset data for the respective secondary device over time. Report engine 56 may then receive a request for a second time synchronization report. In response to receiving this request, for each secondary device of the one or more secondary devices, report engine 56 may calculate, based on the momentum of the offset data of the respective secondary device, the offset data of the respective secondary device, and a timestamp of a most recent communication with the respective secondary device, a current offset of the respective secondary device. Report engine 56 may also calculate, based on the current offset of the respective secondary device and a current timestamp of the master device, a current timestamp of the respective secondary device. Using this information, report engine 56 may generate the second time synchronization report, where the second time synchronization report includes the current timestamp of each secondary device of the one or more secondary devices. As such, report engine 56 may predict these characteristics for the secondary devices without having to send requests to each secondary device when generating the time synchronization report, reducing the overall traffic and amount of data exchanged over the network.

Figure 3:
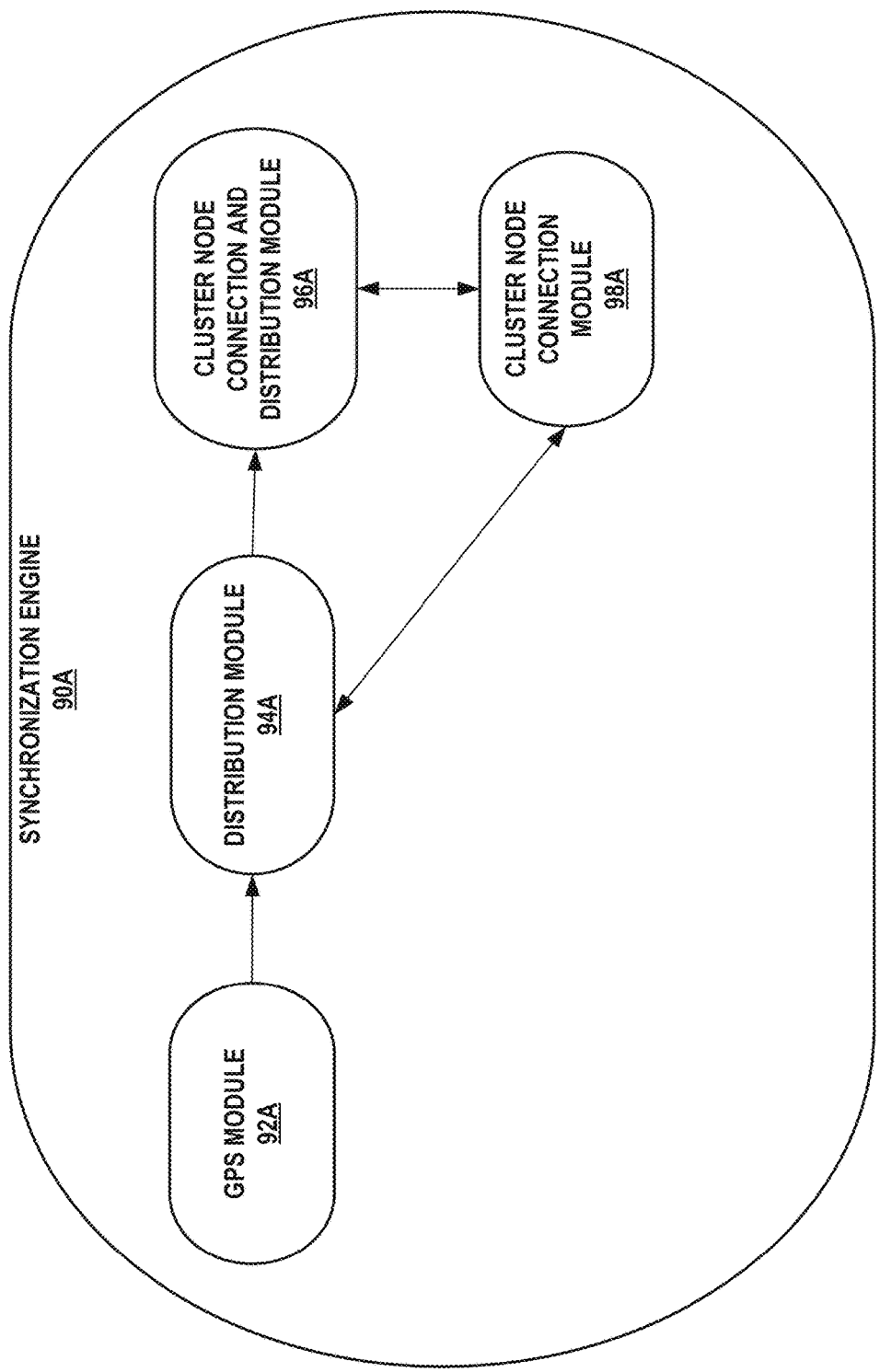
FIG. 3 is a conceptual diagram illustrating an example architecture of a synchronization engine configured to perform one or more techniques in accordance with the current disclosure.

FIG. 3 is a conceptual diagram illustrating an example architecture of a synchronization engine 90A configured to perform one or more techniques in accordance with the current disclosure. Synchronization engine 90A of FIG. 3 is described below as an example of synchronization engine 54 of FIG. 2. FIG. 3 illustrates only one particular example of synchronization engine 54, and many other examples of synchronization engine 54 may be used in other instances and may include a subset of the components included in example synchronization engine 90A or may include additional components not shown in example synchronization engine 90A of FIG. 3.

Synchronization engine 90A includes GPS module 92A, distribution module 94A, cluster node connection, distribution module 96A, and cluster node connection module 98A. The functionality of each is described below.

GPS module 92A may receive precise time signals from a satellite using a special GPS antenna and a set of special hardware devices that convert satellite signals into a sequence of timestamps. GPS module 92A may process the timestamps and forward the timestamps to distribution module 94A.

GPS module 92A may connect with one or more of the precision time generating satellites, register timestamps, reformat timestamps by one or more standard protocols, and forward the standardized timestamp sequences to distribution module 94A.

In one example, GPS module 92A may receive a time signal with a GPS antenna, then forward the time signal to a master switch. The master switch may register timestamps and forward the timestamp sequence to the connected PTP and NTP switches.

GPS module 92A may send data to distribution module 94A. The data may include protocol-formatted sequences of timestamps, such as NTP, PTP, or proprietary protocols.

Distribution module 94A may receive protocol-formatted timestamps from GPS module 92A. Distribution module 94A may further distribute timestamps between master devices, collect information from other modules on the quality of timestamps (e.g., precision and accuracy), make determinations on timestamp synchronization, and communicate with cluster node connection and distribution module 96A.

Distribution module 94A may include a device knowledgebase data store and a timestamps distribution manager (not shown). The device knowledgebase data store may manage information about served devices. Each device may be defined by a set of parameters, including device ID, device type, device state, device geolocation, device ranking metrics, and device's history of previous synchronizations.

The device ID may be a unique identifier of the device. In one example, the device ID may include a device internet protocol (IP) address and automatically generated authorization keys. The device state can be active or inactive. Inactive devices are typically excluded from the synchronization process.

Geolocation defines the geographical position of the device. In one example, geolocation is defined by altitude and amplitude of the device. In one example, geolocation is defined by device location ID, such as zip code of the collocation center in which the device is located, or collocation center ID.

The geolocation of the device enables distribution module 94A to recognize and implement the clustering construct of example networks described herein. Each master device may be associated with a set of other devices located in near proximity to it. They represent a cluster of devices. All devices in a single cluster are called local devices.

The device ranking metric is a function that assigns a value to the device's intrinsic quality to the time synchronization process. A device can have very accurate timing with little or no precision spikes. In such a case, its rank may be high. Devices with low precision timing may have a low ranking.

In one example, the device ranking metric is the same for all devices. In another example, the device ranking metric is defined by normalized weight coefficients based on average the deviation of the device management. In one example, device ranking is dynamically updated based on device and network load. The device's history of previous synchronizations is a set of accepted synchronization timestamps for the device for a certain period.

Distribution module 94A may perform multiparametric device description, dynamic device ranking, provide the capability of dynamic device reconnection, and use device rankings in timestamp distribution decision process. Distribution module 94A may receive formatted timestamps from GPS module 92A, timestamp data from cluster node connection and distribution module 96A, and cluster node connection data from cluster node connection module 98A.

By processing signals and data from other modules, distribution module 94A may collect data from system state estimation devices, evaluate system health, dynamically adjust device ranking, and generate time clock adjustment requests for master and end devices, both in local clusters and between clusters.

In one example, distribution module 94A aggregates timestamp offsets for different master devices using device ranks and proximity. In another example, distribution module 94A modifies device ranks based on an average number of synchronization actions over a fixed period. In another example, distribution module 94A may receive offset for different remote clusters and offsets for cross-cluster master device clocks.

In one example, master and end devices are in remote clusters relative to one another. Cluster node connection and distribution module 96A may distribute timestamps between different clusters based on the device knowledgebase from distribution module 94A.

Distribution module 94A may send data to cluster node connection and distribution module 96A. The data may include protocol-formatted sequences of filtered timestamps (e.g., formatted according to PTP, NTP, or other protocol). Distribution module 94A may also send data to cluster node connection module 98A. This data may include a list of devices and their parameters.

Cluster node connection and distribution module 96A may receive protocol-formatted timestamps from distribution module 94A, as well as recommendations for cluster node connections from cluster node connection intelligence module 98A. Cluster node connection and distribution module 96A may process data from distribution module 94A related to the system's device clusters, process timestamp offsets from cluster node connection module 98A, and distribute cluster node timestamp offsets for the appropriate master devices.

In one example, the system may have two node clusters. Each node cluster has a set of master and end devices. Two cross-cluster master devices may be used to synchronize timestamps between two node clusters. Cluster node connection and distribution module 96A may distribute timestamp offsets between two clusters using cross-cluster master devices. When distribution is finished, it returns the signal and control base to the distribution module 94A.

Cluster node connection and distribution module 96A may control and dynamically change cross-cluster master device connections and control the cross-cluster synchronization process. Cluster node connection and distribution module 96A is responsible for cross-cluster clock synchronization. Cluster node connection and distribution module 96A may receive information from distribution module 94A about the system. Cluster node connection and distribution module 96A may also receive cross-cluster master device information from cluster node connection module 98A.

Cluster node connection and distribution module 96A may process the provided information and distribute timestamp offsets to cross-cluster master devices. When timestamps are synchronized, cluster node connection and distribution module 96A may aggregate this information and forwards the aggregated information to distribution module 94A.

Cluster node connection and distribution module 96A may send data to distribution module 94A. The data may include a notification of synchronization executions and cross-cluster timestamp offsets. Cluster node connection and distribution module 96A may also send data to cluster node connection module 98A. This data may include a map of the various clusters and a list of cross-cluster master devices.

Cluster node connection module 98A may establish, modify, and block connections between different cluster nodes. These connections may be established in synchronization systems with two or more cluster nodes.

Cluster node connection module 98A may receive protocol-formatted timestamps, an estimation of system health, and timestamp offsets for cross-cluster master devices from distribution module 94A.

Cluster node connection module 98A may process data from distribution module 94A, generate a decision on cross-cluster timestamp synchronization based on received data, adjust (e.g., recalculate, re-compute) final cross-cluster master device timestamp offsets, forward the final offsets to cluster node connection and distribution module 96A, register a confirmation of timestamp synchronization from all cross-cluster master devices from cluster node connection and distribution module 96A, and reformat and forward confirmation data to distribution module 94A.

Cluster node connection module 98A may also determine intelligent decisions of synchronization for each cross-cluster master device with other cross-cluster master devices, aggregate cross-cluster timestamp offsets, and the aggregation's adjustment (re-computing) based on cross-cluster device ranks and cross-cluster network load.

Cluster node connection module 98A may be responsible for cross-cluster master device connections and cross-cluster master device timestamp offset adjustment based on aggregated data from distribution module 94A and cross-cluster device ranks.

In one example, the synchronization system may have two cluster nodes. Each cluster node may have a single master device. The first cluster node may be geolocated in proximity of GPS Module 92A. Such a cluster may be called a GPS-enabled cluster. The second node cluster may be geolocated outside of the proximity of GPS Module 92A.

GPS module 92A may allow the master device from the GPS-enabled cluster to be a source of precise timing. Distribution module 94A may provide cluster node connection module 98A with the data on the health of the synchronization system. In one example, such data includes a master device's state (e.g., active or inactive) and an estimation of network load. Distribution module 94A provides an estimated timestamp offset for the master device of the second cluster node. If both devices are active and the network load is low, cluster node connection module 98A transfers the timestamp offset to the cluster node connection and distribution module 96A to synchronize the second cluster node's cross-cluster master device and forward the request to distribution module 94A.

Cluster node connection module 98A may send data to distribution module 94A. The data may include a notification of the execution of cross-cluster master device synchronization and the cross-cluster timestamp offsets. Cluster node connection module 98A may also send data to cluster node connection and distribution module 96A. This data may include adjusted timestamp offsets for the cross-cluster master devices and synchronization orders.

Figure 4:
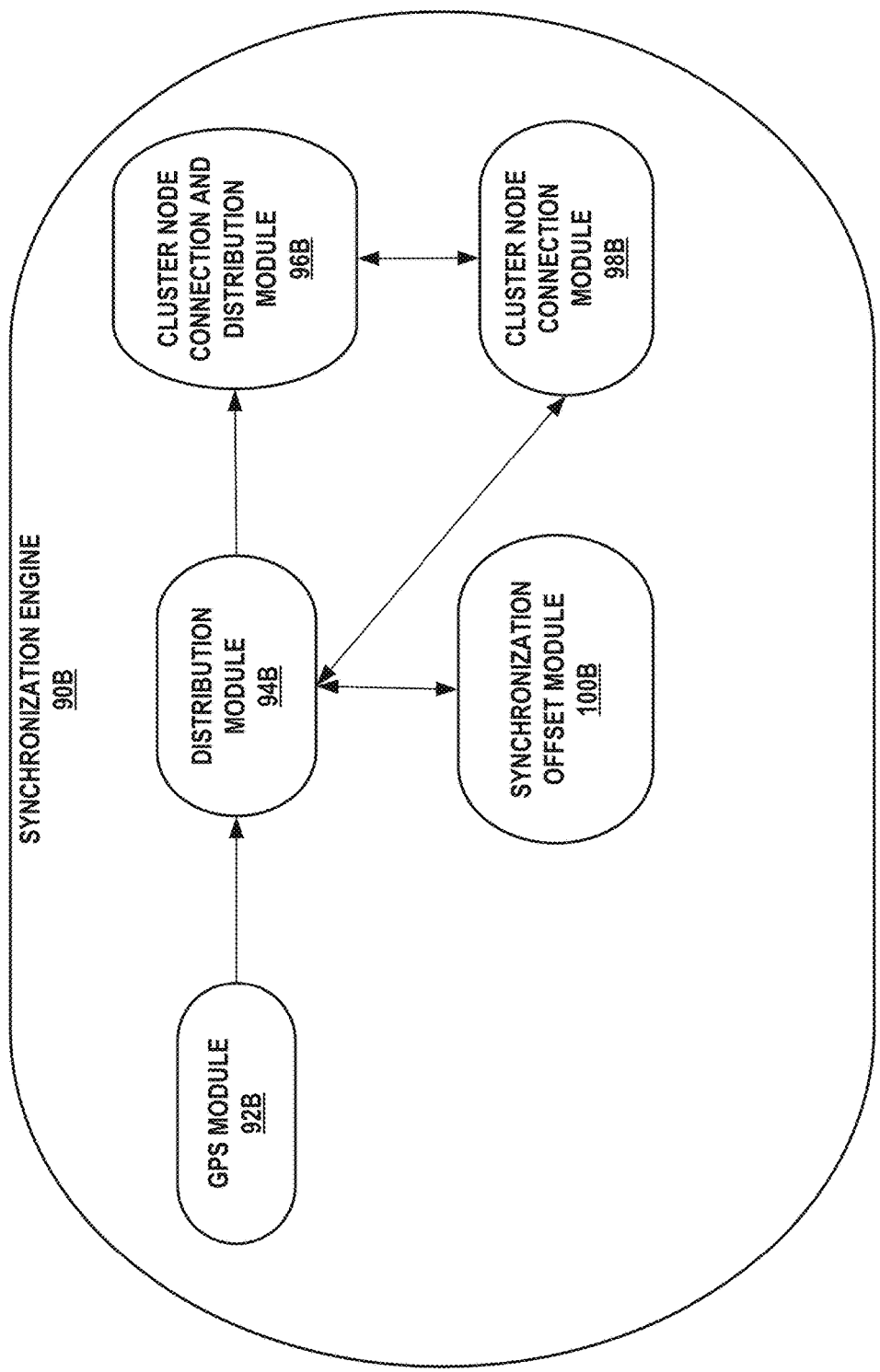
FIG. 4 is a conceptual diagram illustrating an example architecture of a synchronization engine configured to perform one or more techniques in accordance with the current disclosure.

FIG. 4 is a conceptual diagram illustrating an example architecture of a synchronization engine 90B configured to perform one or more techniques in accordance with the current disclosure. Synchronization engine 90B of FIG. 4 is described below as an example of synchronization engine 54 of FIG. 2. FIG. 4 illustrates one example of synchronization engine 54, and many other examples of synchronization engine 54 may be used in other instances and may include a subset of the components included in example synchronization engine 90B or may include additional components not shown in example synchronization engine 90B of FIG. 4.

Synchronization engine 90B of FIG. 4 may be similar to synchronization engine 90A of FIG. 3. For instance, GPS module 92B may include similar functionality to GPS module 92A of synchronization engine 90A, distribution module 94B may include similar functionality to distribution module 94A of synchronization engine 90A, cluster node connection and distribution module 96B may include similar functionality to cluster node connection and distribution module 96A of synchronization engine 90A, and cluster node connection module 98B may include similar functionality to cluster node connection module 98A of synchronization engine 90A. However, synchronization engine 90B may further include synchronization offset module 100B, which is not included in synchronization engine 90A.

Distribution module 94B may receive filtered data from synchronization offset module 100B. Distribution module 94B may send data to synchronization offset module 100B, the data may include a list of devices and their parameters.

Synchronization offset module 100B may filter timestamps. The filtering process may separate timestamps into good timestamps and outlier timestamps, calibrate and rank devices, and generate offsets for each timestamp. Synchronization offset module 100B may receive protocol-formatted timestamps and system health estimation from distribution module 94B.

Synchronization offset module 100B may process data from distribution module 94B, classify timestamps, calibrate devices, rank devices, compute offsets, pack data, and forward the packed data to distribution module 94B. Synchronization offset module 100B may also separate the filtering process into different steps (e.g., device calibration step, device ranking step, timestamp classification step, and offset generation step).

Synchronization offset module 100B may be responsible for the filtering of the timestamps. The filtering process may include the periodic calibration of devices, the ranking of devices, the updating of device ranks, the classification of timestamps, and the computation of offsets. In most general implementations Synchronization offset module 100B calibrates all devices of the system using a controlled network load between the devices. The calibration can be done once when a device is added to the system, or periodically. Based on the result of calibration, each device gets a special numerical value called the device rank. In one example, the lowest rank is 1, and the highest rank is 10, although this may also be reversed. The device ranks may be treated as a quality of the devices as they relate to time precision measurements. Ranks are treated as weight coefficients where the aggregation of the offset data as part of the filtering process. The lowest ranked devices may have less weight in the aggregation process.

One method of aggregation is averaging the offsets generated for each master/secondary device pair for each master device. This method may be beneficial if all secondary devices are homogeneous (similar).

In some examples, devices are different (e.g., different ages, different vendors) and can be ranked. When devices are ranked, the techniques described herein may use a weighted average as part of an aggregation procedure. In another example, the techniques described herein may use a median number to avoid low-rank device influence and that would work when more than half of the devices are precise.

When all devices are calibrated and ranked, synchronization offset module 100B may calculate timestamp offsets for each connected pair of devices. Numerous algorithms may be used for the timestamp offset computation. In one example, the timestamp offset is computed using regression analysis modeling. In another example, the timestamp offset may be computed using the support vector machine (SVM) technology. The time intervals for offset computation can be defined as a priori using the physical nature of clock jittering and bias physics, or dynamically based on quality synchronization.

When all necessary offsets are generated, synchronization offset module 100B may classify offsets into good offsets and outliers. Any of multiple different classification algorithms (quantiles, non-parametric) may be used. The outlier timestamp offsets may be ignored, and the rest of the timestamp offsets of the devices from the same cluster may be aggregated using one of the aggregation methods and weight coefficients derived from the device ranks. In the cluster, multiple pairs of devices can produce offset information. In one example, one master and three secondary devices may produce three pairs: master/secondary1, master/secondary2, and master/secondary3. This may result in three offset times o1, o2, o3. Aggregation can be averaging three offsets (o1+o2+o3)/3 or taking a median of (o1, o2, o3).

In one example, synchronization offset module 100B aggregates only timestamp offsets for each master device and its slave devices. In one example, synchronization offset module 100B aggregates timestamp offsets of several master devices, for instance, all master devices from the same cluster node. Filtered timestamp offsets and their classification, as well as device ranks, are forwarded back to distribution module 94B.

Synchronization offset module 100B may send data to distribution module 94B. This data may include timestamp offsets, timestamp offset classification IDs (e.g., good or outlier), and device ranks for each device.

Figure 5:
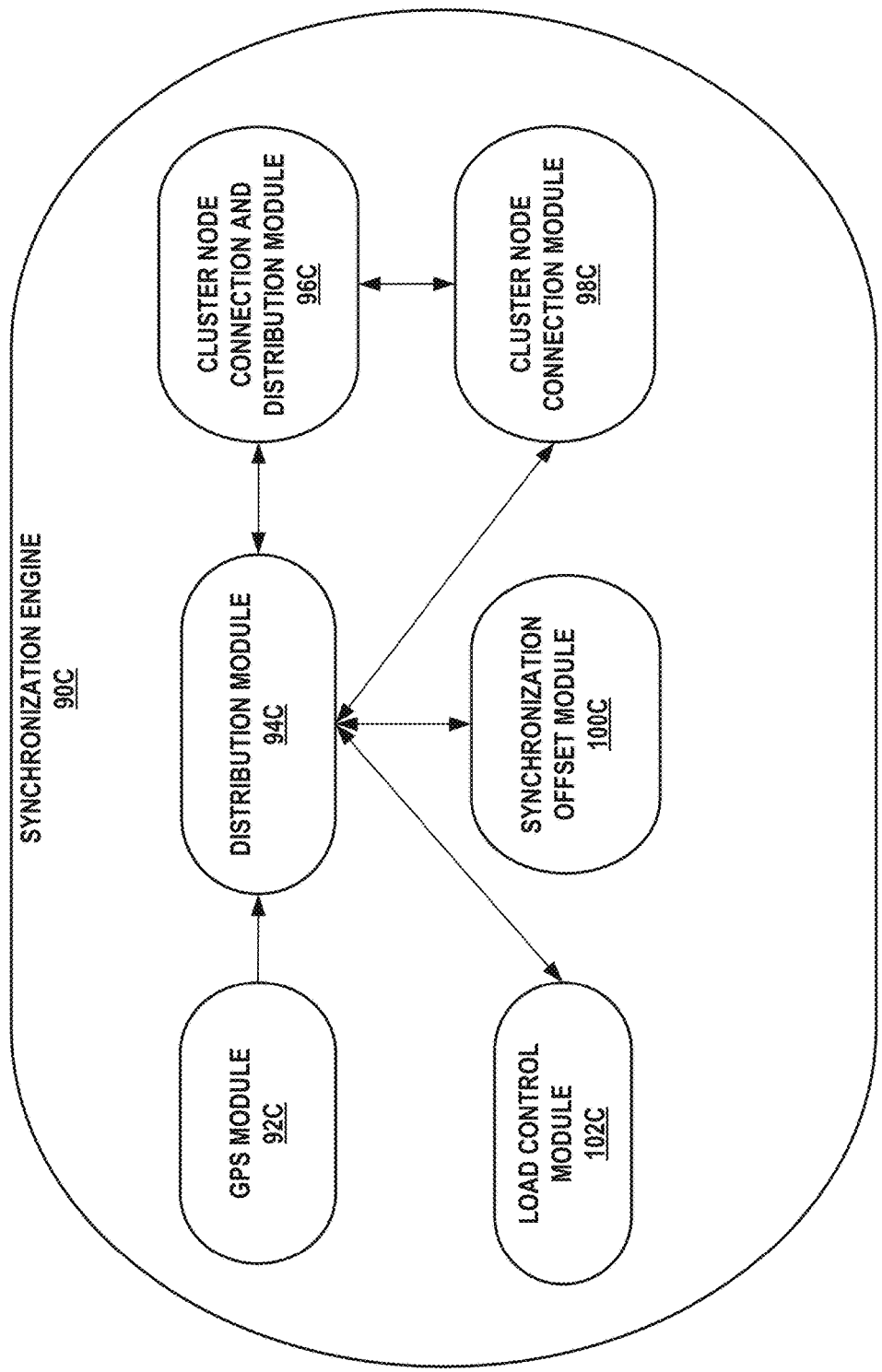
FIG. 5 is a conceptual diagram illustrating an example architecture of a synchronization engine configured to perform one or more techniques in accordance with the current disclosure.

FIG. 5 is a conceptual diagram illustrating an example architecture of a synchronization engine 90C configured to perform one or more techniques in accordance with the current disclosure. Synchronization engine 90C of FIG. 5 is described below as an example of synchronization engine 54 of FIG. 2. FIG. 5 illustrates only one particular example of synchronization engine 54, and many other examples of synchronization engine 54 may be used in other instances and may include a subset of the components included in example synchronization engine 90C or may include additional components not shown in example synchronization engine 90C of FIG. 5.

Synchronization engine 90C of FIG. 5 may be similar to synchronization engine 90B of FIG. 4. For instance, GPS module 92C may include similar functionality to GPS module 92B of synchronization engine 90B, distribution module 94C may include similar functionality to distribution module 94B of synchronization engine 90B, cluster node connection and distribution module 96C may include similar functionality to cluster node connection and distribution module 96B of synchronization engine 90B, cluster node connection module 98C may include similar functionality to cluster node connection module 98B of synchronization engine 90B, and synchronization offset module 100C may include similar functionality to synchronization offset module 100B of synchronization engine 90B. However, synchronization engine 90C may further include load control module 102C, which is not included in synchronization engine 90B.

Distribution module 94C may receive system load data from load control module 102C. In one example, distribution module 94C may check system load estimates from load control module 102C and time clock shift data for every master device from intelligent synchronization offset module 100A. If the load is too heavy, distribution module 94C does not make any clock offset request, and does not perform clock synchronization. For example, in response to determining the load is to heavy, the distribution module 94C does not send a time synchronization protocol message requesting timestamp data from a secondary device. When the load is low or normal, distribution module 94C uses filtered timestamps from intelligent synchronization offset module 100C to generate clock offsets for master devices.

In one example, distribution module 94C is making distribution actions, sending to every secondary device a synchronization offset if the network load is below a threshold based on network load bandwidth, such as due to data traffic and signaling messages. Distribution module 94C may send timestamp data to load control module 102C. Load control module 102C uses its pre-defined logic and returns, to distribution module 94C, the estimated network load and signal of distribution actions required.

In one example, load control module 102C may send a binary signal to distribution module 94C (e.g., a flag signal) to stop synchronization or to continue it. For instance, when the network is overloaded, the flag signal will allow distribution module 94C to stop timestamp synchronization before the load drops down to an acceptable level to avoid contributing to the network load with extra time synchronization messages. In addition, there may be different procedures that allow load control module 102C to estimate network load independently. For instance, the network load may be separately measured by a special procedure, such as a flag or a trigger. The flag or the trigger may be used in addition to timestamp-based measurement.

In one example, load control module 102C may send, to distribution module 94C, an estimated normalized load volume. Distribution module 94C may adjust the synchronization frequency time based on the actual network load. Distribution module 94C may send data to load control module 102C, the data including a list of devices and their parameters.

Load control module 102C may estimate a network load for each pair of master and secondary devices, an intra-cluster network load, and a cross-cluster network load. Based on the estimated network loads, load control module 102C may estimate the aggregated set of values estimating the health of the synchronization system. While previously described in terms of "load," distribution module 94C may perform various techniques based on the health of the device, cluster, or cross-cluster network.

Load control module 102C periodically estimates network load, and cross-cluster delays as a result of data routing through intermediate nodes (e.g., ports). Load control module 102C may receive protocol-formatted timestamps from distribution module 94C.

Load control module 102C may process data from distribution module 94C, estimate a network load for each pair of connected devices, estimate a network load inside each cluster node, estimate a cross-cluster node network load, estimate a number of intermediate nodes (e.g., multilayer switches) in cross-cluster node connections, check and record each device status (e.g., active or inactive), and generate system health metric data, which is forwarded to distribution module 94C.

Load control module 102C may also compute connection health for connected master and secondary devices, compute a cluster node health metric, compute a cross-cluster node health metric, and calculate an integrated health metric for the entire synchronization system.

Load control module 102C may be responsible for monitoring and estimating cluster node, cross-cluster, and synchronization system health. In one example, the system health is represented by the network load. The result of the estimation of health metric data is packaged and sent to distribution module 94C.

Load control module 102C may establish an algorithm of network load estimation between a pair of devices. In one example, the network load can be estimated by a special program of a hardware device. In another example, the network load may be estimated by periodically sending a probe sequence of packages between two devices and measuring the time of delivery and receipt of such packages. In one example, packages can be timestamps. In one example, the exact load can be placed into a system to measure system health with naturally and heavily loaded networks. In one example, different mechanisms of loading can be chosen for different pairs of devices. In some examples, load control module 102C may predict whether a network load spike or abrupt change in network load is likely to occur, and proactively stop performing time synchronization processes in response during the time period.

When a load estimation mechanism is chosen for each pair of devices, load control module 102C may periodically measure the network load between several or all pairs of connected devices. Load control module 102C may generate a cluster node network load by aggregating network load estimates for all measured device pairs in the cluster. In one example, the aggregation is an averaging of network load estimates. In one example, the cluster node network load is defined by the highest network load pair. In one example, the cluster node network load is defined by the 95% quantile of the highest pair network load in the cluster. The number of inactive devices in the cluster node may be counted and added as a part of the cluster node health metric. The cluster node health metric may include an estimated cluster node network load, a number of inactive devices, and a ratio of inactive devices to total devices.

The cross-cluster node network load may be estimated using cross-cluster connected master devices. End device cross-cluster connections may be disabled. In some examples, load control module 102C may aggregate estimated network load results in a manner similar to the aggregation for cluster nodes. The cross-cluster health metric may include an estimated cross-cluster network load, a number of inactive master devices, a ratio of inactive devices to total devices, and a number of routing nodes (e.g., switches) between each pair of master devices. In one example, the load volume can be measured using semantic (linguistic) values (e.g., low, moderate, high, very high).

In one example, the system health metric is measured at a pre-defined fixed time period. In one example, the system health metric is measured at a dynamically adjusted time period. In one example, the health metric uses an additional value measuring the distance between GPS module 92C and the system devices to dynamically adjust the time period. Load control module 102C may send data to distribution module 94C, the data including health metrics for device pairs, cluster nodes, and cross-cluster connections.

Figure 6:
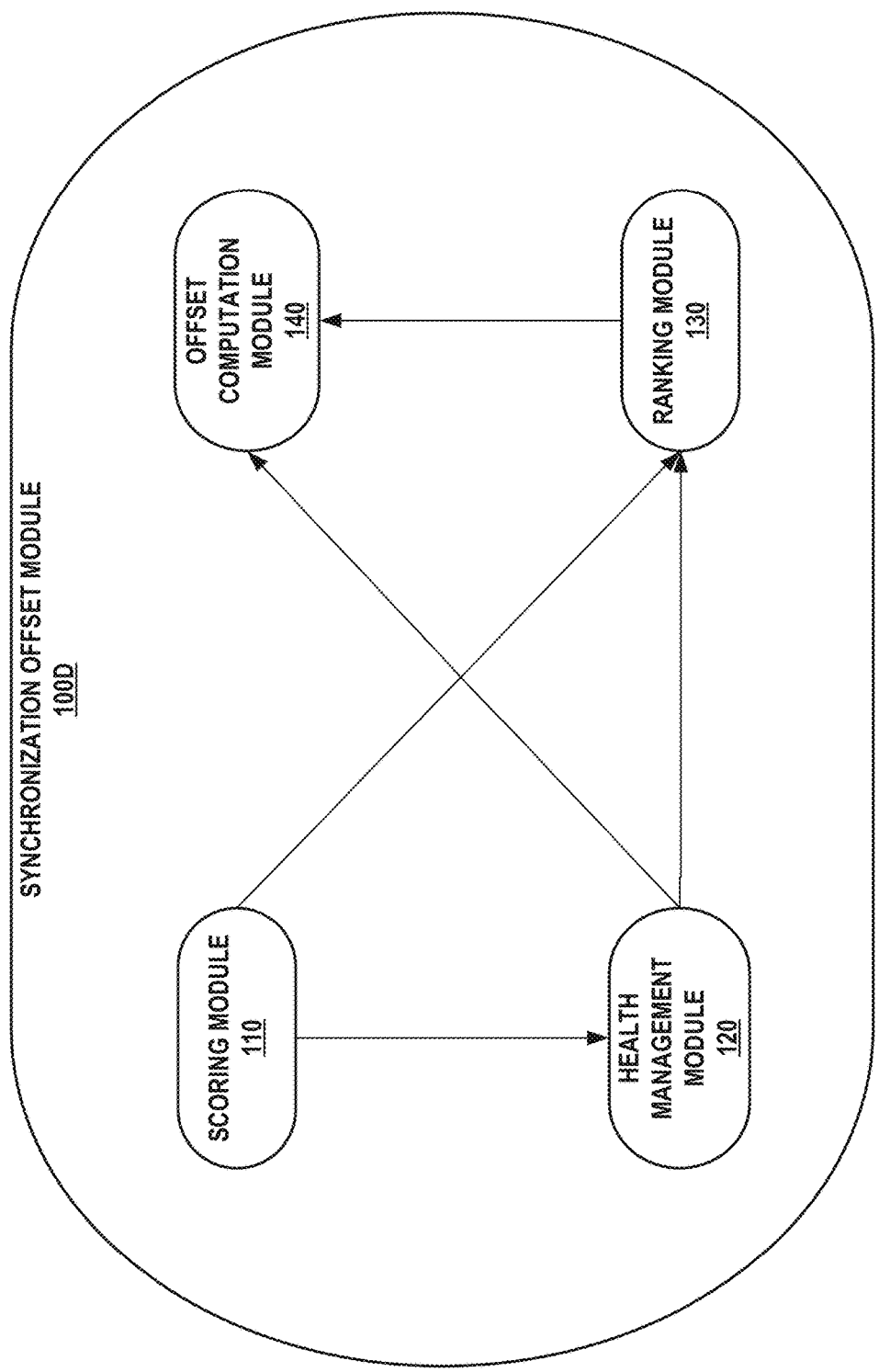
FIG. 6 is a conceptual diagram illustrating an example architecture of a synchronization offset module within the synchronization engine configured to perform one or more techniques in accordance with the current disclosure.

FIG. 6 is a conceptual diagram illustrating an example architecture of synchronization offset module 100D within a synchronization engine (e.g., synchronization engine 54, synchronization engine 90B, and synchronization engine 90C) configured to perform one or more techniques in accordance with the current disclosure. FIG. 6 illustrates only one particular example of synchronization offset module 100B or synchronization offset module 100C, and many other examples of synchronization offset module 100B or synchronization offset module 100C may be used in other instances and may include a subset of the components included in example synchronization offset module 100D or may include additional components not shown in example synchronization offset module 100D of FIG. 6.

In general, synchronization offset module 100D may include similar functionality to synchronization offset module 100B and synchronization offset module 100C, described above. That is, in general, synchronization offset module 100D may be configured to calculate the universal time synchronization offset based on timestamp offsets for each pair of master and secondary devices. In the example of FIG. 6, synchronization offset module 100D includes four modules (scoring module 110, health management module 120, ranking module 130, and offset computation module 140) that may contribute to the universal time synchronization offset calculation as described herein. In other examples, the techniques performed by any one module may be performed by a different module if synchronization offset module 100D were to contain fewer modules, or the techniques performed by any one module may be separated into two different modules if synchronization offset module 100D were to contain additional modules.

One goal of the techniques described herein is to compute timestamp offsets for end devices connected to a secondary master device, secondary master devices from strata "i+1" connected to a secondary master device from strata "i," and secondary master devices connected to a grand master device. Each of these examples can be formally presented by the set of device pairs $\{(x, y_1), \ldots, (x, y_n)\}$.

In the case of end devices connected to a secondary master device, the first argument x is the secondary master device and $y_1, \ldots, y_n$ are end devices In the case of secondary master devices from strata "i+1" connected to a secondary master device from strata "i," x is the secondary master device from strata "i" and $y_1, \ldots, y_n$ are the secondary master devices from strata "i+1." In the case of secondary master devices connected to a grand master device, x is the grand master device and $y_1, \ldots, y_n$ are the secondary master devices.

At time $t_j$, a synchronization engine may first generates timestamp offsets $O(t_j)$ for each pair of devices $(x, y_i)$ in the set of device pairs $\{(x, y_1), \ldots, (x, y_n)\}$ such that $O(t_j)$ minimizes the error function err(j)

$$\mathrm{err}(j) = x(t_j) - y_i(t_j) + + O_i(t_j), \text{ where } 1 \leq i \leq n \qquad (4)$$

Where $x(t_j)$ is the timestamp of device x and $y_i(t_j)$ is the timestamp of device $y_i$.

The synchronization engine that implements the techniques described herein may then generate a universal timestamp offset $F(\ )$ for each pair of devices $(x, y_i)$ in the set of device pairs $\{(x, y_1), \ldots, (x, y_n)\}$ based on timestamp offsets $O_i(t_j)$ Function $F(\ )$ may also be defined differently. In one example, $F(\ )$ may be defined as the median value of all timestamp offsets at time $t_j$:

$$F(\ ) = \mathrm{med}(O(t_j)), \text{ for all } j \text{ from 1 to } n. \qquad (5)$$

In another example, $F(\ )$ may be defined as the average of all timestamp offsets at time $t_j$:

$$F(\ ) = \mathrm{avg}(O(t_j)), \text{ for all } j \text{ from 1 to } n. \qquad (6)$$

In a heterogeneous system, different secondary devices have different CPUs, NIC cards, operation systems, and internal temperatures. These secondary devices run different tasks, have different connections, and are under different network loads. The techniques described herein an efficient synchronization engine that includes synchronization offset module 100D, as described below and illustrated by FIG. 6. Synchronization offset module 100D may effectively account for the heterogeneous nature of devices in the heterogeneous system and calculate a universal time synchronization offset that accounts for the differences between these devices.

Scoring module 110 may collect information, normalize, scale, and score computation for all devices and connections between devices. For each secondary device for the last n minutes, scoring module 110 may collect one or more of a network load, an "in service" time, a temperature, an average CPU load, a device average CPU idle time, an OS version, CPU data, and a model of the NIC card, or any other static or dynamic parameter descriptive of the respective secondary device.

Scoring module 110 may generate normalized scores for secondary devices and the connections for the secondary devices and forwards these scores to health management module 120. Scoring module 110 may perform rich, scalable, and configurable device and device connection data collection, device data normalization, scaling, and score computation.

Scoring module 110 collects, normalizes, and scales information about all master and end devices in the TOGS and their connections. Scoring module 110 generates parametrical scores for each connected device and pairs of connections.

In one example, all parameters collected in scoring module 110 are separated into two groups: static parameters (group S) and dynamic parameters (group D). The static parameters are rarely or never changed, and dynamic parameters are more variable. Static parameters are those that do not change over time (without user or administrative action). Static parameters can include the OS version, CPU model and number, and device NIC model, for example. Static parameters are fixed, but may be redefined at a given time through user intervention (e.g., an OS or software version upgrade occurs). Dynamic parameters are those that change dynamically over time. Dynamic parameters are more variable than the static parameters. Dynamic parameters can include a total time in service for the last n minutes; average temperature for the last n minutes, average CPU load for the last n minutes, average network load between two devices for the last n minutes, and an average CPU idle time for the last n minutes, for example.

In some examples, scoring module 110 may determine a general pass/fail score for a parameter to see if the parameter meets a baseline level. For instance, in instances where a score of 1 is the highest and a score of 0 is the lowest, a parameter may receive a score of 1 if the secondary device was connected to the network for more than six hours or has an average temperature below 50° C. In another instance, a parameter may receive a score of 1 if the secondary device was connected to the network for more than two hours, has an average network load less than 20%, or has a maximum network load that did not exceed 25%.

In one example, scoring module 110 computes a single score for each parameter. The score function is a monotonic function changing from the lowest score 0 to the highest score 1. All static parameters (group S) are qualitative parameters. In one example, all qualitative parameters are separately ranked in a pre-defined manner, and the scaling process is a process of rank aggregation and normalization.

In one example, scoring module 110 executes the scoring formula:

$$S=(R_{max}-R)/(R_{max}-R_{min}), \quad (7)$$

where S is a computed score, R is a current rank, $R_{max}$ is a maximal rank, and $R_{min}$ is a minimal rank.

Below, as an illustrative example, scoring module 110 computes a score for an OS version and NIC card parameters.

The score computation for the OS version is the variable $S_{os}$. There may be numerous types of operating systems and their versions associated with devices in a heterogeneous system. These operating systems may be separated into two categories: supported OS versions and others. In one example, the heterogeneous system may support a Linux OS (all modifications) and MS Windows 10. In this example, scoring module 110 may rank all supported OS versions as 1 and all other OS versions as 2. According to the formula (7), scoring module 110 may compute $S_{os}$ for supported OS versions as 1 and as 0 for all others.

The score computation for NIC cards is the variable $S_{NIC}$. There may be three providers of NIC cards considered in this example: Intel®, Solarflare®, and Mellanox®. For the purpose of this example, Intel® NIC cards may be less precise than Mellanox® NIC cards, and Mellanox® NIC cards may be less precise than Solarflare® NIC cards. In one example, scoring module 110 may pull information from various locations on the Internet, such as the price of each card in a common digital marketplace, as a basic premise for the ranking, such as using relative price as a rank. In one case of the pre-defined ranking, scoring module 110 may define the ranks as follows: Intel® card rank is 8, Mellanox® card rank is 5, and Solarflare® card rank is 0, with all other cards having the rank of 9. According to the formula (7) score $S_{NIC}$ for each card type is: $S_{NIC}$(Intel®)=(9−8)/(9−0)=1/9, $S_{NIC}$(Mellanox®)=(9−5)/(9−0)=4/9, and $S_{NIC}$(Solarfire®)=(9−0)/(1−0)=1, $S_{NIC}$(Other)=(9−9)/(9−0)=0

For dynamic parameters (group D), the maximum value of the parameter is associated with the best parameter conditions or the worst parameter conditions (depending on whether high scores indicate the optimal value or the worst value). In a case when maximum value represents the best parameter conditions, scoring module 110 may execute formula (8) below:

$$S(P)=(C(P,P_{min},P_{max})-P_{min})/(P_{max}-P_{min}), \quad (8)$$

where C(x, a, b) is a clip function (C(x)=min(a, b) if x<min(a, b) and C(x)=max(a, b) if x>max(a, b)), P is current parameter's value, $P_{max}$ is a maximal parameter's value, and $P_{min}$ is a minimal parameter's value. The clip function clips numbers above the maximum and below the minimum.

If the minimum parameter represents the best condition of the device, then the scale may be computed as $$S(P)=1-(C(P,P_{min},P_{max})-P_{min})(P_{max}-P_{min}), \quad (9)$$

In some cases, parameters, like temperature, may use more complicated modeling. For instance, if the temperature of devices is below some threshold number, that secondary device may be out of service and scoring module 110 may set its score to zero. If the measured temperature is equal to a threshold number, scoring module 110 may set the temperature health score to 1 and start to decrease the score down to 0 as the temperature increases. Such behavior is not described by (8) and (9) and score computation formula may be slightly modified. In one example, scoring module 110 may execute formula (10) below:

$$\begin{cases} S(P, P_{min}) = 0, \text{ if } P < P_{min}, \text{ or } P \text{ is unknown} \\ S(P, P_{min}) = 1 - (C(P, P_{min}, P_{max}) - P_{min})/ \\ \quad (P_{max} - P_{min}), \text{ if } P \geq P_{min} \end{cases} \quad (10)$$

Scoring module 110 may use formula (10) to compute score $S_{temp}$ for device CPU temperature. Scoring module 110 may request device CPU temperature periodically at a chosen period of time. The mean temperature for the chosen period time $temp_{mean}$ would estimate CPU and device load and scoring module 110 may compute the CPU temperature score as $$S_{temp}=1-(temp_{mean}-temp_{min})/(temp_{max}-temp_{min}) \quad (11)$$

In one example, scoring module 110 may compute S(P) as a nonlinear function.

Scoring module 110 may collect data from secondary devices and store the data in a special database that stores device-specific information. External devices may periodically measure network load between devices. Scoring module 110 may send data as a set of scores to health management module 120 and ranking module 130.

Health management module 120 uses parametrical scores produced by scoring module 110 and generates a health score for each device, device connection, cluster node, and/or network at large. A more detailed diagram of an example of health management module 120 is shown with respect to FIG. 7.

Figure 7:
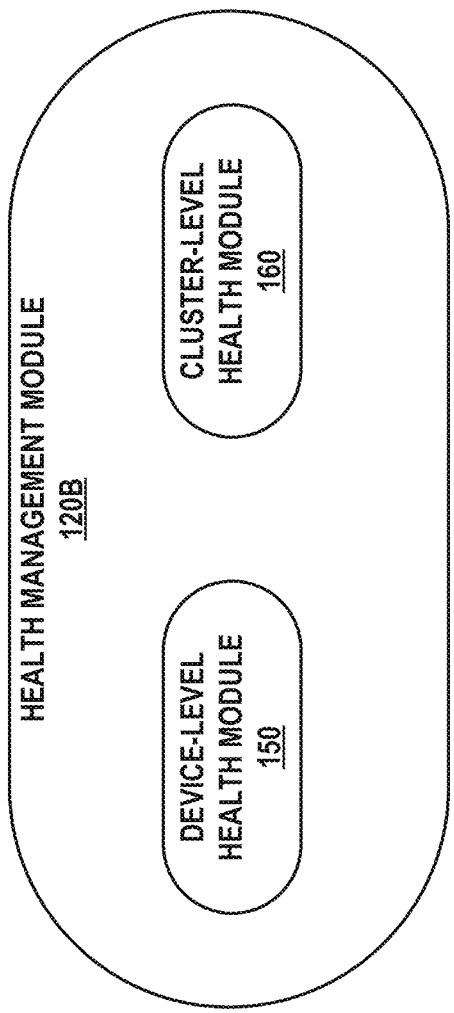
FIG. 7 is a conceptual diagram illustrating an example architecture of a health management module within the synchronization offset module configured to perform one or more techniques in accordance with the current disclosure.

FIG. 7 is a conceptual diagram illustrating an example architecture of health management module 120B within a synchronization offset module (e.g., synchronization offset module 100D) configured to perform one or more techniques in accordance with the current disclosure. FIG. 7 illustrates only one particular example of health management module 120, and many other examples of health management module 120 may be used in other instances and may include a subset of the components included in example health management module 120B or may include additional components not shown in example health management module 120B of FIG. 7.

In general, health management module 120B may include similar functionality to health management module 120, described above. In the example of FIG. 7, health management module 120B includes two modules (device-level health module 150 and cluster-level health module 160) that may contribute to the universal time synchronization offset calculation as described herein. In other examples, the techniques performed by any one module may be performed by a different module if health management module 120B were to contain fewer modules, or the techniques performed by any one module may be separated into two different modules if health management module 120B were to contain additional modules.

In one example, health management module 120B may compute health scores only for devices, device connections, cluster nodes, or the network as a whole. In other examples, health management module 120B may compute health scores for any combination of devices, device connections, cluster nodes, or the network as a whole. In one example, health management module 120B may compute the health score at a pre-defined time.

In one example, health management module 120B may include device-level health module 150, which computes device and device connection health. Health management module 120B may also include cluster-level health module 160, which computes cluster node and system health.

Device-level health module 150 may generate health management function $$H_c(t,x,y) \tag{12}$$

where t is time, and x and y are connected devices. At a moment of time t, device-level health module 150 may collect all available scores from scoring module 110 for devices x and y and their connection (x,y). Then device-level health module 150 applies a vector function $H(s_1, \ldots, s_n)$ that aggregates (e.g., compresses) scores $s_1, \ldots s_n$ into a single health score.

In one of the examples, the compression may include device-level health module 150 applying a monotonic function of n variables, such as $f(0, \ldots 0)=0$ and $f(1, \ldots, 1)=1$ for score compression.

In various systems, different health scores have different meanings and may be aggregated differently. In one example, health management module 120B may subdivide health scores can into multiplicative and additive scores and the compression function $H(s_1, \ldots, s_n)$ may be represented as:

$$H(s_1, \ldots s_n)=G(x_1, \ldots, x_k) \times \text{Average}(s_1, \ldots s_n), \tag{13}$$

where $G(x_1, x_k)$ is a monotonic function of k arguments such that $G(0, 0)=0$, $G(1, 1)=1$, and $G(a, b) \geq G(c, d)$, when $a \geq c$ or $b \geq d$. In one example, health management module 120B can use equation (13) in a simple form as $$F_{av}(s_1, \ldots s_n)=x_1 \times \ldots \times x_k \times \text{Average}(s_1, \ldots s_n), \tag{14}$$

where $\text{Average}(x_1, \ldots x_n)$ is a monotonic function such that $\text{Average}(0, \ldots, 0)=0$. $\text{Average}(1, \ldots 1)=1$ and $\text{Average}(x_1, \ldots, x_{i+1}, \ldots, x_{n+1}) \geq \text{Average}(x_0, \ldots, x_i, \ldots, x_n)$, when $x_{i+1} \geq x_i$.

Health management module 120B may also implement other formulas, such as formulas (15), (16), and (17):

$$F_{min}(s_1, \ldots s_n)=x_1 \times \ldots \times x_k \times \min(s_1, \ldots s_n), \tag{15}$$

$$F_{max}(s_1, \ldots s_n)=x_1 \times \ldots \times x_k \times \max(s_1, \ldots s_n), \tag{16}$$

$$F_{med}(s_1, \ldots s_n)=x_1 \times \ldots \times x_k \times \text{median}(s_1, \ldots s_n). \tag{17}$$

In one example, health management module 120B uses a single multiplicative score $S_{os}$, where all other scores are additive. Health management module 120B may interpret the score $S_{os}$ as a flag that disable devices with unsupported OS's from score computation.

Equation (15) describes the conservative measurement strategy when health management module 120B uses only mostly healthy devices and device connections. The advantage of such strategy is that health management module 120B would minimize measurement outliers. The drawback is that many devices and connection measurements would be excluded from offset computation. Equation (16) represents the opposite (aggressive) strategy, and equation (17) is a medium-aggression strategy.

Cluster-level health module 160 may compute an aggregated health value for each cluster node and the network at large. Cluster-level health module 160 may implement the following aggregation formula:

$$F_{av}(s_1, \ldots s_n)=\text{Average}(s_1, \ldots s_n), \tag{18}$$

where $\text{Average}(s_1, \ldots s_n)$ is a monotonic function such that $\text{Average}(0, \ldots, 0)=0$, $\text{Average}(1, \ldots 1)=1$, and $\text{Average}(s_1, \ldots, s_{i+1}, \ldots, s_{n+1}) \geq \text{Average}(s_0, \ldots, s_i, \ldots, s_n)$, when $s_{i+1} \geq s_i$. The equation (18) supports minimum/maximum strategies, as well as the usage of weighted averaging when weights can be ranks of connected devices and cluster nodes.

Returning to FIG. 6, ranking module 130 computes ranks for secondary devices and device connections using scores from scoring module 110 and health scores from health management module 120. Ranking module 130 may receive device parameters scores from scoring module 110 and health scores from health management module 120.

Ranking module 130 may rank each device in each cluster node. Ranking module 130 may also rank device connections in each cluster node, as well as cross-cluster connections for all connected cluster nodes.

In one example, ranking module 130 may set device ranks as static in a pre-defined "calibration" procedure. In one example, ranking module 130 may update the ranks when a new device is added to the system. In another example, ranking module 130 may update the ranks periodically based on the system's behavior and new health and parameter scores. In another example, ranking module 130 may automatically change device ranks (as opposed to periodically). In yet another example, ranking module 130, may change the ranks each time when the average time of uninterrupted operation score is changed more than N percent. In another example, ranking module 130 may update the ranks when the health or the parametric score has changed more than a threshold percentage. By implementing the event-based ranking, ranking module 130 may avoid accuracy degradation when new devices are added to the cluster node.

Ranking module 130 may change or update the ranks dynamically. For instance, ranking module 130 may adjust connection rankings based on the ratio:

$$\max(\text{pair\_offset}-\text{cluster\_offset})/(\text{cluster\_offset\_variation}), \tag{19}$$

where cluster offset variation is a max(cluster_offset)−min(cluster_offset) over a fixed period of time.

Ranking module 130 may also compute device connection ranking. Ranking module 130 may rank all connections in a cluster node, as well as connections between cluster nodes, by using an aggregation function for device ranks associated with each connection. For instance, if a master device Dm has a rank $r_m$ and connected secondary device Ds has a rank $r_s$, the rank R( ) of the connection (Dm, Ds) may be computed as $$R(Dm,Ds)=\text{Ave}_2(r_m,r_s), \quad (20)$$

where $\text{Ave}_2(x_1, x_2)$ is a monotonic function of 2 arguments such that $\text{Ave}_2(0, 0)=0$, $\text{Ave}_2(1, 1)=1$, and $\text{Ave}_2(a, b) \geq \text{Ave}_2(c, d)$, when $a \geq c$ or $b \geq d$. Well known examples of $\text{Ave}_2(a, b)$ are $\max(a, b)$, $\min(a, b)$, $(a+b)/2$, $\alpha \times a + (1-\alpha) \times b$, $\sqrt{(a \times b)}$.

Offset computation module 140 computes the timestamp offset for each device in the heterogeneous network using the health scores and ranks computed in health management module 120 and ranking module 130, respectively. Offset computation module 140 may also compute offsets for each pair of connected devices.

Offset computation module 140 receives protocol-formatted timestamps, health scores from health management module 120, and ranks from ranking module 130. Offset computation module 140 may generate timestamps and offsets, filter offsets by eliminating outliers using device health scores and device connection health scores, subdivide filtered offsets into homogeneous (similar) offset classes, rank created offset classes, aggregate offsets inside each offset class by creation of one optimized offset for all devices of each class, and aggregate computed optimized class offsets using class ranks.

Offset computation module 140 may, for each pair of devices, group together the sequence of timestamps and offsets and filter out device timestamp and offset outliers using device health scores and device connection health scores and other statistical criteria. Offset computation module 140 may then aggregate filtered offsets in homogeneous offset classes using device ranks, device connection ranks, and health scores. Offset computation module 140 may compute ranks for each offset class, compute each class aggregated class offset using one of data processing technology and model, and generate the final offset for devices by weighted averaging class offsets using class ranks as weight coefficients.

In one example, offset computation module 140 may group timestamps for each device base on a pre-defined time period, such as 1-2 seconds. In one example, offset computation module 140 may collect timestamps every N sec for each connected secondary device. Offset computation module 140 may collect timestamps every 20-50 milliseconds.

In one example, offset computation module 140 may consider all devices and device connections' current health score below a Ht threshold number as outliers and remove the respective time offsets from computation for the current period. In one example, offset computation module 140 may generate offsets by sending timestamps from one device to another and averaging the difference between timestamps. In another example, offset computation module 140 may measure offsets by constant time intervals. In one example, the number of offsets measured by offset computation module 140 varies from 30 to 400.

In one example, offset computation module 140 considers outlier offsets that lay in 95% and 5% quantiles of offset distribution. Offset computation module 140 may also use other quantiles to remove outliers, such as 99% and 1% or 90% and 10%. In one example, offset computation module 140 may compute the above quantiles after removing secondary devices with low health scores. In one example, offset computation module 140 may order all offset measurements by the absolute value and top n and bottom m percent are marked as outliers.

In one example, offset computation module 140 organizes devices in classes based on their ranks. Offset computation module 140 may subdivide ranks into a set of intervals, for instance, five equally sized intervals {0-20, 20-40, 40-60, 60-80, 80-100}.

In one example, offset computation module 140 associates each device and device connection with a pair of weight coefficients (r, h), where r is device or device connection ranks and h is device or device connection health score. In another example, offset computation module 140 associates each device and device connection with a triple of weight coefficients (r, h, s), where r is the device or device connection ranks and h is the device or device connection health score, and s is an offset statistic computed as $$s=(o-\min(o_1, \ldots o_n))/(\max(o_1, \ldots o_n)-\min(o_1, \ldots o_n)), \quad (21)$$

where o is the current device or device connection offset and $o_1, \ldots o_n$ are all offsets in the chosen time period.

In one example, offset computation module 140 may compute final offsets as weighted averages of each measured offset in the class, where weight coefficients are computed as normalized functions of (r, h, s). Offset computation module 140 may compute the weighted coefficient as follows $$W=r_i \times h_i \times s_i / \Sigma(r_i \times h_i \times s_i) \quad (22)$$

In one example, offset computation module 140 may approximate filtered offsets of each offset class by a linear function. Offset computation module 140 can use linear regression, support vector machines (SVM) or any other technologies of approximation. During a pre-defined period of time, offset computation module 140 may compute all new timestamps for end devices and low-rank strata devices using these linear functions.

In one example, offset computation module 140 may approximate filtered offsets of each offset class by non-linear functions. Offset computation module 140 may use non-linear regression, support vector machines (SVM) or any other technologies of approximation. During the pre-defined period of time, offset computation module 140 may compute all new timestamps for end devices and low rank strata devices using these non-linear functions.

In one example, offset computation module 140 may approximate filtered offsets of each offset class by linear or non-linear functions. Offset computation module 140 may then aggregate the computed offsets using secondary device and device connection ranks and health scores as weight coefficients for aggregation. The aggregation function may be a weighted average function.

Figure 8:
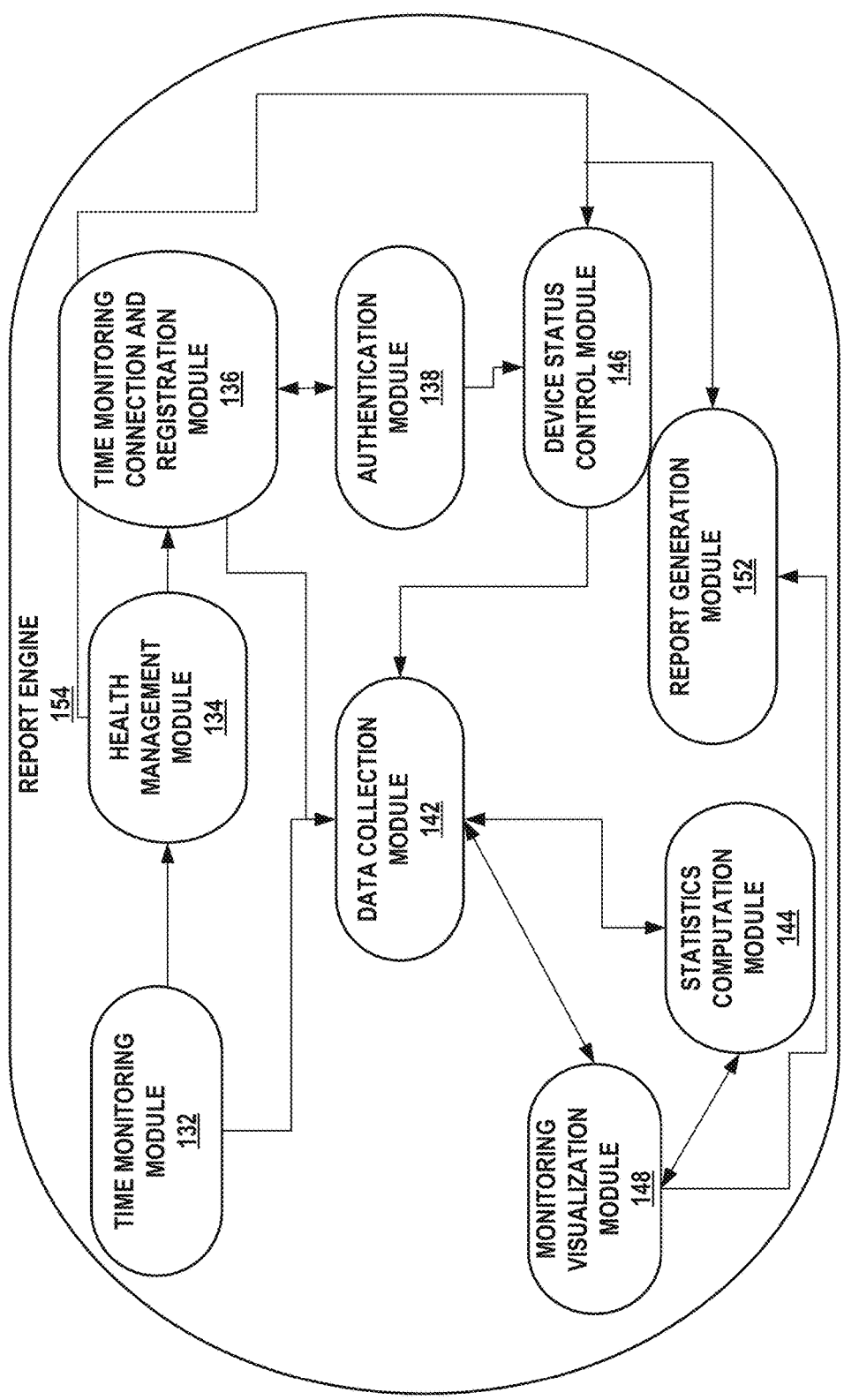
FIG. 8 is a conceptual diagram illustrating an example architecture of a report engine configured to perform one or more techniques in accordance with the current disclosure.

FIG. 8 is a conceptual diagram illustrating an example architecture of a report engine (e.g., report engine 154) configured to perform one or more techniques in accordance with the current disclosure. FIG. 8 illustrates only one particular example of report engine 154, and many other examples of report engine 154 may be used in other instances and may include a subset of the components included in example report engine 154 or may include additional components not shown in example report engine 154 of FIG. 8.

Time monitoring module 132 is responsible for client device connection with a master device, and collection of client time offset, timestamps, and device information. Time monitoring module 132 is connected with health management health management module 134, and time monitoring connection and registration time monitoring connection and registration module 136. Health management module 134 generates a health score for each device, connection, cluster node, and synchronization system at large.

Time monitoring connection and registration module 136 registers each device and assign each device to be a master device or a secondary device to establish single or multiple master-secondary connections. Report engine 154 may choose which master device's timestamp would be used for monitoring if the network has more than one master device.

In one example, time monitoring connection and registration module 136 may assign a device to be the master device automatically. In one example, time monitoring connection and registration module 136 may check the health status of all devices and may choose the geographically closest device as the master device. In another example, time monitoring connection and registration module 136 may choose two master devices: an active and a reserve. In some examples, time monitoring connection and registration module 136 assigns secondary devices to master devices based on network load.

Authentication module 138 periodically pings each connected client device and compares their device ids with the authenticated device list. Authentication module may set active/passive status of each secondary device and may secure the time synchronization monitoring system. Data collection module 142 collects data from master and secondary devices, including their health data, timestamp data, offset data, and network load data. Statistics computation module 144 computes moving averages, momentums, medians, quantiles, histograms, standard deviation, and other indicators for individual devices as well as device clusters.

Device status control module 146 analyzes the results of authentication provided by authentication module 138 and connection and device health and periodically computes device status (examples: active monitoring, active synchronization, inactive, active no-monitoring). A network may include a mix of client devices connected to the same master device: monitoring devices and synchronization devices. Client device may be out of license or out of order. In such a case, device status control module 146 will assign a status of inactive to the client device. If an end device is active, the end device can be a monitoring device or a synchronization device Monitoring visualization module 148 visualizes the results of monitoring in different resolutions, displays statistical data, device statuses, and other information. Report generation module 152 allows the user to generate different types of monitoring reports.

Time monitoring module 132 is responsible for the collection of offset and probe timestamps, normalization, and the scaling for all client devices subscribed to the monitoring service. Time monitoring module 132 uses a special engine that generates and propagates time data from the end device. In one example, the engine could be an NTP or PTP standard-based module that performs normalization and scaling automatically.

Scaling means converting data from an internal module format to the format defined by the master system. In one example, scaling could be converting from floating-point data format into a long integer formatted number. Such normalization precludes the loss of accuracy in data transformation and processing.

Time monitoring module 132 enables rich, scalable, and configurable data collection of device and device connections. Time monitoring module 132 also enables device data normalization, scaling, and score computation.

Time monitoring module 132 collects information ("parameters, data") from the end device. The set of parameters can be adjusted by the collection system configuration parameters. The collected parameters are separated into three groups: static device parameters (group S), dynamic device parameters (group D), and timing data (group T). Examples of static device parameters include OS version, CPU model and number, device NIC model. Examples of dynamic device parameters include total time in service for the last n minutes, average temperature for the last n minutes, average CPU load for the last n minutes, average network load between two devices for the last n minutes, and average CPU idle time for the last n minutes. Examples of timing data include offsets and probe timestamps. The collected information is filtered, scaled, and normalized. Time monitoring module 132 sends data to health management module 134, time monitoring connection and registration module 136, and data collection module 142.

Health management module 134 may enable device, device connection, cluster node, and synchronization system health function computations. Health management module 134 may also enable the concept of multiplicative and additive health scores. Health management module 134 may also integrate offset computation strategies with health functions, and use health functions in timestamp offset computation.

Health management module 134 receives data from time monitoring module 132, for each connected device and device connection. Health management module 134 computes aggregated scores for each pair of devices, cluster node, and synchronization system at large. Engine1 and engine2 of health management module 134 adapt the health computation module for different offset computation strategies. Health management module 134 sends data to time monitoring connection and registration module 136 and to device status control module 146.

Time monitoring connection and registration module 136 processes data from monitoring clients received from time monitoring module 132. Time monitoring connection and registration module 136 also processes client device and connection health data from health management module 134. Time monitoring connection and registration module 136 registers all new client devices and propagates client device registration data to the authentication module 138, and establishes connections between client devices and master devices.

Time monitoring connection and registration module 136 also computes master device availability scores, defines the optimal master device for establishing device connections using health score and availability score, and establishes device connections based on device health score and availability score. Time monitoring connection and registration module 136 is responsible for client device registration and connection.

Time monitoring connection and registration module 136 receives information from time monitoring module 132 and registers new client devices. Time monitoring connection and registration module 136 sends authentication requests to authentication module 138 and receives authentication data from authentication module 138. Time monitoring connection and registration module 136 receives timing data from time monitoring module 132 and health score from health management module 134.

Time monitoring connection and registration module 136 computes the availability score for each master device. The availability score defines the level of "busyness" of the master device. In one example, the availability score is a normalized average network load of each master device over a certain period of time. For example, in the case when the monitoring system has two master devices m1 and m2 and device m1 has an average load 12% over the last 1 hour and device m2 has an average load 9% over the last hour than normalized availability score for the master device m1 is 0.88 of 1 and availability score of the master device m2 is 0.91 of 1. In one example, the availability score is a normalized number of client devices connected to the master device. For example, if master device has 7 connected end devices and monitoring system allows a maximum of 100 connected client device per one master device, then the normalized availability score can be computed as 0.93 of 1. Time monitoring connection and registration module 136 may use a different normalization mechanism for availability score computation.

Time monitoring connection and registration module 136 assigns master devices to the client device based on the client device health score and the master device availability score. Time monitoring connection and registration module 136 establishes master/secondary connections. In one example, the single master device is assigned and connected to the client device based on their proximity. In one example, the single master device is assigned and connected to the client devices based on their proximity and client device health score. In one example, the single master device is assigned and connected to the client device based on their proximity and master device availability score. In one example, the single master device is assigned and connected to the client device based on their proximity and master device availability score, and client device health score. In one example, more than one master device is assigned and connected to the client device, one master device is connected, and the rest are assigned as reserve master devices.

Time monitoring connection and registration module 136 sends authentication requests to authentication module 138, connection information, availability score, and health score to data collection module 142, and authentication information and connection data to device status control module 146.

Authentication module 138 is responsible for the authentication of client devices. Authentication module 138 allows the setting of active/inactive statuses of each end device, therefore securing the time synchronization monitoring system. Authentication module 138 supports an authentication method that uses a white list of approved devices. Each new device that signed at the subscription time is added into an authentication device list. Authentication module 138 may refuse service to non-authorized devices. Bot devices cannot penetrate the network because the bots do not have a special key that authentication module 138 generates at the time of subscription.

Authentication module 138 receives client data from time monitoring connection and registration module 136. Authentication module 138 generates, operates, monitors, updates, and cleans up a list of supported client devices, and uses the list of supported client devices to authenticate devices.

Authentication module 138 creates, maintains, updates, and cleans up a list of authenticated client devices called the authentication whitelist or the authentication list. For each client, the device authentication module 138 periodically checks if the client device belongs to the authentication list. Authentication module 138 dispatches authentication information to device status control module 146 and time monitoring connection and registration module 136. Authentication module 138 generates authentication results and sends them to device status control module 146 and time monitoring connection and registration module 136.

Data collection module 142 is responsible for collecting all data from client devices and master devices. This data includes all time-related data as well as data related to device health, master device availability scores, device statuses.

The data collection module 142 receives client device data from time monitoring module 132, time monitoring connection and registration data from time monitoring connection and registration module 136, device status data from device status control module 146, and requests to provide data for visualization from monitoring visualization module 148. Data collection module 142 collects, stores, filters, and aggregates data.

Data collection module 142 gathers timing data from client devices and master devices. This data includes but is not limited to probe timestamps, offsets. Data collection module 142 periodically gathers connection data, master device availability scores, client device health scores, and device statuses. Data is filtered and stored. In one example, the filtering process includes of classification of data based on device statuses. Data collection module 142 aggregates timing data. In one example, timing data is aggregated for each client device. In one example, timing data is aggregated for each master device. In one example, data is aggregated for each client. Aggregated and filtered data is transferred to statistics computation module 144 for statistic computations. Aggregated, filtered, and classified data is transferred to monitoring visualization module 148 for visualization of the monitoring process.

Data collection module 142 sends data to statistics computation module 144 for computations of statistics. Data collection module 142 sends data to monitoring visualization module 148 for visualization of the monitoring process.

Statistics computation module 144 computes statistics associated with measured offsets, timestamps, network loads. Statistics may be computed for each client device individually or in classes of client devices. Examples of client device classes include client devices from the same geolocation, client devices connected to the same master device, or client devices belonging to the same client (customer, user) located at the single geolocation. Statistics may also be computed for each master device individually or in classes of master devices. Examples of master device classes include master devices from the same geolocation, master devices serving each client (customer, user), or master devices serving each client (customer, user) in the specific geolocation.

The main function of statistics computation module 144 is to set, adjust, and compute statistics and indicators. In one example, statistics computation module 144 computes moving averages, moving standard deviation, moving minimum and maximum, moving medians, and exponential averages. In one example, in addition to basic statistics defined before the statistics computation module 144 computes advanced indicators designed in technical trading, for instance, Boulanger bands, momentums, stochastic, etc.

Statistics computation module 144 receives time-related data from data collection module 142 and requests to package statistical and indicator data for monitoring visualization module 148 monitoring visualization. Statistics computation module 144 computes statistics and indicators. Statistics computation module 144 gives report engine 154 full control of statistics and indicator computation parameters and provides the capability of automatic adaptive parametrization based on pre-defined criteria. When data is measured, statistics computation module 144 uses special time periods (called aperture or window) to compute statistics, like means, standard deviations, etc. The period itself is a parameter. It can be modified manually by system operator and automatically by computation engine based on previous results.

In one example, statistics computation module 144 may modify the period automatically based on a pre-defined algorithm. For example, statistics computation module 144 may increase the aperture 10% if the computed standard deviation is above a certain threshold. Statistics computation module 144 provides integration of indicators used in technical trading into time synchronization statistics computation and parallel data processing for statistics and indicator computation.

Statistics computation module 144 computes statistics and indicators with different parametrization in parallel and stores the computed statistics and indicators. Statistics computation module 144 creates packages of statistic data and dispatches this data to monitoring visualization module 148. Statistics computation module 144 sends statistic data to data collection module 142.

Statistics computation module 144 periodically sends statistics data to data collection module 142. Statistics computation module 144 packages statistic data for visualization and sends it to the monitoring visualization module 148 based on received requests.

Device status control module 146 analyzes data from authentication module 138 and time monitoring connection and registration module 136 and computes client and master device statuses. The main function of device status control module 146 is to compute the status of each device. In one example, report engine 154 supports two statuses (active and inactive) for each device of the system. In one example, report engine supports three statuses for client devices (monitoring, synchronizing, and inactive).

The device status control module 146 receives authentication data from authentication module 138, connection and registration data from time monitoring connection and registration module 136, health scores and availability scores from health management module 134, and requests to package and provide status data for monitoring visualization module 148.

Device status control module 146 computes device status for client devices and master devices. Device status control module 146 supports separate monitoring and synchronizing statuses, as well as the dynamic changing of device statuses.

Device status control module 146 requests authentication, registration, and connection data. If the end device cannot be found in the authentication list, the client and master connection is disabled. If the health score of the client device is below a threshold, then the device status control module 146 generates an inactive status for the device. If the client device has a synchronization license associated with it, device status control module 146 generates a status of synchronizing.

Device status control module 146 periodically sends to data collection module 142. Device status control module 146 packages status records for visualization and sends status records to the monitoring visualization module 148.

Monitoring visualization module 148 allows users to control, edit, review, observe, and manage the time monitoring system. The main function of monitoring visualization module 148 is to allow users to visually observe client device offsets from master devices over different periods of time. Customers may visualize the performance of client devices, the number of licenses distributed in the system, the maximum jitter in the system, etc.

The monitoring visualization module 148 receives collected data from data collection module 142, statistic and indicator data from statistics computation module 144, and device status data from device status control module 146. Monitoring visualization module 148 provides client device offset multiresolution visualization for individual client devices and client device clusters, control multiresolution visualization, statistics and indicators multiresolution visualization for individual client devices and client device clusters, control multiresolution statistics and indicators visualization, client device status visualization for individual client devices and client device clusters, and control status visualization.

Monitoring visualization module 148 provides multiresolution visualization of client device offsets, multiresolution visualization of client device statistics and indicators, dynamic device status visualization, and device cluster aggregated visual data representation. When resolution and visualization information are chosen by user, monitoring visualization module 148 receives a request to visualize information. Monitoring visualization module 148 transforms user requests into a set of internal requests. Internal requests are sent to collection module 142, statistics computation module 144, and device status control module 146. Data collection module 142, statistics computation module 144, and device status control module 146 package data and deliver the data it to monitoring visualization module 148 for visualization.

Monitoring visualization module 148 sends requests to the data collection module 142, statistics computation module 144, and device status control module 146 when a user is refreshing his visualization monitor. Monitoring visualization module 148 also sends data to the report generation module 152 report generator when the user requests report.

Report generation module 152 generates reports based on user requests. The main function of report generation module 152 is to provide user necessary reports based on requests and the results of monitoring and visualization. In one example, report generation module 152 provides a report generation interface allowing the user to pre-define reports based on the user's needs and request report generation for on-screen presentation or downloading.

Report generation module 152 receives requests from users, requests for reports from monitoring visualization module 148, and data from monitoring visualization module 148. Report generation module 152 generates pre-defines or custom reports. Report generation module 152 integrates with the time monitoring system to receive user requests for one or more reports. Requests can be issued using report API or by a report generation interface. Requests can be provided automatically and be periodic or non-periodic. Report generation module 152 provides monitoring and visualization system provides data for all requested reports and generates and delivers reports.

Figure 9:
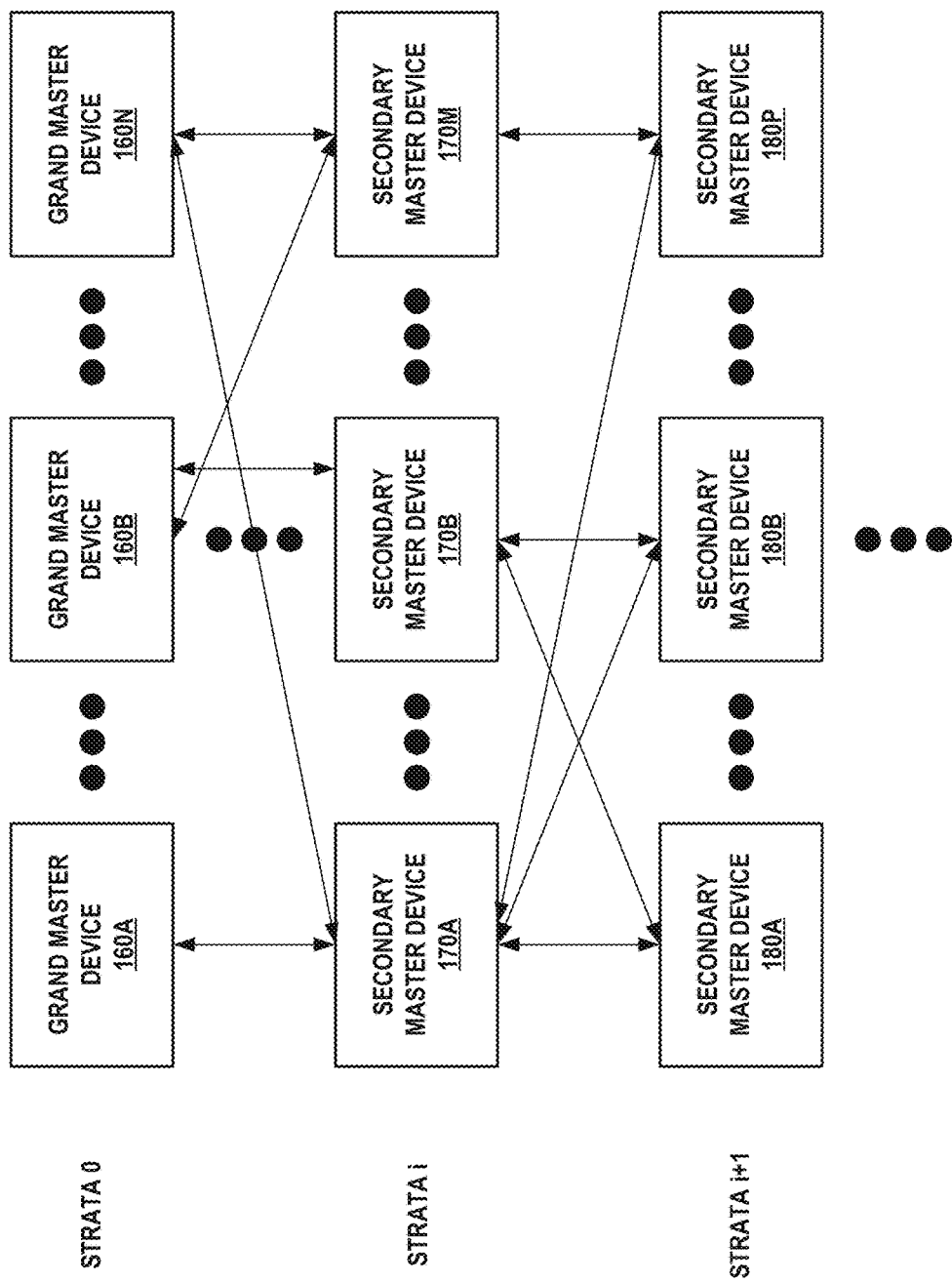
FIG. 9 is a conceptual diagram illustrating different strata of example grand master devices and other secondary master devices within a network, in accordance with one or more techniques of the current disclosure.

FIG. 9 is a conceptual diagram illustrating different strata of example grand master devices and other master devices within a network, in accordance with one or more techniques of the current disclosure. In the example of FIG. 9, grand master devices 160A-160N may be master devices connected directly to GPS modules. Two devices in the system can be connected or disconnected. In some examples, each end device is connected to a single master device (e.g., any of grand master devices 160A-160N, secondary master devices 170A-170M, or secondary master devices 180A-180P).

Master devices may be separated into several strata. Master devices assigned to the same strata (e.g., each of secondary master devices 170A-170M) are considered to be similar, and master devices assigned to different strata (e.g., grand master device 160A and secondary master device 180A) are considered to be different. For instance, all grand master devices 160A-160N can be assigned to strata 0, and secondary master devices may be assigned to the strata 1 to strata i+1. Grand master device 160A (a strata 0 device) has access to more precise timing data than secondary master devices (e.g., strata i master devices 170A-170M). In such cases where grand master device 160A is connected to secondary master device 170A, grand master device 160A is a source of precise time, and strata 0 is more "senior" than strata i. Strata levels may be assigned such that strata level "i" has more precise timestamps than strata level "i+1" due to the number of connections between the respective secondary master device and grand master devices 160A-160N.

Figure 10:
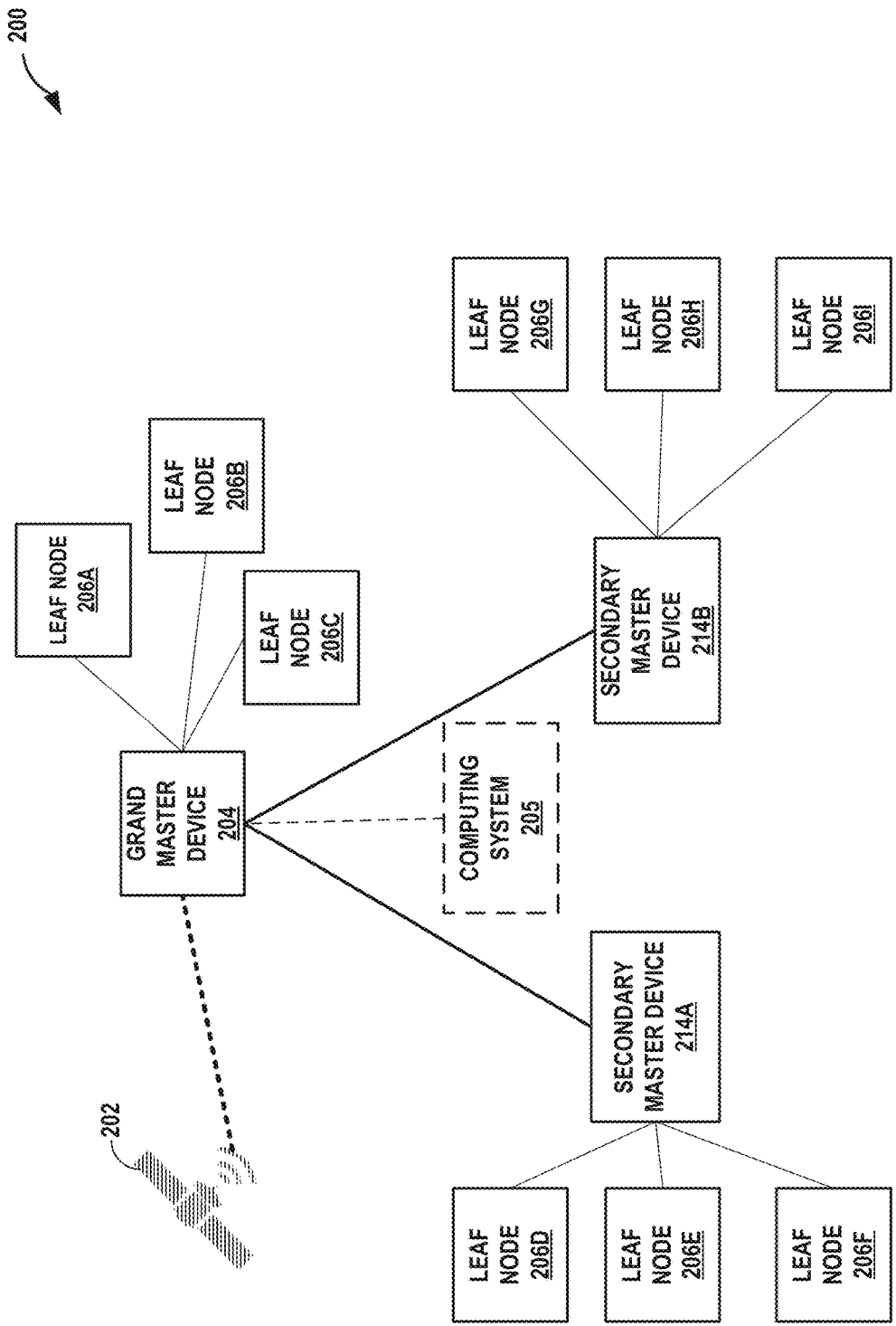
FIG. 10 is a conceptual diagram of an example time synchronization system with a GPS, a computing system, a grand master device, multiple secondary master devices, and multiple leaf nodes, in accordance with one or more techniques of the current disclosure.

FIG. 10 is a conceptual diagram of an example time synchronization system 200 with a GPS 202, a computing system 205, a grand master device 204, two secondary master devices 214A-214B, and multiple leaf nodes 206A-206G, in accordance one or more techniques of the current disclosure.

Each of GPS 202, grand master device 204, secondary master devices 214A-214B, and leaf nodes 206A-206G may be examples of the devices defined and described above having like names. In the example of FIG. 10, synchronization system 200 may be contained within a single cluster, with each of grand master device 204, secondary master devices 214A-214B, and leaf nodes 206A-206G being located in the same geographical area, such as the same metropolitan area.

In the example of FIG. 10, grand master device 204 would be considered to be a "strata 0" master device, as grand master device 204 is in direct contact with GPS 202 in order to get the most accurate time settings. Secondary master devices 214A and 214B are each in contact with grand master device 204, meaning secondary master devices 214A and 214B would be considered "strata 1" master devices.

In some instances, prior to computing system 205 performing a time synchronization process in accordance with the techniques described herein, GPS 202 may be configured to send a timestamp in a data packet to grand master device 204. Grand master device 204 may receive the timestamp and synchronize an internal clock on grand master device 204 to the timestamp received from GPS 202.

Computing system 205 may be configured to perform a time synchronization process with any of leaf nodes 206, either individually or in combination, via secondary master devices 214. In some examples, computing system 205 may only perform the time synchronization techniques when network conditions indicate that an acceptable environment for computing system 205 to perform the time synchronization techniques. In the example of FIG. 10, this means that computing system 205 may perform the time synchronization techniques described herein when network conditions of a direct link with the leaf node or the secondary master device indicate that the network environment is acceptable, or when network conditions of the cluster, in general, indicate that the network environment is acceptable. For instance, computing system 205 may check a network load for time synchronization system 200 to determine if the current bandwidth usage is above a point where it would be cumbersome on the network to perform the time synchronization techniques described herein, as sending additional time synchronization-related packets between network devices may exacerbate network congestion issues. The network conditions may be checked individually with each leaf node (e.g., bandwidth usage over a connection directly between grand master device 204 and the respective leaf node) or at the cluster level (e.g., a total bandwidth usage for a LAN that includes all of the end devices and/or secondary master devices in the cluster that will undergo the time synchronization process). If the network conditions are checked at the individual level or the cluster level, computing system 205 may perform the time synchronization process with the leaf node or with each leaf node in the respective cluster once the network conditions for the individual leaf node or the network conditions for the cluster indicate that the environment is suitable for computing system 205 to send the time synchronization packets.

The network conditions may also include device health for the leaf node. As with the bandwidth usage, computing system 205 may check the device health for the individual leaf node to receive the time synchronization packet or an aggregate device health for the cluster that includes the individual leaf node to receive the time synchronization packet. When the leaf node includes an end device or multiple devices in the same cluster, device health may include an estimated cluster node network load, a number of inactive devices, and/or a ratio of inactive devices to total devices.

In some instances, in addition to the network condition check or without the network condition check, computing system 205 or master device 204 may aggregate offsets across multiple leaf nodes of leaf nodes 206 in order to calculate a universal time synchronization offset value that is sent to each leaf node, either in a particular cluster or across multiple clusters. For instance, computing system 205 may determine the timestamp offset for each leaf node that will receive the time synchronization packet. To aggregate the timestamp offsets, computing system 205 may take a strict average of the determined offsets, or the aggregate may weight the various timestamp offsets, as examples. The weights may be selected based on the amount of time the device has been a part of the network or based on a deviation from a distribution of the various offsets. In this manner, the weight may correlate to the likely accuracy of the timestamp offsets provided by the device. For example, computing system 205 may be configured (e.g., with policies) to assign a lower weight to a device that has been part of the network longer, and to assign a higher weight to a device that has been part of the network for a shorter time, because internal components of a newer network device may provide more accurate timestamping. For instance, after finding the best fit for the distribution of timestamp offsets, computing system 205 may completely disregard a timestamp offset that is an outlier from the distribution, or may weight a timestamp offset very highly if the timestamp offset is close to a mean or median of the distribution.

Figure 11:
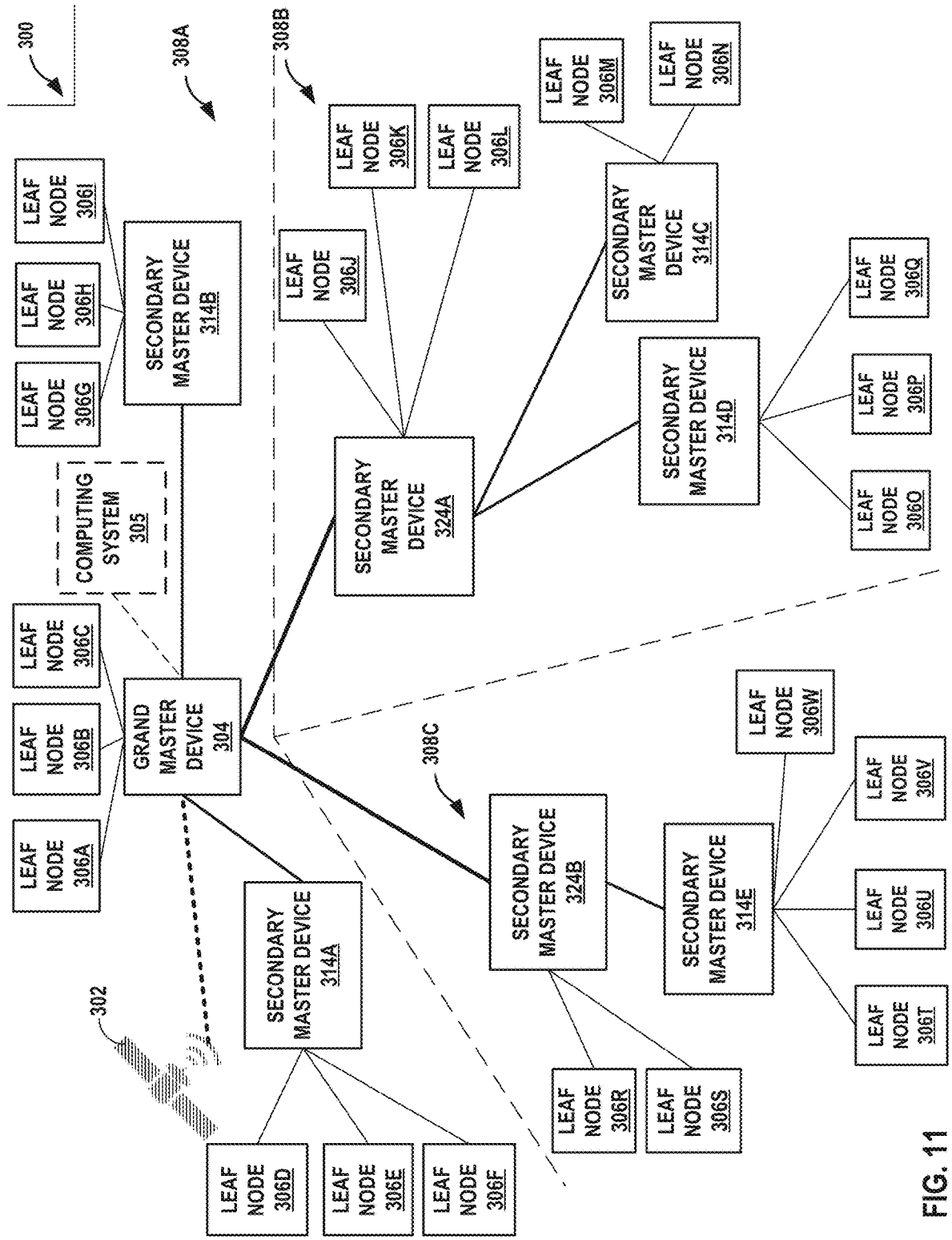
FIG. 11 is a conceptual diagram of an example cross-cluster time synchronization system with a GPS, a computing system, a grand master device, multiple secondary master devices, and multiple leaf nodes, in accordance with one or more techniques of the current disclosure.

FIG. 11 is a conceptual diagram of an example cross-cluster time synchronization system 300 with a GPS 302, a computing system 305, a grand master device 304, multiple secondary master devices 314A-314E and 324A-324B, and multiple leaf nodes 306A-306W connected to each master device, in accordance one or more techniques of the current disclosure.

Each of GPS 302, grand master device 304, secondary master devices 314A-214E and 324A-324B, and leaf nodes 306A-306W may be examples of the devices defined and described above having like names. In the example of FIG. 11, these devices may be spread throughout multiple clusters 308A-308C, which indicates that the devices in each cluster are located in different geographical areas.

In the example of FIG. 11, grand master device 304 would be considered to be a "strata 0" master device, as master device 304 is in direct contact with GPS 302 in order to get the most accurate time settings. Secondary master devices 314A and 314B are each in direct contact with grand master device 304, meaning secondary master devices 314A and 314B would be considered "strata 1" master devices. Secondary master devices 324A and 324B, while located in clusters 308B and 308C, are also each in direct contact with master device 304 located in cluster 308A, meaning secondary master devices 324A and 324B are considered cross-cluster master devices and are also considered "strata 1" master devices. Secondary master devices 314C, 314D, and 314E receive timestamp offsets from grand master device 304 via an intermediary device (i.e., secondary master devices 324A and 324B), meaning secondary master devices 314C, 314D, and 314E would be considered "strata 2" master devices.

In some instances, prior to computing system 305 performing a time synchronization process in accordance with the techniques described herein, GPS 302 may be configured to send a timestamp in a data packet to grand master device 304. Grand master device 304 may receive the timestamp and synchronize an internal clock on grand master device 304 to the timestamp received from GPS 302.

Computing system 305 may be configured to perform a time synchronization process with any of leaf nodes 306, either individually or in combination, via secondary master devices 314 and/or 324. As such, the computing system may be configured to perform the time synchronization process described herein directly with end devices (e.g., leaf nodes 306A-306C), with secondary master devices within the same cluster as master device 304 (e.g., secondary master devices 314A-314B), or with secondary master devices in other clusters separate from the cluster that contains grand master device 304 (e.g., secondary master devices 324A-324B).

In some examples, computing system 305 may only perform the time synchronization techniques when network conditions indicate that an acceptable environment for computing system 305 to perform the time synchronization techniques. For instance, computing system 305 may check a network load for time synchronization system 300 to determine if the current bandwidth usage is above a point where it would be cumbersome on the network to perform the time synchronization techniques described herein. The network conditions may be checked individually with each leaf node (e.g., bandwidth usage over a connection directly between grand master device 304 and the respective leaf node), at the cluster level (e.g., a total bandwidth usage for a LAN that includes all of the end devices and/or secondary master devices in the cluster that will undergo the time synchronization process), or at the system level (e.g., a total bandwidth usage for multiple clusters in the overall system). If the network conditions are checked at the individual level or the cluster level, computing system 305 may perform the time synchronization process with the leaf node or with each leaf node in the respective cluster once the network conditions for the individual leaf node or the network conditions for the cluster indicate that the environment is suitable for computing system 305 to send the time synchronization packets.

In some examples, time synchronization system 300 may be configured such that each of clusters 308A-308C for the techniques described herein correspond to data centers in different geographical or metropolitan areas. Data centers may house multiple different types of devices (e.g., grand master device 304, secondary master devices 314A-214E and 324A-324B, and leaf nodes 306A-306W) that are communicatively coupled inside this overall data center structure, with grand master device 304 and secondary master devices 324 being configured to perform communication across different clusters 308. As such, service providers (e.g., data center operators) may implement the techniques described herein as a service to customers to synchronize the clocks on customer devices within the same cluster (e.g., within cluster 308A), as well as with devices in remote clusters 308B and 308C in different geographical areas. In some examples, some aspects of the techniques described herein may be implemented as a downloadable software plugin that executes on customer equipment, e.g., in a data center, and enables computing system 305 to perform the time synchronization processes as described herein. In some examples, leaf nodes 306 may correspond to customer equipment having a software plugin and/or network card installed that enables the receipt and ability to perform the client-side time synchronization actions based on the received timestamp offsets.

When each of clusters 308 are in different regions (e.g., within different data centers, and possibly different metros), they may be separated by long distances as compared to devices within the same cluster/data center. Over long distances, time synchronization may be difficult given that the connections between clusters 308 may cover many hops (intermediate devices), and communications may experience delay or attenuation due to the additional distance. Arranging system 300 in a hierarchical manner that includes a master device per cluster may allow for more efficient time synchronization. In addition, by utilizing the techniques described herein, computing system 305 may only perform the time synchronization process when the network conditions indicate the congestion over the network and/or the health of the clusters are conducive to the time synchronization process occurring without hindering any of the devices participating in the process. For instance, if a connection between clusters 308A and 308B is highly congested, performing a time synchronization process while the connection is congested may lead to increased packet loss and round-trip time for the data already traversing the connection between clusters 308A. Further, if packet loss or increased round trip time occurs for the packets in the time synchronization process, the time synchronization may be incorrect and inefficient. By utilizing the techniques described herein, grand master device 304 may selectively perform the time synchronization process only at times in which the synchronization process will not hinder other processes or be hindered by other processes.

In this context, across clusters 308 in different data centers and/or regions, there may be a high level of heterogeneity in devices, that is, the devices may have varying characteristics that affect time synchronization precision. For instance, cluster 308A may have a very different set of devices than cluster 308B, as the various clusters may have been acquired by the operator and have legacy equipment different than that found in other clusters. Different clusters may mainly use different vendors, or the equipment in some clusters may be older than the equipment in other clusters. The techniques of this disclosure can easily accommodate this situation and enable seamless time synchronization across the variety of devices, e.g., due to the health checks that are performed on the devices themselves prior to including the device in the time synchronization process. These benefits may be increased when computing system 305 perform the time synchronization process with devices where multiple hops (i.e., connections between different devices that the data packets will traverse) are needed between grand master device 304 and the end device receiving the timestamp offset.

The network conditions may also include device health for the leaf node. As with, the bandwidth usage, computing system 305 may check the device health for the individual leaf node to receive the time synchronization packet, an aggregate device health for the cluster that includes the individual leaf node to receive the time synchronization packet, or an aggregate device health for multiple clusters that are each to receive the time synchronization packet. When the leaf node includes an end device or multiple devices in the same cluster, device health may include an estimated cluster node network load, a number of inactive devices, and/or a ratio of inactive devices to total devices. When the device health includes an aggregate across multiple clusters, the cross-cluster health metric may include an estimated cross-cluster network load, a number of inactive master devices, a ratio of inactive devices to total devices, and a number of routing nodes (switches) between each pair of master devices.

Figure 12:
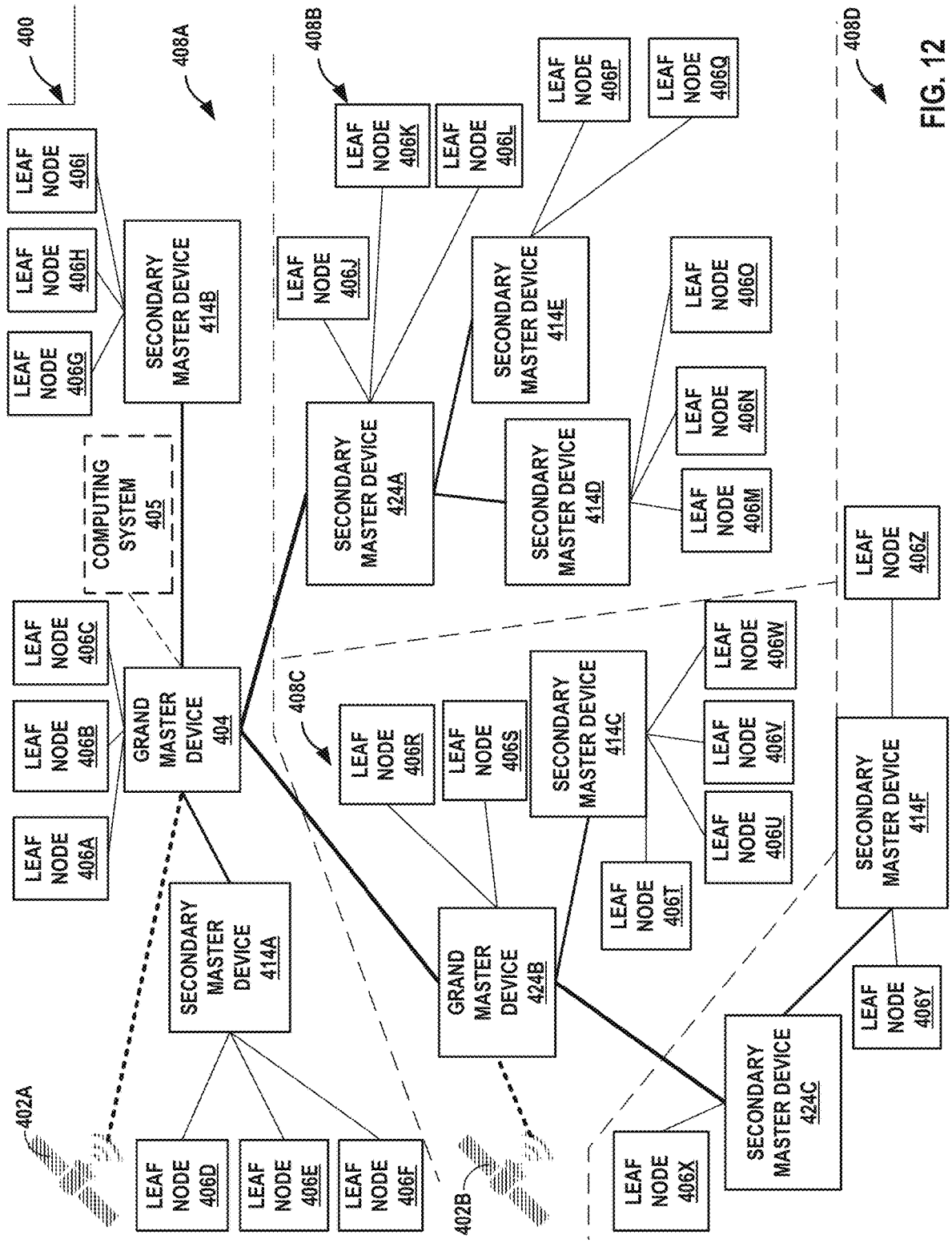
FIG. 12 is a conceptual diagram of an example cross-cluster time synchronization system with two GPS, a computing system, two grand master devices, multiple secondary master devices, and multiple leaf nodes, in accordance one or more techniques of the current disclosure.

FIG. 12 is a conceptual diagram of an example cross-cluster time synchronization system 400 with GPSs 402A-402B, computing system 405, grand master devices 404 and 424B, multiple secondary master devices 414A-414F, 424A, and 424C, and multiple leaf nodes 406A-406Z, in accordance one or more techniques of the current disclosure.

Each of GPSs 402A-402B, grand master devices 404 and 424B, secondary master devices 414A-414F, 424A, and 424C, and leaf nodes 406A-406Z may be examples of the devices defined and described above having like names. In the example of FIG. 12, these devices may be spread throughout multiple clusters 408A-408D, which indicates that the devices in each cluster are located in different geographical areas.

In the example of FIG. 12, grand master device 404 would be considered to be a "strata 0" master device, as grand master device 404 is in direct contact with GPS 402A in order to get the most accurate time settings. The example of FIG. 12 includes a second GPS 402B, which is directly connected to grand master device 424B. This means that grand master device 424B is also a "strata 0" master device. Secondary master devices 414A, 414B, and 414C are each in direct contact with one of grand master device 404 or grand master device 424B, meaning secondary master devices 414A, 414B, and 414C would be considered "strata 1" master devices. Secondary master devices 424A and 424C, while located in different clusters, are also each in direct contact with one of grand master device 404 or grand master device 424B, meaning secondary master devices 424A and 424C are also considered "strata 1" master devices. Secondary master devices 414D, 414E, and 414F receive timestamp offsets from one of grand master device 404 or grand master device 424B via an intermediary device (i.e., secondary master devices 424A and 424C), meaning secondary master devices 414D, 414E, and 414F would be considered "strata 2" master devices.

Time synchronization system 400 of FIG. 12 is similar to time synchronization system 300, but further includes an additional GPS 402B in communication with grand master device 424B. For instance, while some clusters may be located within the same country or the same geographic region, clusters may also be located across different continents, for example. This distance may hinder the efficiency and/or practicality of utilizing a single GPS to synchronize the clocks of devices in these different continents. By adding GPS 402B to the system, timestamps from both grand master devices 424B and 404 may be used by computing system 405 to perform the time synchronization processes described herein or may be used to create a universal timestamp offset that accounts for the differences across continents. As such, computing system 405 may perform the time synchronization techniques described herein.

Figure 13:
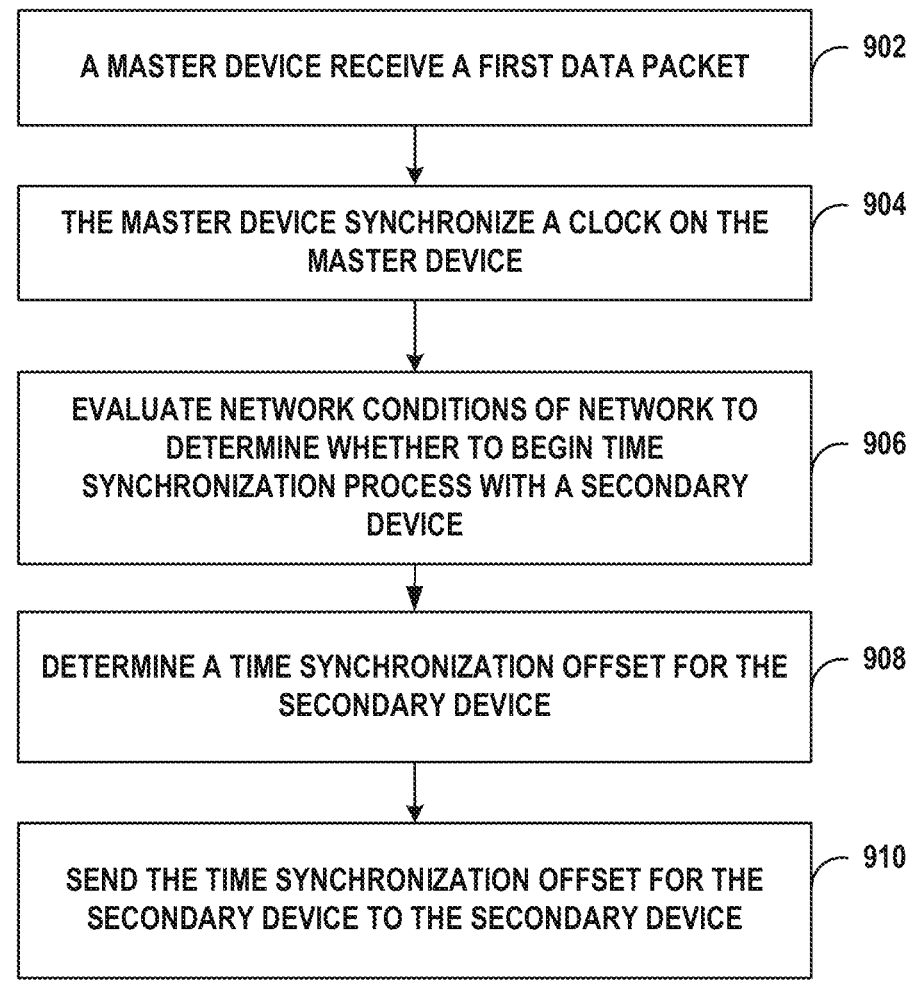
FIG. 13 is a flow diagram illustrating an example operation of a device according to one or more techniques of this disclosure.

FIG. 13 is a flow diagram illustrating an example operation of a computing system according to one or more techniques of this disclosure. FIG. 13 is described with reference to computing system 40 of FIG. 2. However, this process may also apply to any other computing system described herein.

In accordance with the techniques described herein, a master device may receive a first data packet including a timestamp (902). Using this timestamp, the master device may synchronize a clock on the master device (904). In some examples, the master device 40 may receive the first data packet from a GPS device.

Computing system 40 may evaluate network conditions of a network to determine whether to perform a time synchronization process with a secondary device in the network (906). Based on the evaluation of the network conditions, in response to determining that the network conditions indicate that it is suitable to send the timestamp offset, computing system 40 may determine, based at least in part on a time indication for a clock on the master device and a time indication for a clock on the secondary device, a timestamp offset for the secondary device (908). Computing system 40 may then send the timestamp offset for the secondary device to the secondary device in a data packet (910). As defined above, a secondary device, also referred to herein as a "leaf node," may refer to a secondary master device or an end device.

Figure 14:
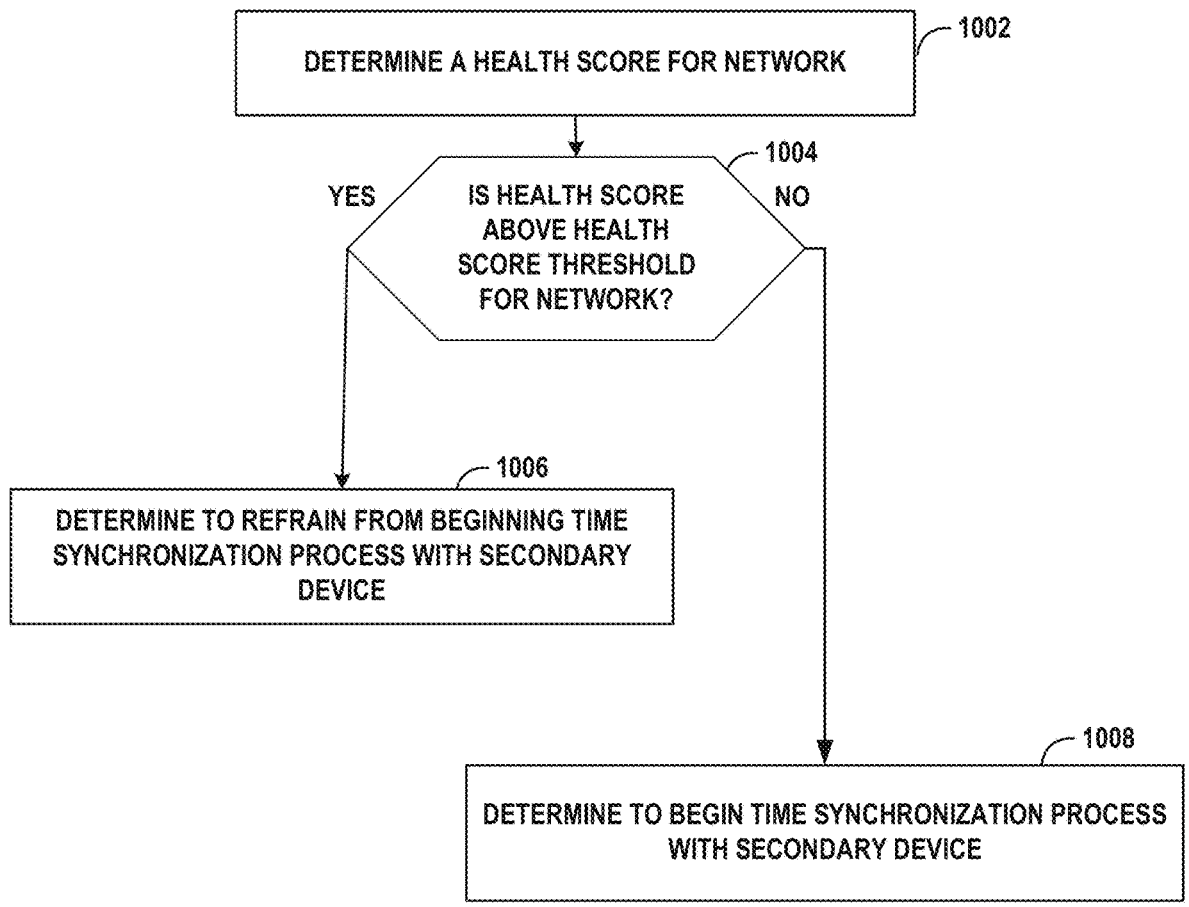
FIG. 14 is a flow diagram illustrating an example operation of a device according to one or more techniques of this disclosure.

FIG. 14 is a flow diagram illustrating an example operation of a computing system according to one or more techniques of this disclosure. FIG. 14 is described with reference to computing system 40 of FIG. 2. However, this process may also apply to any other configuration of the computing system described herein.

In accordance with the techniques described herein, computing system 40 may determine a health score for the network (1002). The health score for the network may indicate current health (e.g., current traffic) of the network, either within a cluster or across clusters. If the current health score for the network is too low (e.g., current traffic over the network is too high), completing the time synchronization process may be unduly cumbersome on the network, as sending additional time synchronization-related packets between network devices may exacerbate network congestion issues. As such, computing system 40 may determine whether the health score for the network is above a threshold health score for the network (1004). Additionally or alternatively, computing system may determine bandwidth usage for the network, and may determine whether the bandwidth usage satisfies a bandwidth usage threshold.

Responsive to determining that the health score for the network is below the threshold health score ("NO" branch of 1004), computing system 40 may determine to refrain from performing the time synchronization process with the secondary device (1006) while the health score remains below the threshold health score (or, e.g., for a configured time period) in an effort to avoid burdening the network. Conversely, responsive to determining that the health score for the network is above the threshold health score ("YES" branch of 1004), computing system 40 may determine perform a time synchronization process (1008), as computing system 40 would not be burdening the network by sending and receiving time synchronization packets as part of the time synchronization process. Additionally or alternatively, the computing system may determine whether to perform a time synchronization process in response to determining whether the bandwidth usage exceeds a bandwidth usage threshold.

Figure 15:
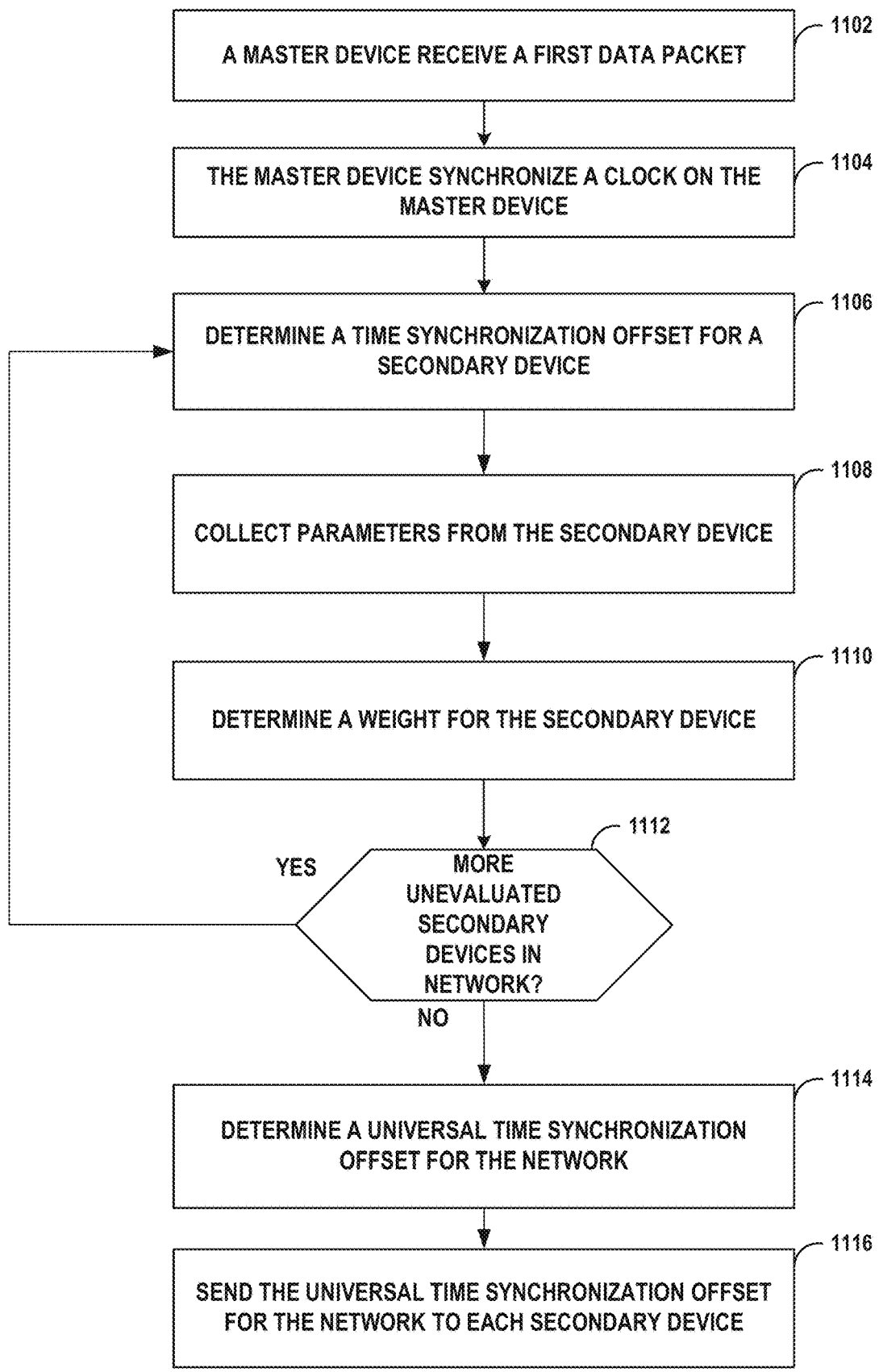
FIG. 15 is a flow diagram illustrating an example operation of a device according to one or more techniques of this disclosure.

FIG. 15 is a flow diagram illustrating an example operation of a computing system according to one or more techniques of this disclosure. FIG. 15 is described with reference to computing system 40 of FIG. 2. However, this process may also apply to any other configuration of computing system described herein. In various examples, the operation of FIG. 15 may be performed by a master device, a computing system physically separate from a master device, or by both.

In accordance with the techniques described herein, a master device may receive a first data packet including a timestamp (1102). Using this timestamp, the master device may synchronize a clock on the master device (1104).

For each secondary device of a plurality of secondary devices in a network, computing system 40 may determine, based at least in part on a time indication for a clock on the master device and a time indication for a clock on a secondary device in the network, a time synchronization offset for the respective secondary device (1106). Computing system 40 may also collect one or more parameters for the respective secondary device, including device-specific parameters, connection-specific parameters, cluster-specific parameters, or network-specific parameters (1108). Computing system 40 may determine a weight for the respective secondary device based on the collected parameters (1110). As defined above, a secondary device, also referred to herein as a "leaf node," may refer to a secondary master device or an end device.

If there are more unevaluated secondary devices in the network ("YES" branch of 1112), computing system 40 may repeat steps 1106, 1108, and 1110 for the remaining secondary devices until each secondary device is evaluated. Once there are no more unevaluated secondary devices in the network ("NO" branch of 1112), computing system 40 may calculate, based on the respective time synchronization offset for each secondary device of the plurality of secondary devices and the respective weight for each secondary device of the plurality of secondary devices, a universal time synchronization offset for the network (1114). Computing system 40 may then send the universal time synchronization offset for the network to each secondary device of the plurality of secondary devices (1116).

Figure 16:
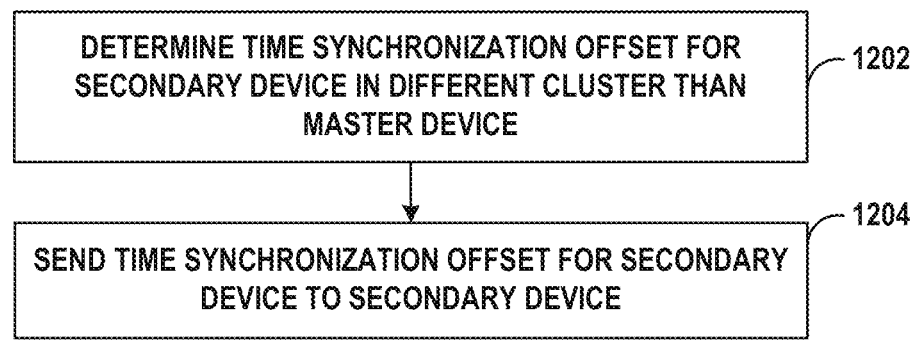
FIG. 16 is a flow diagram illustrating an example operation of a device according to one or more techniques of this disclosure.

FIG. 16 is a flow diagram of one or more techniques of the current disclosure. FIG. 16 is described with reference to computing system 40 of FIG. 2. However, this process may also apply to any other configuration of the computing system described herein. In various examples, the operation of FIG. 16 may be performed by a master device, a computing system physically separate from a master device, or by both.

Computing system 40 may determine, based at least in part on a time indication for a clock on a master device and a time indication for a clock on a secondary device on the network, a time synchronization offset for the secondary device (1202). The network may include a plurality of clusters, where the master device is located in a first cluster of the plurality of clusters and the secondary device is located in a second cluster of the plurality of clusters. Computing system 40 may further send the time synchronization offset for the secondary device to the secondary device in a data packet (1204). In other words, computing system 40 may implement time synchronization techniques across clusters in an effort to synchronize times of devices in different geographical locations and on different LANs, which may be helpful when the same proprietor owns or relies on accurate timestamps for all devices across every cluster.

Figure 17:
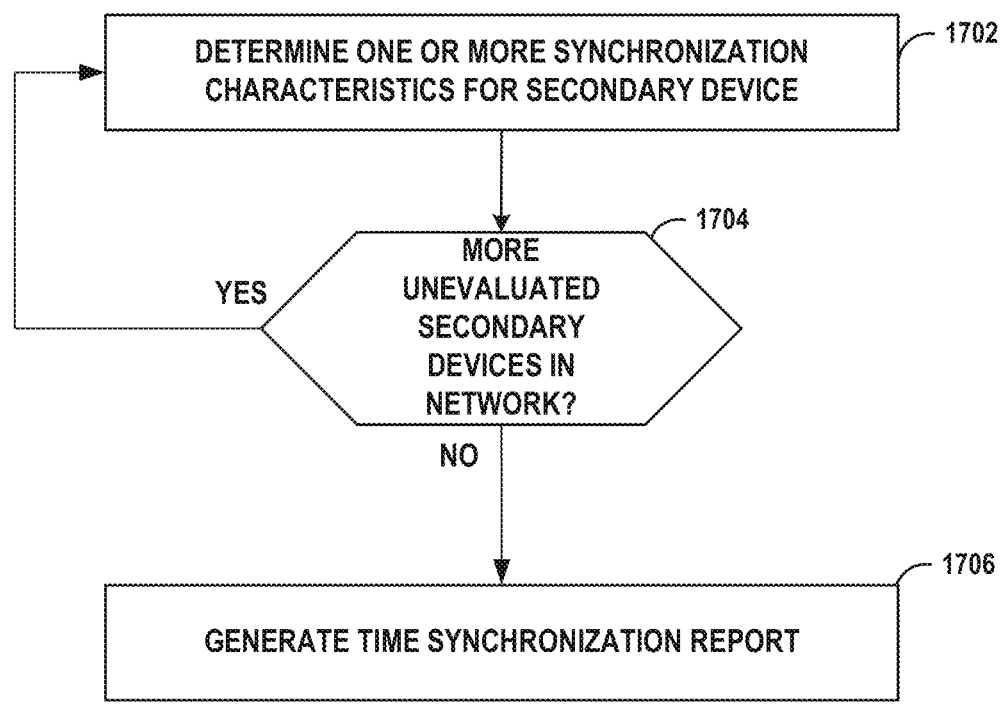
FIG. 17 is a flow diagram illustrating an example operation of a device according to one or more techniques of this disclosure.

FIG. 17 is a flow diagram illustrating an example operation of a computing system according to one or more techniques of this disclosure. FIG. 17 is described with reference to computing system 40 of FIG. 2. However, this process may also apply to any other configuration of the computing system described herein. In various examples, the operation of FIG. 17 may be performed by a master device, a computing system physically separate from a master device, or by both.

In accordance with the techniques described herein, computing system 40 determines one or more time synchronization characteristics for a secondary device (1702). If there are more unevaluated secondary devices in the network ("YES" branch of 1704), computing system 40 may continue determining one or more time synchronization characteristics for other secondary devices in the network until no more secondary devices are left unevaluated. If all secondary devices have been evaluated ("NO" branch of 1704), computing system 40 generates, based on at least the respective one or more time synchronization characteristics for each respective secondary device of the one or more secondary devices in the network, a time synchronization report for the network (1706).

Figure 18:
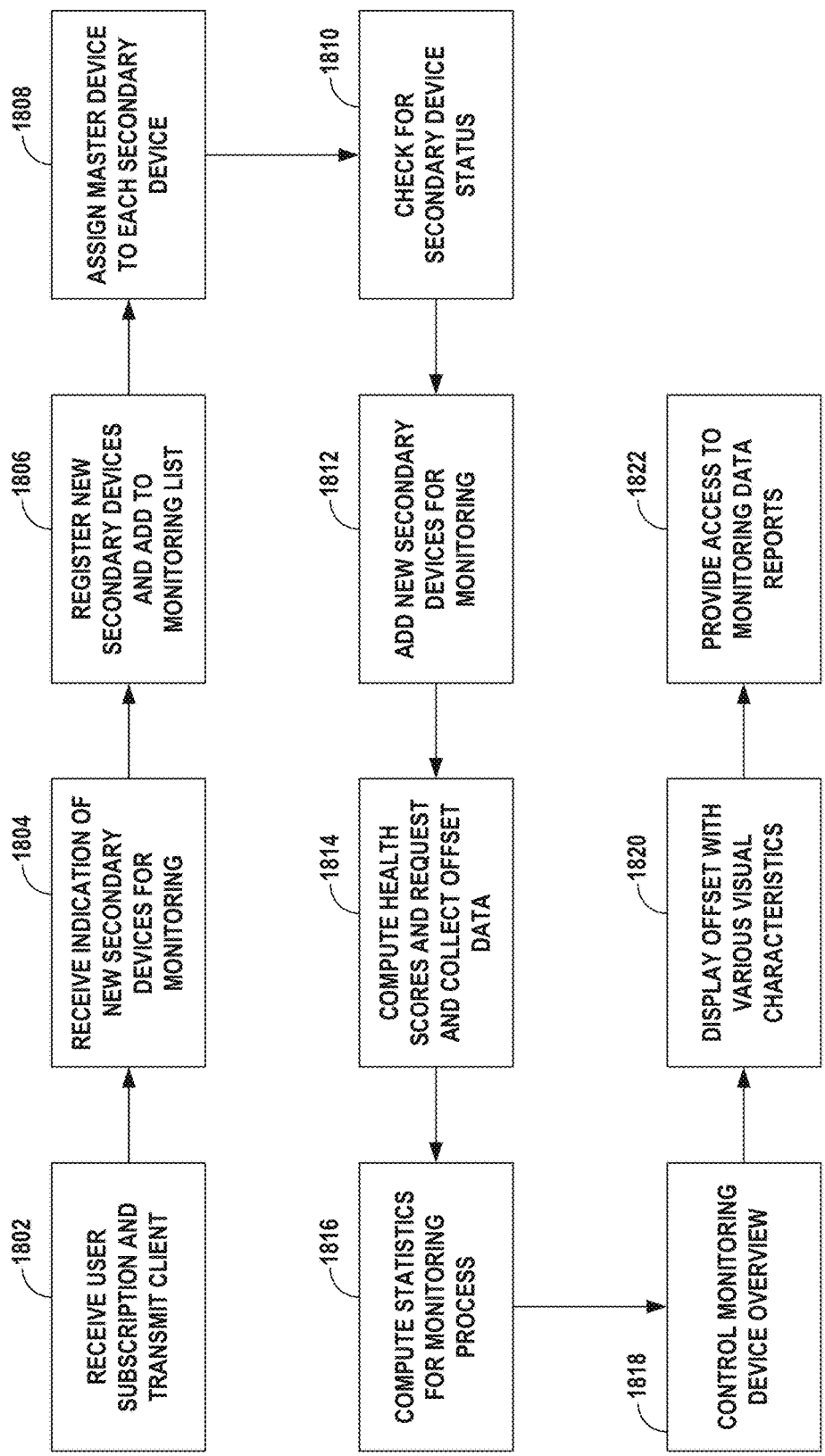
FIG. 18 is a flow diagram illustrating an example operation of a device according to one or more techniques of this disclosure.

FIG. 18 is a flow diagram illustrating an example operation of a computing system according to one or more techniques of this disclosure. FIG. 18 is described with reference to computing system 40 of FIG. 2, as well as report engine 154 of FIG. 8. However, this process may also apply to any other configuration of the computing system or report engine described herein.

In accordance with the techniques described herein, computing system 40 receives a user subscription from an end device and transmits a time monitoring client application to the end device (1802). Computing system 40 further receives an indication of user input adding the end device as a new end device for monitoring (1804). The installed time monitoring client communicates with time monitoring module 132 and registers the new end device into the monitoring device list (1806).

After a successful registration of the new end device, time monitoring connection module 136 assigns one or more master devices to the newly registered end device (1808). In one example, the connected master device is chosen based on its proximity to the end device. In one example, the master device may be chosen based on a combination of the device proximity and the device load for the respective master device. In yet another example, the master devices and end devices are statically connected. In another example, the master device and the end device may be connected dynamically. In another instance, an end device may be connected to two or more master devices, where one master device connection is active, and the other connections are reserved.

Authentication module 138 may regularly check a state of the end device connected to the monitoring system (1810). If the end device responds to the request from authentication module 138, the end device is considered to be an active end device.

Otherwise, the device status is set as inactive. Computing system 40 may continue to add new end devices for monitoring in a similar manner (1812).

Health management module 134 may collect one or more end device measurements and defines the device health score, and the time monitoring process may collect offset data (1814). In one example, the device health is used for advance device status control and monitoring visualization.

The time monitoring system is working with two types of end devices: synchronizing client devices that are synchronized with master devices, and monitoring client device that are monitored but not synchronized by connected master devices. In one example, the type of device is part of the device status control and is displayed by monitoring visualization module 148. In one example, the time monitoring system supports two statuses: "monitoring" or "monitoring and synchronized".

The time monitoring service collects data for each end device. In one example, it collects offset data periodically. In one example, it collects additional data including but not limited to probe timestamps, device and network loads.

The time monitoring service computes statistics associated with measured offsets, probe timestamps, network loads for each end device (1816). Statistics computation is a function of statistics computation module 144. In one example, statistics computation module 144 computes moving averages, moving standard deviation, moving minimum and maximum, moving medians, and/or exponential averages. In one example, in addition to the above basic statistics, statistics computation module 144 computes advanced indicators of offset quality, for instance, Bollinger bands, momentums, stochastic models, etc.

The time monitoring service monitors device health and other device-related information. Device status control module 146 collects and aggregates the appropriate data. In one example, device status control module 146 computes and controls the total number of monitoring devices, device geolocation, device intrinsic parameters (OS, supported timing protocol (NTP, PTP), CPU, NIC), device status (active/inactive), device synchronization (internal/external) for each user (1818).

The time monitoring service provides users a wide capability to observe monitoring information with the monitoring visualization module. In one example, monitoring visualization module 148 allows the user to monitor devices' offsets, statistics, and statuses (1820).

Users can create and download monitoring data reports using the report generator integrated with monitoring visualization module 148 (1822). In one example, reports can be generated in a form of automatic notification. In one example, reports may include automatic alerts.

Figure 19:
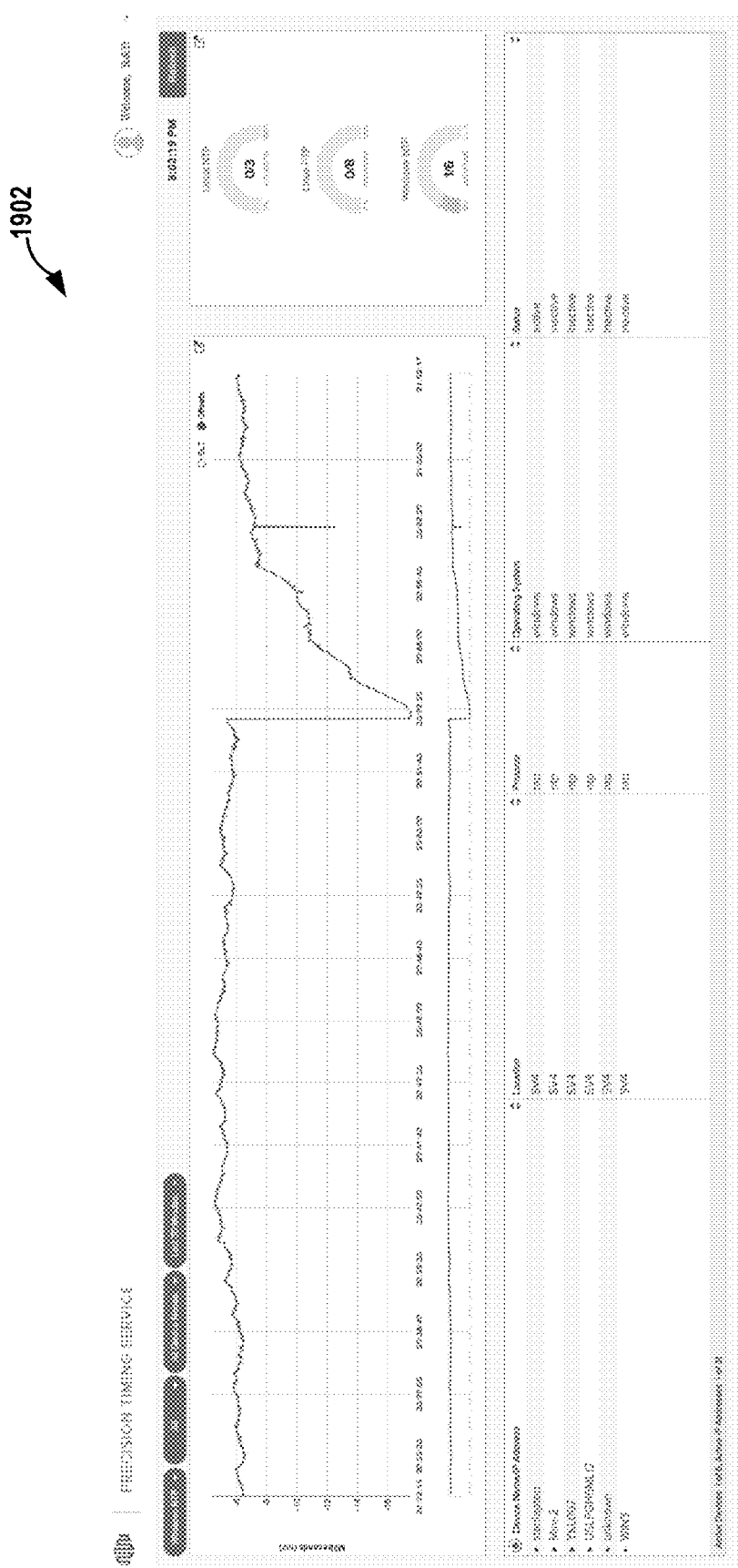
FIG. 19 is a conceptual diagram illustrating an example user interface that includes a report generated according to one or more techniques of this disclosure.

FIG. 19 is a conceptual diagram illustrating an example user interface that includes a report generated according to one or more techniques of this disclosure. As shown in user interface 1902, the time synchronization report may include graphs, device names, device locations, device statuses, device details, offset information, timestamp information, and various calculated statistics based on the raw characteristic values.

Depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), graphics processing units (GPUs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or

What is claimed is:

1. A method comprising:
for a secondary device of one or more secondary devices in a network, determining, by a computing system, one or more time synchronization characteristics including health data for the secondary device;
computing, by the computing system and for each of a plurality of master devices in the network, an availability score comprising a normalized average network load of the master device over a time period;
assigning, by the computing system in response to determining that a geolocation of the secondary device is closer to a geolocation of the master device than any other master device of the plurality of master devices and based on the health data for the secondary device and the availability scores of each of the plurality of master devices, a master device to the secondary device;
collecting, by the computing system and by the assigned master device, one or more parameters from the secondary device of the one or more secondary devices, wherein the one or more parameters indicates an operational health of the secondary device; and
generating, by the computing system and based on at least the operational health of the secondary device provided by the assigned master device and one or more time synchronization characteristics for the secondary device of the one or more secondary devices in the network, a time synchronization report for the network.

2. The method of claim 1, further comprising:
for each secondary device of the one or more secondary devices, collecting, by a master device, one or more parameters from the secondary device, wherein at least one of the respective one or more parameters indicates an operational health of the secondary device; and
determining, by the computing system and based on the one or more parameters, the health data for the secondary device.

3. The method of claim 1, wherein the health data for the secondary device includes one or more of
a health score for the secondary device;
a health score for a connection between the secondary device and the master device;
a health score for each connection between the secondary device and any other secondary device in the network;
a health score for a cluster within the network that includes the secondary device; and
a health score for the network.

4. The method of claim 2, wherein the one or more parameters include one or more of an of an operating system version of the secondary device, a processor model of the secondary device, a processor number of the secondary device, a network interface model of the secondary device, a model of a hardware component of the secondary device, a version of firmware installed on the secondary device, a version of software installed on the secondary device, a total time the secondary device is in service for a particular period of time, an average temperature of the secondary device for the particular period of time, an average processing load of the secondary device for the particular period of time, an average processor idle time for the secondary device for the particular period of time, and a performance metric of the secondary device.

5. The method of claim 1, wherein the one or more time synchronization characteristics further comprise one or more of timestamp data and offset data.

6. The method of claim 1, further comprising:
determining, by the computing system, network load data for the network; and
including, by the computing system, the network load data for the network in the time synchronization report.

7. The method of claim 1, further comprising:
calculating, by the computing system and based on the one or more time synchronization characteristics for each secondary device, a statistical representation comprising one or more of a moving average, a momentum, a median, one or more quantiles, a histogram, and a standard deviation; and
including, by the computing system, the statistical representation in the time synchronization report.

8. The method of claim 1, further comprising:
outputting, by the computing system, and for display on a display device, a graphical indication of the time synchronization report.

9. The method of claim 1, further comprising:
normalizing, by the computing system, the one or more time synchronization characteristics for each secondary device of the one or more secondary devices; and
including, by the computing system, the normalized one or more time synchronization characteristics for each secondary device of the one or more secondary devices in the time synchronization report.

10. The method of claim 1, further comprising:
scaling, by the computing system, the one or more time synchronization characteristics for each secondary device of the one or more secondary devices; and
including, by the computing system, the scaled one or more time synchronization characteristics for each secondary of the one or more secondary devices in the time synchronization report.

11. The method of claim 1, further comprising:
grouping, by the computing system, the one or more secondary devices into cluster groups based on a geolocation of the secondary device,
wherein the time synchronization report includes the one or more time synchronization characteristics arranged by the cluster groups that include the secondary device associated with the one or more time synchronization characteristics.

12. The method of claim 1, wherein the time synchronization report comprises a historical report over a period of time, and wherein the method further comprises:
comparing, by the computing system, a statistical representation of the one or more time synchronization characteristics for the to a threshold statistic; and
in response to determining that the statistical representation fails to meet the threshold statistic, altering, by the computing system, a length of the period of time included in the time synchronization report.

13. The method of claim 1, further comprising:
determining, based on a first flag received in a first indication of user input, whether to perform a monitoring process; and
determining, based on a second flag received in a second indication of user input, whether to perform a synchronization process.

14. A computing device comprising:
one or more processors coupled to a memory, the one or more processors being configured to:
for a secondary device of one or more secondary devices in a network, determine one or more time synchronization characteristics including health data for the secondary device;
compute, for each of a plurality of master devices in the network, an availability score comprising a normalized average network load of the master device over a time period;
determine network load data for the network;
assign, based on the health data for the secondary device and the availability scores of each of the plurality of master devices, a master device to the secondary device;
collect, by the assigned master device, one or more parameters from the secondary device of the one or more secondary devices, wherein the one or more parameters indicates an operational health of the secondary device; and
generate, based on at least the operational health of the secondary device provided by the assigned master device and one or more time synchronization characteristics for the secondary device of the one or more secondary devices in the network, a time synchronization report for the network, wherein the time synchronization report includes the network load data for the network in the time synchronization report.

15. The computing device of claim 14, wherein the one or more processors are further configured to:
for each secondary device of the one or more secondary devices, collect one or more parameters from the secondary device, wherein at least one of the respective one or more parameters indicates an operational health of the respective secondary device; and
determine, based on the one or more parameters, the health data for the secondary device.

16. The computing device of claim 14, wherein the health data for the secondary device include one or more of:
a health score for the secondary device;
a health score for a connection between the secondary device and the master device;
a health score for each connection between the secondary device and any other secondary device in the network;
a health score for a cluster within the network that includes the secondary device; and
a health score for the network.

17. The computing device of claim 14, wherein the one or more processors are further configured to:
output, for display on a display device, a graphical indication of the time synchronization report.

18. The computing device of claim 14, the one or more processors being configured to assign the master device to the secondary device at least in part in response to determining that a geolocation of the secondary device is closer to a geolocation of the master device than any other master device of the plurality of master devices.

19. A system comprising:
a network comprising a plurality of clusters, wherein each cluster comprises a group of one or more devices in a particular geographic area;
a computing system;
a master device, of a plurality of master devices in the network, located in a first cluster of the plurality of clusters; and
one or more secondary devices located in a second cluster of the plurality of clusters,
wherein the computing system comprises one or more processors and memory storing instructions that, when executed, cause the one or more processors to:
determine, for a secondary device of one or more secondary devices in a network, one or more time synchronization characteristics including health data for the secondary device;
compute, for each of the plurality of master devices in the network, an availability score comprising a normalized average network load of the master device over a time period;
assign, based on the health data for the secondary device and the availability scores of each of the plurality of master devices, an assigned master device to the secondary device;
determine, in response to receiving a first flag in a first indication of user input, to perform a monitoring process;
in response to determining to perform the monitoring process:
collect, by the assigned master device, one or more parameters from the secondary device of the one or more secondary devices, wherein the one or more parameters indicates an operational health of the secondary device;
generate, based on at least the operational health of the secondary device provided by the assigned master device and one or more time synchronization characteristics for the secondary device of the one or more secondary devices in the network, a time synchronization report for the network; and
determine, based on a second flag received in a second indication of user input, whether to perform a synchronization process.

20. The system of claim 19, wherein the instructions cause the one or more processors to assign the master device to the secondary device at least in part in response to determining that a geolocation of the secondary device is closer to a geolocation of the m aster device than any other master device of the plurality of master devices.

* * * * *